US009177434B2

(12) United States Patent
Oakes et al.

(10) Patent No.: US 9,177,434 B2

(45) Date of Patent: Nov. 3, 2015

(54) SYSTEMS AND METHODS FOR MAP-BASED LOTTERY GAMES

(75) Inventors: James Allan Oakes, Rye (GB); Henry Edward Oakes, Hastings (GB); Benjamin Guy Arbib, London (GB); Matthew Young, Watford (GB); Helen Margaret Crosby, Hertfordshire (GB)

(73) Assignee: GEONOMICS GLOBAL GAMES LIMITED, London (GB)

( * ) Notice: Subject to any disclaimer, the term of this patent is extended or adjusted under 35 U.S.C. 154(b) by 60 days.

(21) Appl. No.: 13/460,201

(22) Filed: Apr. 30, 2012

(65) Prior Publication Data

US 2012/0214571 A1 Aug. 23, 2012

Related U.S. Application Data

(63) Continuation-in-part of application No. 12/180,163, filed on Jul. 25, 2008, and a continuation-in-part of application No. 12/180,201, filed on Jul. 25, 2008, now Pat. No. 8,167,701, and a continuation-in-part of application No. 13/189,248, filed on Jul. 22, 2011, now Pat. No. 8,771,059.

(51) Int. Cl.
*A63F 13/00* (2014.01)
*G07F 17/32* (2006.01)

(52) U.S. Cl.
CPC .............. *G07F 17/32* (2013.01); *G07F 17/329* (2013.01); *G07F 17/3258* (2013.01)

(58) Field of Classification Search
CPC ..... G06Q 50/34; G07F 17/32; G07F 17/3258; G07F 17/329; A63F 3/06
USPC ........... 463/17–19, 25–28, 30, 42; 273/138.1, 273/269, 274
See application file for complete search history.

(56) References Cited

U.S. PATENT DOCUMENTS

| | | | | |
|---|---|---|---|---|
| 7,300,348 | B2 * | 11/2007 | Kaminkow et al. | 463/17 |
| 2003/0047869 | A1 | 3/2003 | Walker et al. | |
| 2003/0114211 | A1 * | 6/2003 | White | 463/17 |
| 2004/0180713 | A1 * | 9/2004 | Eklund | 463/17 |
| 2004/0259626 | A1 * | 12/2004 | Akram et al. | 463/17 |
| 2006/0079331 | A1 * | 4/2006 | Moshal | 463/42 |
| 2006/0093142 | A1 * | 5/2006 | Schneier et al. | 380/251 |
| 2009/0197684 | A1 * | 8/2009 | Arezina et al. | 463/42 |

OTHER PUBLICATIONS

International Search Report and Written Opinion from International Application No. PCT/IB2013/000788, 7 pages.

(Continued)

*Primary Examiner* — David L Lewis
*Assistant Examiner* — Robert Mosser
(74) *Attorney, Agent, or Firm* — Goodwin Procter LLP

(57) ABSTRACT

Systems and methods for map-based lottery games are disclosed. According to one particular embodiment, a method for a map-based lottery game may comprise: establishing a game having a gameboard based on a map that includes a plurality of units; receiving from each of a plurality of players a selection of at least one available unit on the gameboard; uniquely associating each said player with the selected at least one unit such that each unit on the gameboard is associated with no more than one of the plurality of players; and conducting a lottery drawing to select at least one first unit from some or all of the plurality of units such that any player associated with said at least one first unit becomes a first winner of a prize.

23 Claims, 31 Drawing Sheets

(56) References Cited

OTHER PUBLICATIONS

EPO: "Mitteilung des Europäischen Patentamts vom 1. Oct. 2007 über Geschäftsmethoden = Notice from the European Patent Office dated Oct. 1, 2007 concerning business methods = Communiqué de l 'Office eoropéen des brevets, en date du ler Oct. 2007, concernant les methods dans le domaine des activités", Journal Officiel De L'Office Europeen Des Brevets. Official Journal of the European Patent Office. Amtsblattt Des Eoropaeischen Patentamts, OEB, Munchen, DE, vol. 30, No. 11, Nov. 1, 2007, pp. 592-593, XP007905525, ISSN: 0170-9291, the whole document, 2 pages.

Webpage "The UK Postcode Lottery—FAQ—How to Play" dated Sep. 28, 2006, retrieved from http://web.archive.org/web/20060928125608/https://www.postcodelottery.co.uk/web/show/id=43883, (2 Pages).

Webpage "The UK Postcode Lottery—How to play" dated Sep. 28, 2006, retrieved from http://web.archive.org/web/20060928115112/https://www.postcodelottery.co.uk/web/show/id=41266, (2 Pages).

Webpage "Svenska PostkodStiftelsen—Swedish Postcode Lottery" retrieved from http://www.postkodstiftelsen.se/About-the-foundationNew/Swedish-Postcode-Lottery.htm, (1 Page).

Webpage "Novamedia—Sweden" retrieved from http://www.novamedia.nl/web/Our-Charity-Lotteries/Sweden.htm, (2 Pages).

Webpage "Dutch Postcode Lottery" retrieved from http://www.carmabi.org/sponsors-partners/dutch-postcode-lottery, (1 Page).

Webpage "Novamedia—NPL tekst" retrieved from http://www.novamedia.nl/web/Our-Charity-Lofteries/The-Netherlands/NPL-tekst.htm, (1 Page).

International Preliminary Report on Patentability (Nov. 4, 2014), (1 Page).

Written Opinion (Nov. 4, 2014), (3 Pages).

* cited by examiner

FIG. 11
GeoSweep™
Big Apple
Broadway
Madison Ave
5th Ave
Park Ave S
Lexington Ave
3rd Ave
6th Ave
7th Ave
8th Ave
9th Ave
Hudson St
Horatio St
Jane St
Bank St
Greenwich
W 33rd St
W 32nd St
W 30th St
W 29th St
W 28th St
W 27th St
W 26th St
W 25th St
W 24th St
W 23rd St
W 22nd St
W 21st St
W 20th St
W 19th St
W 18th St
W 17th St
W 16th St
W 15th St
W 14th St
W 13th St
W 12th St
E 35th St
E 34th St
E 32nd St
E 31st St
E 30th St
E 29th St
E 28th St
E 27th St
E 26th St
E 25th St
E 24th St
E 23rd St
E 22nd St
E 21st St
E 20th St
E 19th St
E 18th St
E 17th St
E 15th St
GARMENT DISTRICT
MIDTOWN
CHELSEA
UNION SQUARE
GRAMERCY PARK

FIG. 26

| | 1 | 2 | 3 | 4 | 5 | 6 | 7 | 8 | 9 | 10 |
|---|---|---|---|---|---|---|---|---|---|---|
| A | | | | | | | | | | |
| B | | | | 3rd Prize | 3rd Prize | 3rd Prize | 3rd Prize | 3rd Prize | | |
| C | | | | 3rd Prize | 2nd Prize | 2nd Prize | 2nd Prize | 3rd Prize | | |
| D | | | | 3rd Prize | 2nd Prize | **1st Prize (unoccupied)** | 2nd Prize | 3rd Prize | | |
| E | | | | 3rd Prize | 2nd Prize | 2nd Prize | 2nd Prize | 3rd Prize | | |
| F | | | | 3rd Prize | 3rd Prize | 3rd Prize | 3rd Prize | 3rd Prize | | |
| G | | | | | | | | | | |
| H | | | | | | | | | | |

FIG. 31
3110
3115n
GeoSweep
The UnLottery
3115a
3115b

SYSTEMS AND METHODS FOR MAP-BASED LOTTERY GAMES

REFERENCE TO RELATED APPLICATIONS

This patent application is a Continuation-In-Part Application of U.S. patent application Ser. No. 12/180,163, filed on Jul. 25, 2008, entitled "Systems and Methods for Lottery-Style Games" and U.S. patent application Ser. No. 12/180,201, filed on Jul. 25, 2008, also entitled "Systems and Methods for Lottery-Style Games." This application is also a Continuation-In-Part Application of U.S. patent application Ser. No. 13/189,248, filed Jul. 22, 2011, entitled "Systems and Methods for Prize Discovery Games." All of these prior applications are incorporated by reference in their entireties.

FIELD OF THE INVENTION

Embodiments of the present invention relate generally to games of chance. More specifically, the present invention relates to systems and methods for lottery-style games.

BACKGROUND OF THE INVENTION

Lottery is a popular game of chance in which a number of players contribute to form a jackpot that is later awarded, wholly or partially, to one or more winners. The participating players pay money or contribute other things of value in exchange for lottery tickets. Typically, each lottery ticket bears a combination of numbers or other symbols, and a winning ticket has to at least partially match a randomly generated set of numbers or symbols. In a properly operated lottery game, any one of the outstanding lottery tickets could be selected in a random drawing as a winning ticket, entitling its holder to some or all of the jackpot prize.

Sweepstakes in United States may be considered one special type of lottery games which are free to enter and are typically sponsored by merchants for promotional marketing purposes. In United Kingdom, a sweepstake is technically a lottery game in which the prize is financed through the tickets sold. Small-scale sweepstakes among private parties (e.g., colleagues and classmates) may also be considered lottery games which are often related to ongoing sports events.

Lottery games come in different formats. For example, the jackpot of a lottery game may be either a fixed cash amount or a certain percentage of ticket revenue. The combination of numbers on each lottery ticket could be a unique one, or each player may be allowed to select his or her own lucky numbers, making it possible for multiple tickets to share a same combination. Lottery games can be played either online or offline. The most popular lottery games, such as Powerball™, Mega Millions™, and Euro Millions™, are mostly paper-based, requiring the purchase of actual tickets, although some are now starting to open to online participants. A few lottery games can be played completely online. That is, instead of purchasing a paper ticket and filling in desired numbers with a pencil, an online player can purchase an electronic (or virtual) lottery ticket and select a desired combination via a web interface such as an Internet browser.

In all traditional lottery games, lottery tickets are sold in predetermined, fixed denominations, for example, one dollar per ticket. Accordingly, one winning ticket will entitle its holder to an entire unit of a corresponding winning prize. Proportional value lottery games have been proposed, for example, in U.S. Pat. Nos. 6,296,569 and 7,351,142, but none appears to have been commercially implemented. Both of those patents describe the issuance of proportional denomination lottery tickets, online or at a point of sale (POS). For example, in any transaction involving change under a dollar, the change can be converted to a proportional denomination share of a full-unit (one-dollar) lottery ticket. If the full-unit lottery ticket is qualified for a prize, the holder of the proportional denomination ticket will be entitled to a fraction of the prize. For instance, if a one-dollar ticket matching all the winning numbers would entitle its holder to a jackpot amount, then a 25-cent proportional ticket entitles its holder to 25% of the jackpot.

All the existing types of lottery games appear to share a few common characteristics. First, they all have to issue some kind of lottery tickets, whether paper or electronic, full-denomination or proportional. The purposes for issuing lottery tickets are two-fold. The tickets bear numerical combinations or patterns to be compared to the randomly generated winning combination or pattern. The tickets also serve as proof of participation in the lottery games. However, the entire mechanism of generating, drawing, and matching tickets could impose significant overhead costs on the operation of lottery games.

Second, participation in traditional lottery games depends heavily on player impulse or enthusiasm, which causes ticket revenue to fluctuate. Except for a handful of gambling fanatics, most people only purchase lottery tickets occasionally. A loss in one game might cause an ordinary player to stop playing for a while. Also, public sentiment towards a lottery game often varies with the amount of jackpot prize available at the time. There seems to be a general belief that a one-dollar ticket somehow has a better chance of winning when the jackpot reaches several million dollars or more. At the very least, the nature of the game is such that the economic utility to the player of participating is not determined solely by the probability of winning the jackpot nor the expected return on playing; rather the higher the jackpot the greater the excitement of playing—i.e. this is a motivator to play. Similarly, the greater the chance of winning a small prize, the higher likelihood that players will repeatedly play. This is in part because winning even a small prize reinforces in the player's mind the possibility of winning the jackpot and in part because a game most players never won any prize at all would be perceived as unfair or boring. Therefore, when the total jackpot snowballs into an unusually large amount, the public often become increasingly interested in the game. Once the jackpot is won, a period of stagnation typically follows the news-generating big win. For all these reasons, ticket revenues from traditional lottery games tend to swing with time and seldom generate a steady cash flow.

Third, players in a traditional lottery game have no direct or perceivable incentive for bringing more players into the game. Theoretically, an existing player may be indirectly benefited if more players join the lottery game, because the increased participation will increase the size of jackpot the existing player could potentially win. However, other than in very small games, that potential benefit may not be tangible enough to encourage referrals of additional players. In addition, the existing player's chance of winning does not increase with the number of new players.

Furthermore, traditional lottery games including sweepstakes are pure games of chance and typically do not require any player skill or strategy. Every player's chance of winning is only affected by the number of lottery tickets he or she buys. One player's chance of winning is independent of another player's chance of winning. As a result, there tends to be very little interaction among lottery participants.

In view of the foregoing, it may be understood that there are significant problems and shortcomings associated with traditional lottery games.

SUMMARY OF THE INVENTION

Systems and methods for lottery-style games are disclosed. In one particular exemplary embodiment, a computer-implemented method for lottery-style games may comprise: establishing a map-based game that is scheduled to have a number of lottery drawings associated with a plurality of grid units on a map; accepting enrollment of a plurality of players in the map-based game, each player being associated with at least one grid unit on the map and being committed to participate in a plurality of the lottery drawings by contributing tokens of value; receiving, from each player, a designated number of tokens to be contributed, on behalf of each of the at least one grid unit, to each of the plurality of the lottery drawings said player is committed to participate in; and executing the map-based game by doing the following for each lottery drawing: pooling tokens which are contributed to said lottery drawing on behalf of grid units participating in said lottery drawing, together with tokens carried over from one or more previous lottery drawings, if any, to form a jackpot for said lottery drawing, and conducting a drawing, from said grid units participating in said lottery drawing, to select at least one first grid unit to win a first prize. In addition, one or more second grid units may be selected to win lesser prizes, the selection being based on relative map positions of the one or more second grid units with respect to the at least one first grid unit.

In another particular exemplary embodiment, a system for lottery-style games may comprise: a processor; at least one storage device coupled to the processor; a user interface coupled to the processor via one or more communication networks; wherein the processor is adapted to communicate with the at least one storage device and the user interface to execute instructions to perform the following tasks: establishing a map-based game that is scheduled to have a number of lottery drawings associated with a plurality of grid units on a map; accepting enrollment of a plurality of players in the map-based game, each player being associated with at least one grid unit on the map and being committed to participate in a plurality of the lottery drawings by contributing tokens of value; receiving, from each player, a designated number of tokens to be contributed, on behalf of each of the at least one grid unit, to each of the plurality of the lottery drawings said player is committed to participate in; and executing the map-based game by doing the following for each lottery drawing: pooling tokens which are contributed to said lottery drawing on behalf of grid units participating in said lottery drawing, together with tokens carried over from one or more previous lottery drawings, if any, to form a jackpot for said lottery drawing, and conducting a drawing, from said grid units participating in said lottery drawing, to select at least one first grid unit to win a first prize.

One technical effect of the systems and methods of the present invention is that they facilitate more efficient and more entertaining implementation of lottery-style games on modern computers and communications systems. Another technical effect of the systems and methods of the present invention lies in the specialized computer devices and/or gaming kiosks that may be configured and deployed to carry out the lottery-style games disclosed herein.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 26 illustrates another alternative payout structure in an exemplary GeoSweep game in accordance with one embodiment of the present invention.

DETAILED DESCRIPTION OF THE INVENTION

Figure 1:
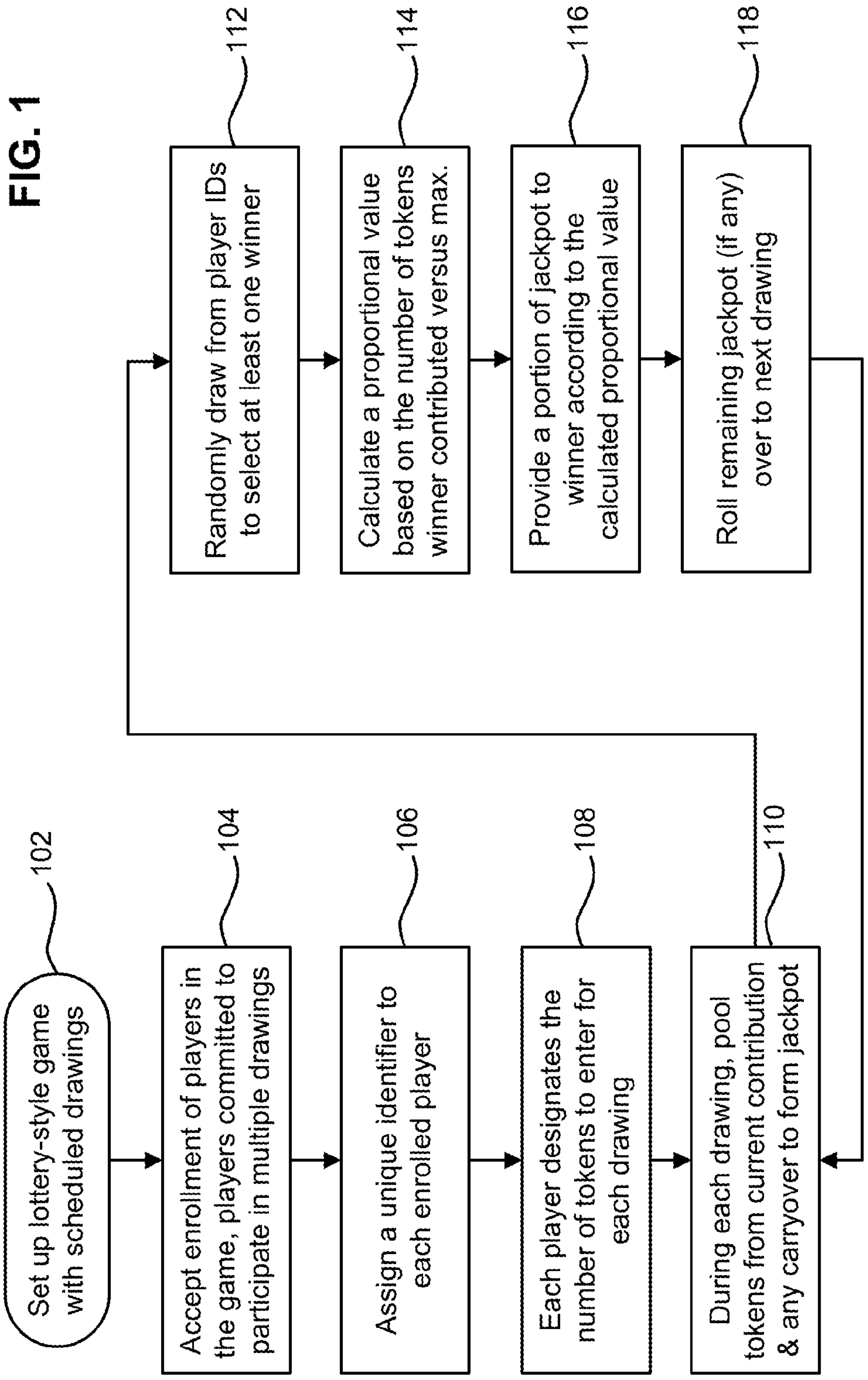
FIG. 1 is a flow chart illustrating an exemplary method of facilitating lottery-style games in accordance with one embodiment of the present invention.

Referring to FIG. 1, there is shown a flow chart illustrating an exemplary method of facilitating lottery-style games in accordance with one embodiment of the present invention.

In step 102, a lottery game may be set up. The lottery game may be an ongoing one that is scheduled to have a plurality of lottery drawings over a period of time. For example, the lottery drawings may occur on a periodic basis, such as once every hour, one or more times every calendar day or every business day, one or more times every week, or a predetermined number of times per month or year. As the lottery game is set up, a set of rules, terms and conditions may be published or otherwise communicated to potential participants. The rules may define how the lottery game is operated and how the lottery drawings are conducted, as well as calculation and payout of prizes, as will be described in more detail below. The terms and conditions may specify rights and obligations of persons participating in the lottery game and lottery drawings.

In preferred embodiments of the present invention, the lottery game is established online and accessible via an Internet website. The lottery game may also be implemented in connection with one or more social networking websites, such as Facebook™, MySpace™, or LinkedIn™. Alternatively, the lottery game may also be implemented in connection with one or more virtual reality games such as Second Life™ or other multi-player video games. The lottery game may be either an add-on or an integrated part of an associated website, wherein participation in the lottery game may enhance a player's experience at the associated website or vice versa. According to some embodiments, the lottery game and lottery drawings may be implemented at least partially offline, without requiring every participant to have computer or Internet access.

In step 104, players may be enrolled in the lottery game. Each person wishing to join the lottery game may be required to make a commitment to participate in a number of the scheduled lottery drawings. In one exemplary enrollment process, a player may (a) manifest consent to the set of rules, terms and conditions established in the lottery game and (b) deposit or pledge some amount of money or other things of value to be contributed to the game. The amount of initial deposit or pledge may depend on such factors as how many lottery drawings the player is obligated to participate in, how much wager the player is to enter for each drawing, the player's credit ratings, and so on.

Enrollment of players may be taken via a web interface, by mail, or through other communication means. When the lottery game is implemented in connection with a social networking website or other membership sites, enrollment in the lottery game may be simplified with the existing membership information. Alternatively, the lottery game operator, administrator, or personnel may receive and approve enrollment in person. In some instances, new players may join through referrals and/or gift membership.

In step 106, each enrolled player may be assigned one or more unique identifiers. Each player identifier (or player ID) may be a text string, a serial number, or other symbols. According to one embodiment, each player ID may be associated with a "Lucky Star" of the player's choice. According to some embodiments, each player ID may comprise a machine readable portion (e.g., an alphanumeric string) and a human recognizable portion (e.g., a logo, icon or catch phrase). For a player, one of the assigned player IDs may be used as a username for logging into an Internet-based lottery game. Or, the player may choose a different username to log in but is still able to manage multiple player IDs assigned to that player. The assigned player IDs may be imprinted or encoded on a membership card.

In the drawings or games described herein, each registered player can participate with one or multiple player IDs. When participating with multiple player IDs, the rules regarding each of the multiple player IDs are the same as if each player ID is owned and controlled by a single player. For ease of illustration, it is assumed in the following description that each player participates with a single player ID.

In step 108, each player may designate the number of tokens to enter for each drawing. That is, with respect to each lottery drawing the player is committed to participate in, the player may specify a wager amount that is typically measured in the number of tokens. As used herein, a "token" may be or represent any physical or virtual thing of value that can be counted or quantified. For example, a token may be or represent one or more units of cash or credit. Or, a token may be or represent one or more points that are exchangeable for things of value. According to one embodiment of the present invention, one token may be the equivalent of one cent (1/100 of a dollar). According to another embodiment, one token may be or represent one value point that may be used to exchange for music downloads, cell phone ring-tones, or for other online or in-store purchases. According to yet another embodiment, one token may represent one unit of a game score in an online video game or a virtual society. According to still another embodiment, one token may be or can be exchanged for one or more units of mobile telephone airtime or long-distance telephone minutes.

The players may purchase tokens with their initial deposits. They may set up electronic fund transfers and/or automatic credit card payments to refill their accounts with tokens. A player's account may be replenished automatically as soon as its balance falls below a preset lower limit. Apart from winning or purchasing refills, the players may alternatively or additionally obtain tokens through bartering or by engaging in certain activities. For example, a player may exchange credit card cash-back bonus points for tokens. The player may also take part in online surveys, view online advertisements, or increase activity level at social networking or blogger websites to earn tokens.

The number of tokens designated for each lottery drawing should typically fall within a certain range. For lottery drawings that take place on a daily basis, for example, there may be a daily minimum and a daily maximum for the number of tokens a player can contribute per player ID. According to one embodiment of the present invention, the daily minimum may be one token (e.g., one cent or one pence) and the daily maximum may be one hundred tokens (e.g., one dollar or one pound). The number of tokens that a player designates for each drawing may be any of a fixed value between and including the daily minimum and the daily maximum. Alternatively, the player may configure the daily wager to be a variable amount. To have a minimal level of participation in the lottery game (thus a more predictable revenue from the game), the game system may be configured to prevent players from lowering their preset daily wager amount for any upcoming drawings.

For each lottery drawing, a jackpot prize may be formed, in step 110, from two sources: (a) tokens contributed by players who participate in that drawing, and (b) tokens carried over from one or more previous drawings, if available. Tokens from the two sources may be pooled together into one jackpot. The jackpot (or a portion thereof) may account for a maximum payable amount for a winner of that lottery drawing.

In step 112, a random drawing from the player IDs may be conducted to select at least one winner. Note that the word "random" does not require randomness in the most rigorous statistical sense as such randomness is difficult to achieve. Instead, the word "random" implies a fair drawing process that does not appear to favor any one player more than any other player. The random (fair) drawing from the player IDs may be achieved in a number of computational methods as are well known in the gaming industry. According to some embodiments of the present invention, a single winner may be selected for each lottery drawing. According to some alternative embodiments, two or more winners may be selected for each drawing and they may share a prize fund on equal footings or according to an award hierarchy.

Then, in step 114, a proportional value may be calculated based on the number of tokens the selected winner(s) contributed versus the maximum number allowed per player ID. Assuming there is only one selected winner, the proportional value (F) may be calculated by dividing the number of tokens the winner contributed (n) with the maximum number a player is allowed to contribute (M) to that individual lottery drawing. That is—

$$F = \frac{n}{M}$$

If there are multiple winners, the proportional value may be calculated for each winner. For example, if a selected winner contributed the maximum number of tokens for that lottery drawing, the proportional value for that winner would be one (1) or 100%. If the selected winner contributed half of the maximum number of tokens allowed, the proportional value would be ½ or 50%. The proportional value calculated in this step may be represented with either a fraction or a percentage.

In step 116, a fraction of the jackpot (or maximum payable prize) may be provided to the selected winner(s) according to the proportional value calculated in step 114 above. That is, whatever the full prize amount (P) a winner might have been entitled to had he or she contributed the maximum number of tokens (M), the actual payout amount (p) may be reduced to a fraction of that full prize amount in proportion to the number of tokens contributed (n). That is—

$$p = F \times P = \frac{n}{M} \times P$$

The same proportional payout rule applies to single-winner as well as multiple-winner scenarios. The actual payout may be made by depositing tokens into a winner's account in the game system. Alternatively, the winner may receive the prize in the form of cash, points, airtime or long-distance minutes, other things of value, or a combination thereof. Other payout arrangements are also possible.

In step 118, the remainder of the jackpot prize may be rolled over to a next drawing. Unless one or more selected winners happen to have wagered the maximum number of tokens and therefore won the entire jackpot, there would always be some remaining jackpot to add to the jackpot of the next drawing. In addition, the enrollment rule ensures continuous participation in the ongoing lottery drawings. As a result, the jackpot may quickly snowball into a large amount, further increasing players' interest in the game.

For business advantages, it may be preferable to set the maximum number of tokens that each player ID can contribute to each drawing at a relatively low value. For example, if the daily maximum that can be entered for a daily drawing is one dollar, a player can contribute as little as one cent but never more than one dollar. The player will not feel any significant financial impact or burden to continue playing the lottery game for many drawing days. By wagering the equivalent of pocket change on a daily basis, the player may still enjoy a decent chance of winning a substantial amount of money.

Figure 2:
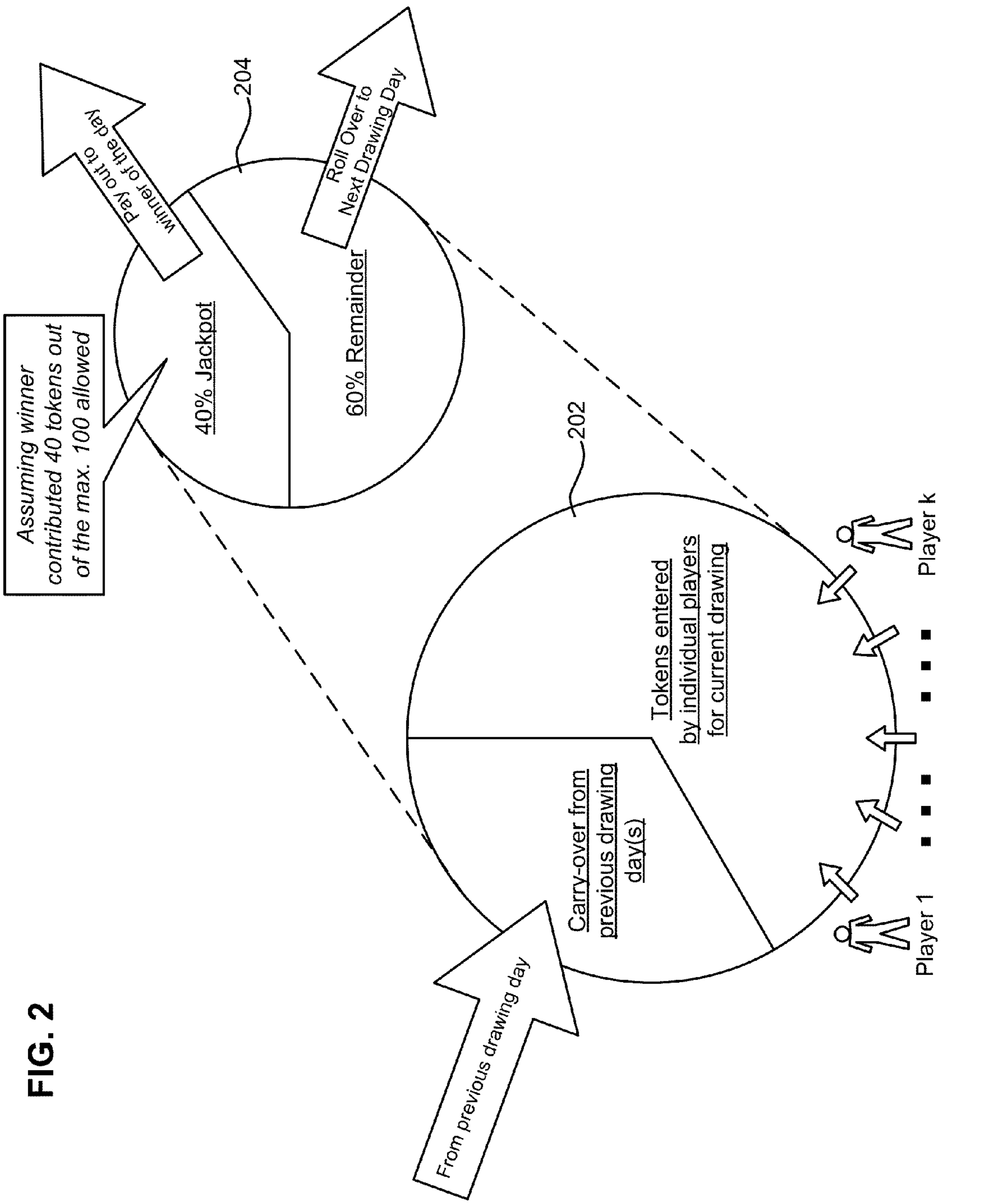
FIG. 2 illustrates the flow of tokens from the perspective of a lottery game operator in accordance with one embodiment of the present invention.

FIG. 2 illustrates the flow of tokens from the perspective of a lottery game operator in accordance with one embodiment of the present invention. For ease of illustration, it will be assumed that lottery drawings in the lottery game occur on a daily basis. On each drawing day, a pie chart 202 represents a jackpot prize and sources thereof, whereas a pie chart 204 represents the same jackpot prize (but shown separately for clarity) and disbursement therefrom. The pie chart 202 indicates that a first portion of the present drawing day's jackpot include tokens carried over from one or more previous drawing days. The pie chart 202 also indicates that second portion of the jackpot include tokens contributed by individual players for the current drawing. The pie chart 204 indicates that at least a fraction of the jackpot prize may be paid out to a winner of the day. Assuming there is a single winner and that player contributed 40 tokens out of the maximum 100 allowed, 40% of the jackpot prize may be paid out to the winner. In that case, the remaining 60% of the jackpot may be rolled over to a next drawing day.

Figure 3:
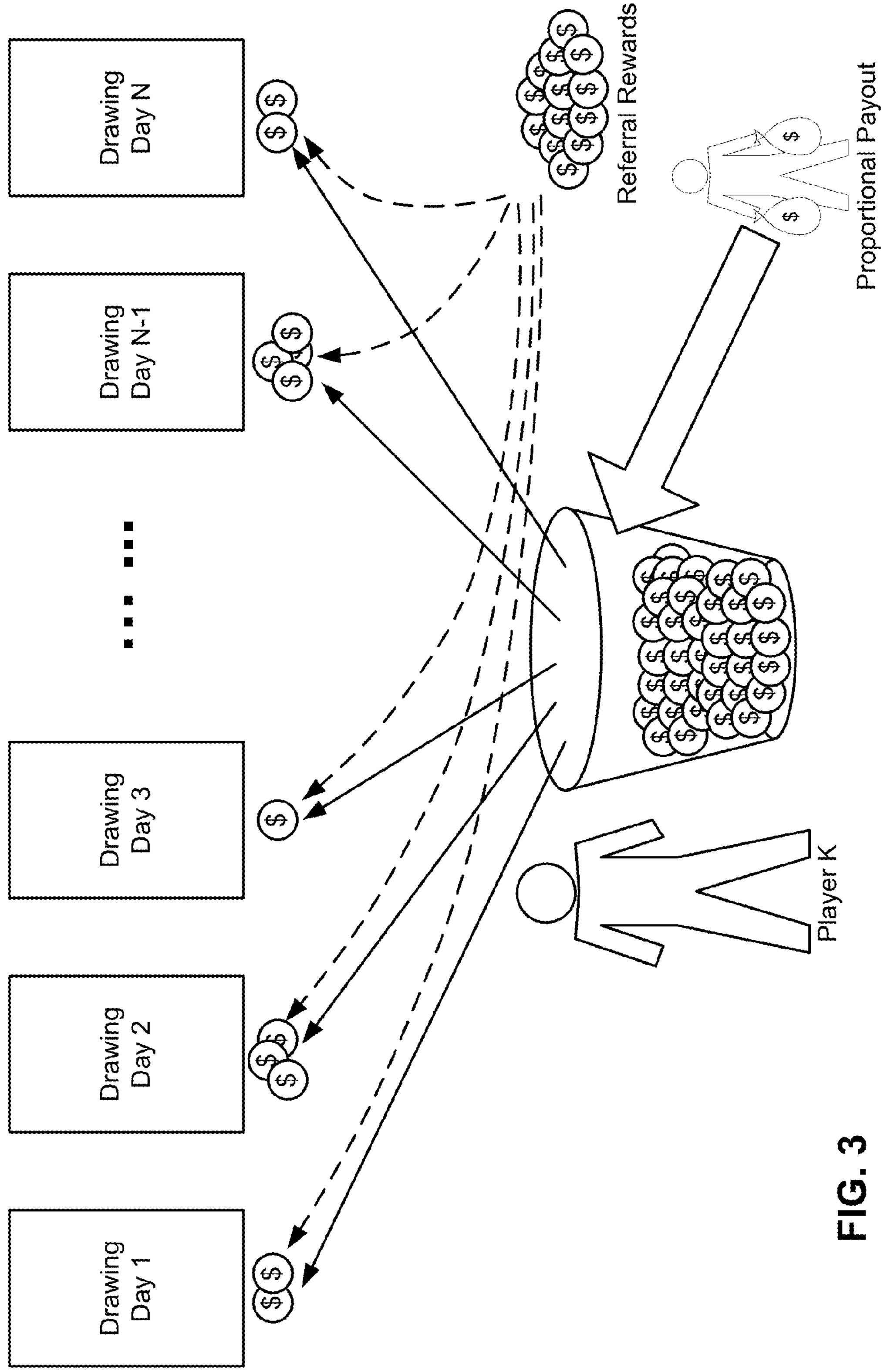
FIG. 3 illustrates the flow of tokens from the perspective of a player in a lottery game in accordance with one embodiment of the present invention.

FIG. 3 illustrates the flow of tokens from the perspective of a player in a lottery game in accordance with one embodiment of the present invention. The exemplary player, Player K, may be committed to participate in N lottery drawings occurring on N consecutive days, wherein N is an integer greater than one. The bucket of dollar-sign tokens represents an account balance for Player K. Player K may have started with a "full bucket" of tokens that were purchased upon enrollment. As described earlier, Player K may designate one or more tokens to be contributed to each daily drawing. The number of tokens designated may be constant or may vary day-to-day. As drawing days go by, unless Player K wins in one or more lottery drawings, Player K's account may be slowly depleted and may have to be replenished. If Player K happens to be picked as a winner in one of the drawings, the proportional payout from that drawing may also replenish Player K's account to some extent.

According to one embodiment of the present invention, Player K may also enjoy another source of tokens—referral rewards. In order to encourage Player K to refer additional players to join the lottery game, Player K may be awarded a number of tokens for each new player brought into the game. The referral rewards may be simply deposited into Player K's account. Alternatively, the referral rewards may be automatically entered into daily drawings on behalf of Player K and in addition to Player K's own contribution to the daily drawings. For example, for each new player that Player K received, one or more tokens may be added to Player K's daily wager amount. These additional tokens may be awarded to Player K as long as the newly referred player remains an active participant in the lottery drawings. Furthermore, the amount of referral rewards may be linked to activity level of the new player referred.

Figure 4:
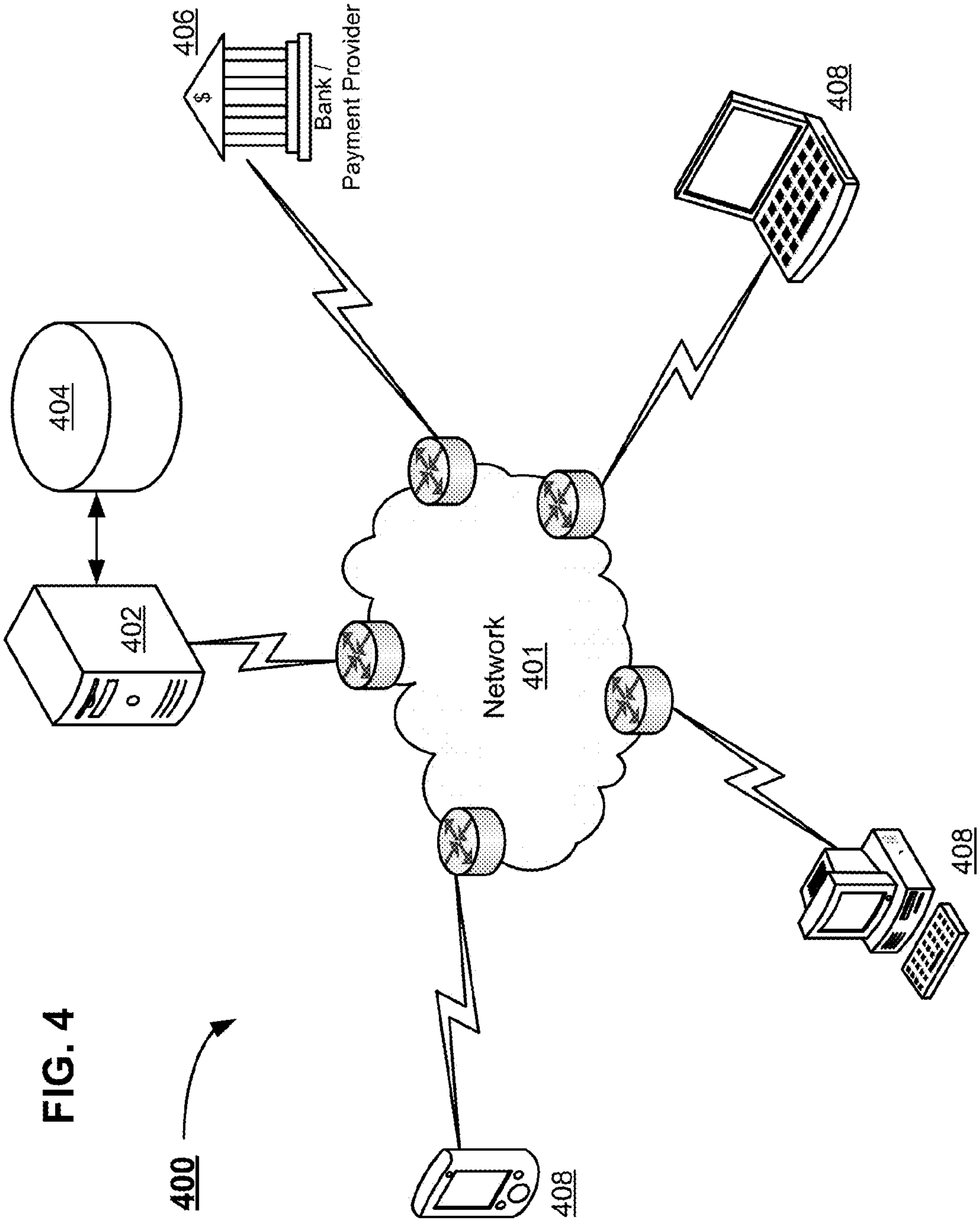
FIG. 4 is a block diagram illustrating an exemplary system for facilitating lottery-style games in accordance with one embodiment of the present invention.

FIG. 4 is a block diagram illustrating an exemplary system 400 for facilitating lottery-style games in accordance with one embodiment of the present invention.

The system 400 may be or include a computer system. This embodiment of the present invention may be described in the general context of computer-executable instructions, such as program modules, being executed by a computer. Generally, program modules include routines, programs, objects, components, data structures, etc. that perform particular tasks or implement particular abstract data types. A series of programmable instructions may be stored in a computer-readable medium performing the lottery-style gaming functions disclosed herein and to achieve technical effects in accordance with the disclosure. More exemplary software and data-storage modules will be described below in connection with FIG. 5.

The lottery-style games described herein may be entered into and/or played at one or more game terminals or kiosks on or near the premises of a casino, a department store, a shopping mall, or other suitable commercial sites. For example, potential participants in a lottery-style game might be limited by laws which prohibit online wagering with payment cards. It may be beneficial for those participants to visit, or have someone else visit on their behalf, a commercial outlet with above-mentioned game terminals or kiosks where they can lawfully register and/or play the lottery-style games. Once a player has registered and funded his/her membership, he/she may continue monitoring the daily progress of the game via Internet or other communication means. As needed, the player may occasionally re-visit the game terminals or kiosks to re-fill accounts associated with his/her player IDs.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system 400 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 400 may comprise at least one gaming server 402 coupled to one or more databases 404 and/or other data sources. The gaming server 402 may run a plurality of software modules to facilitate lottery-style games in accordance with embodiments of the present invention. The database(s) 404 may hold data records related to players and lottery drawings. One additional data source may be a bank or payment provider (406) that performs payment and/or credit services for the lottery game operator and players. Via a network 401, the players may communicate, locally or remotely, with the gaming server 402 in order to enroll in the lottery game, participate in drawings, and manage player accounts. The players may employ a variety of computing devices 408 such as personal computers, mobile computers, personal digital assistants or handheld devices for communication with the gaming server 402.

Figure 5:
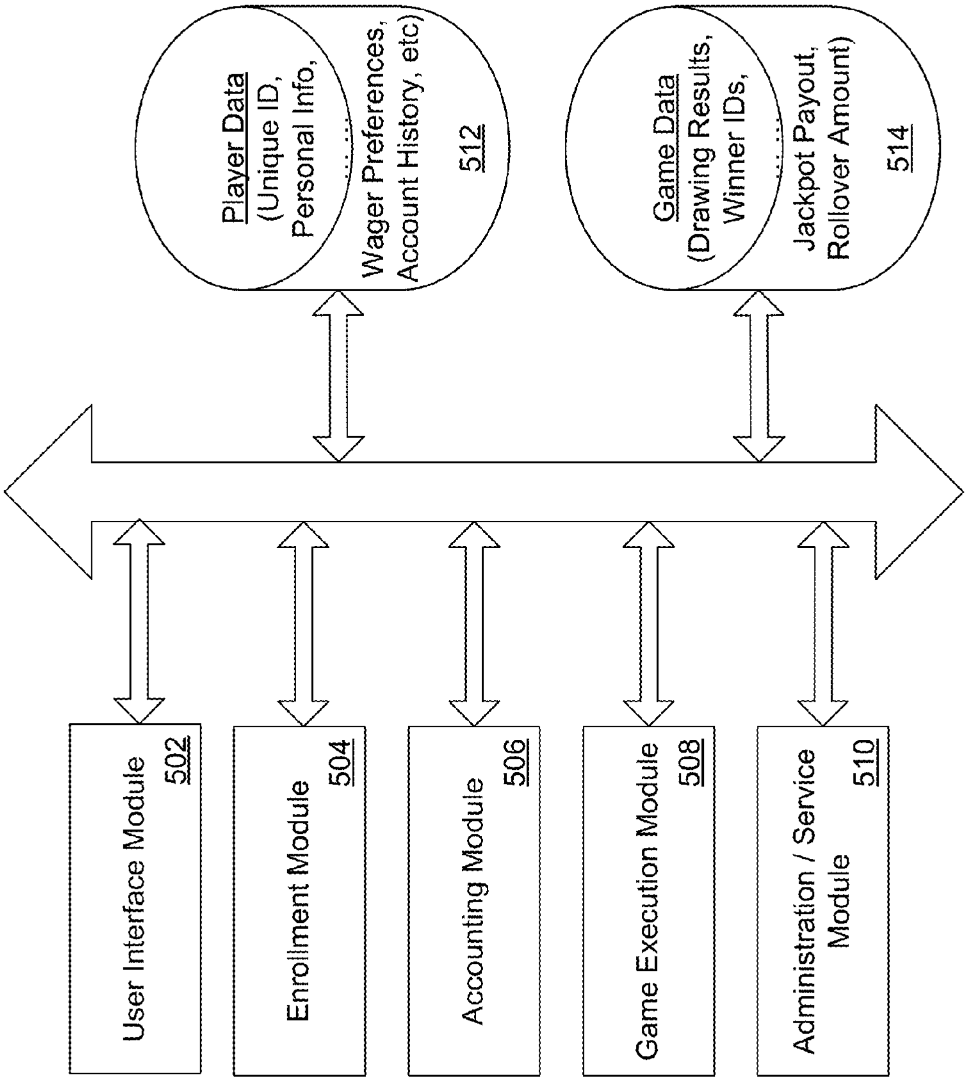
FIG. 5 is a block diagram illustrating exemplary software and data-storage modules for facilitating lottery-style games in accordance with one embodiment of the present invention.

FIG. 5 is a block diagram illustrating exemplary software and data-storage modules for facilitating lottery-style games in accordance with one embodiment of the present invention. The exemplary modules may include a user interface module 502, an enrollment module 504, an accounting module 506, a game execution module 508, an administration/service module 510, a player data module 512, and a game data module 514. These software modules may be programmed or configured to communicate with one another or with the data-storage modules.

The user interface module 502 may provide computer and/or Internet access for players and game operators/administrators to communicate with the other software modules. The enrollment module 504 may perform functions related to registering new players, such as verifying player information, assigning player IDs, and creating player records. The accounting module 506 may be responsible for managing player accounts and handling debit and credit transactions against the player accounts, including daily wagering and winner payouts. The game execution modules may perform functions such as scheduling and conducting lottery drawings, generating and publishing drawing results, and calculating proportional values and payout amounts. The administration/service module 510 may facilitate administrative and customer service tasks to be performed by an operator or personnel of the lottery game system.

The player data module 512 may contain and manage data records related to each player, such as player ID, personal information, wager preferences, account history, and so on. The game data module 514 may contain and manage data records related to the lottery drawings, such as drawing results, winner IDs, jackpot payouts, and roller amounts.

As variations of and/or improvement upon the above-described lottery-style games, other embodiments of the present invention may offer similar, membership-based games in connection with virtual and/or real maps. This type of lottery-style games may be referred to and are intended to be marketed or promoted as GeoSweep™ games. In a typical GeoSweep™ game, a grid pattern may be overlaid over a map dividing a land into grid units. A player may enroll in the game by taking virtual land ownership of one or more grid units and becoming committed to participate in a series of scheduled lottery drawings. The player may participate in a drawing by contributing tokens of value on behalf of at least one grid unit the player owns. During any of those drawings, if a grid unit owned by the player is selected as a (first-prize) winner, that player may receive a full or proportional prize amount. Additional winners in that drawing may be selected to win lesser amounts than the first-prize winner. Those additional winners are selected and their payout amounts are determined based on map positions of the additional winners with respect to the first-prize winner.

Figure 6:
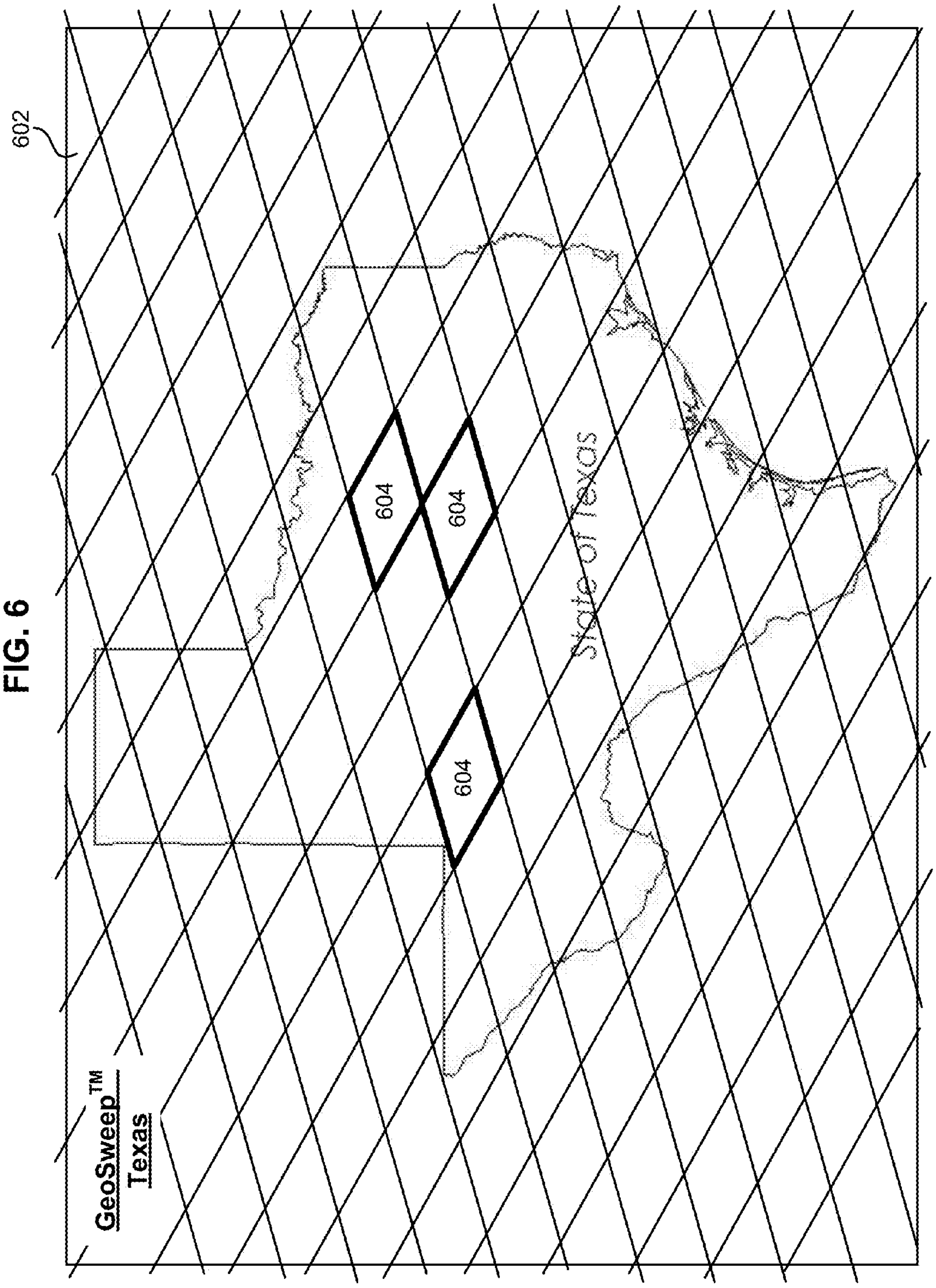
FIG. 6 shows a grid map for an exemplary GeoSweep game in accordance with one embodiment of the present invention.

FIG. 6 shows a grid map for an exemplary GeoSweep game in accordance with one embodiment of the present invention. The game may be referred to as "GeoSweep Texas," wherein a map of the State of Texas is overlaid with a grid 602. Each grid unit 604 may be a rectangle or a square of the same or similar size. In general, a grid unit can take any other shape, such as triangle, hexagon (honeycomb) or other polygon. In some GeoSweep games, the grid units can have different shapes and/or sizes without substantially affecting the operation of the games. As a result, the grid 602 may divide up land of Texas into a plurality of small parcels with well defined boundaries. Each of the parcels (or grid units 604) may be uniquely identified.

To participate in the GeoSweep Texas game, a player may be required to register to become a member. During registration, the player may pick one or more of available parcels to become a virtual owner thereof. There may or may not be an upfront cost for "owning" a parcel. Both sole and shared ownership may be possible for a parcel. In some instances, it might be beneficial to hold an auction among multiple interested players to determine which player gets a popular parcel. In addition, the player may make a commitment to participate in a plurality of scheduled lottery-style drawings involving the one or more parcels. The plurality of scheduled lottery-style drawings may take place periodically, such as once or more times a day, every other day or every few days, or a number of times per week or month. In each drawing, each participating parcel may be required to contribute a predetermined number of tokens to a prize pool or jackpot. The predetermined number may be a fixed one set by the game operator or administrator, or, alternatively, a variable one to be designated by each individual owner of the participating parcels. In any case, upon registration, each player may be required to fund his or her commitment to participate in drawings by depositing or pledging some amount of money.

At each drawing, one or more parcels or grid units 604 may be randomly selected as sole winner(s) or first-prize winner(s). For ease of explanation, it is assumed hereinafter that each drawing selects a single grid unit as a sole winner or a first-prize winner. In the case of a sole winner, an entire amount of jackpot or a calculated fraction thereof may be awarded to the owner of that winning grid unit. More typically, in addition to a first-prize winner, one or more winners of lesser amounts may be determined based on their relative map positions with respect to the first-prize winner. According to some embodiments, the drawing may be limited to parcels that are already owned or claimed by participating players, thereby ensuring at least one player will be entitled to a prize as described in more detail below. According to some embodiments of the present invention, the parcels or grid units may each have the same chance of being drawn as a first-prize winner. According to other embodiments, the parcels or grid units may have varying chances of being picked as a winner. For example, when a parcel costs more to own than others, it might enjoy a better chance of winning.

The prizes in each drawing may comprise tokens of value which have been contributed to that drawing by participating parcels. The prizes may also comprise rollover prizes from a previous drawing. In addition or as an alternative, the prizes may comprise other things of value. For example, a marketing partnership may be formed between the game operator and other business entities. In return for promotional or advertising activities on the GeoSweep game platform, the business partners may contribute products and services to be awarded as prizes. If justified by the cost or return on investment, an actual piece of land or other real property may be awarded to a first-prize winner or a sole jackpot winner.

Figure 7A:
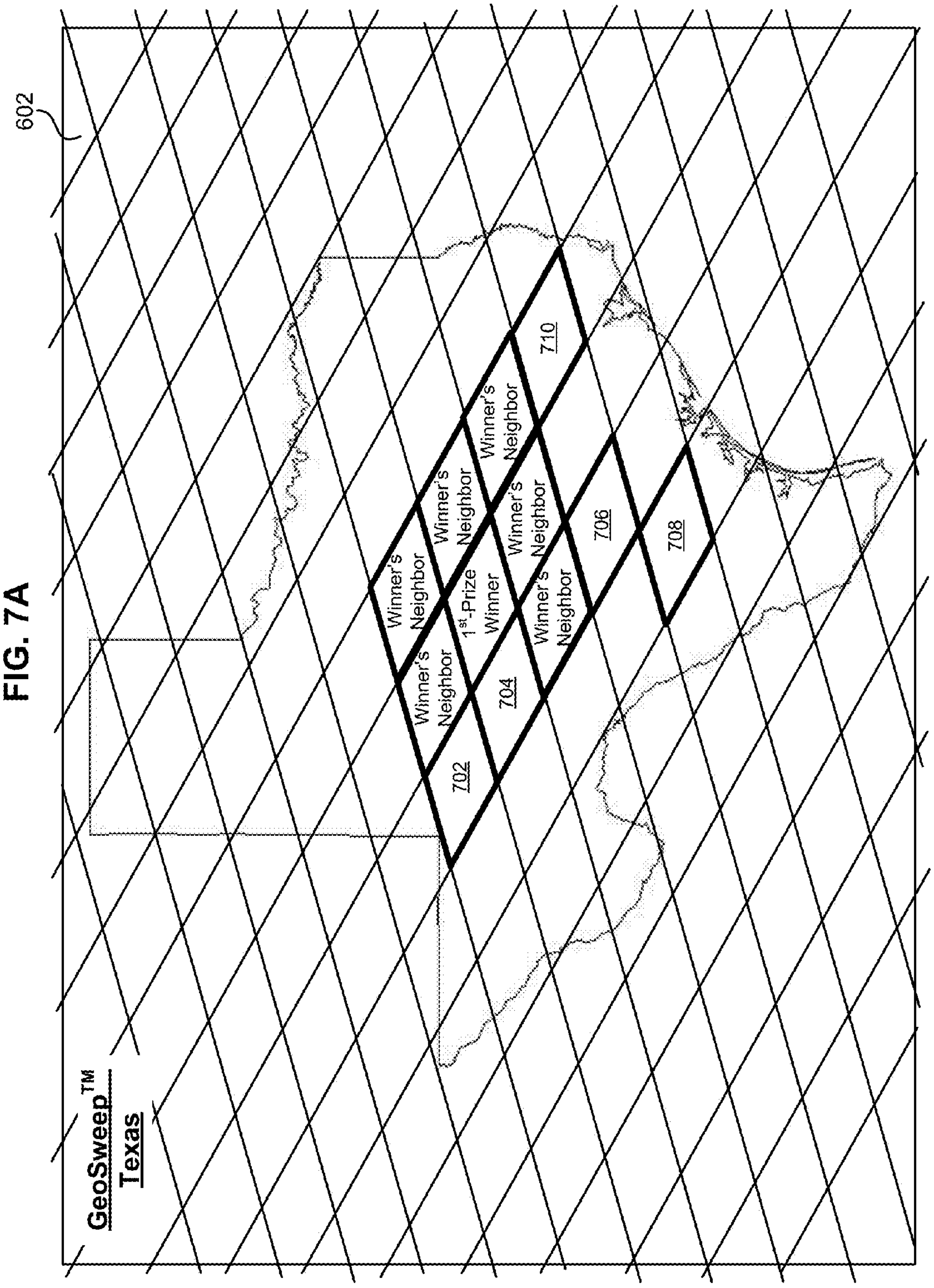
FIGS. 7A-B illustrate an exemplary payout structure in an exemplary GeoSweep game in accordance with one embodiment of the present invention.
Figure 7B:
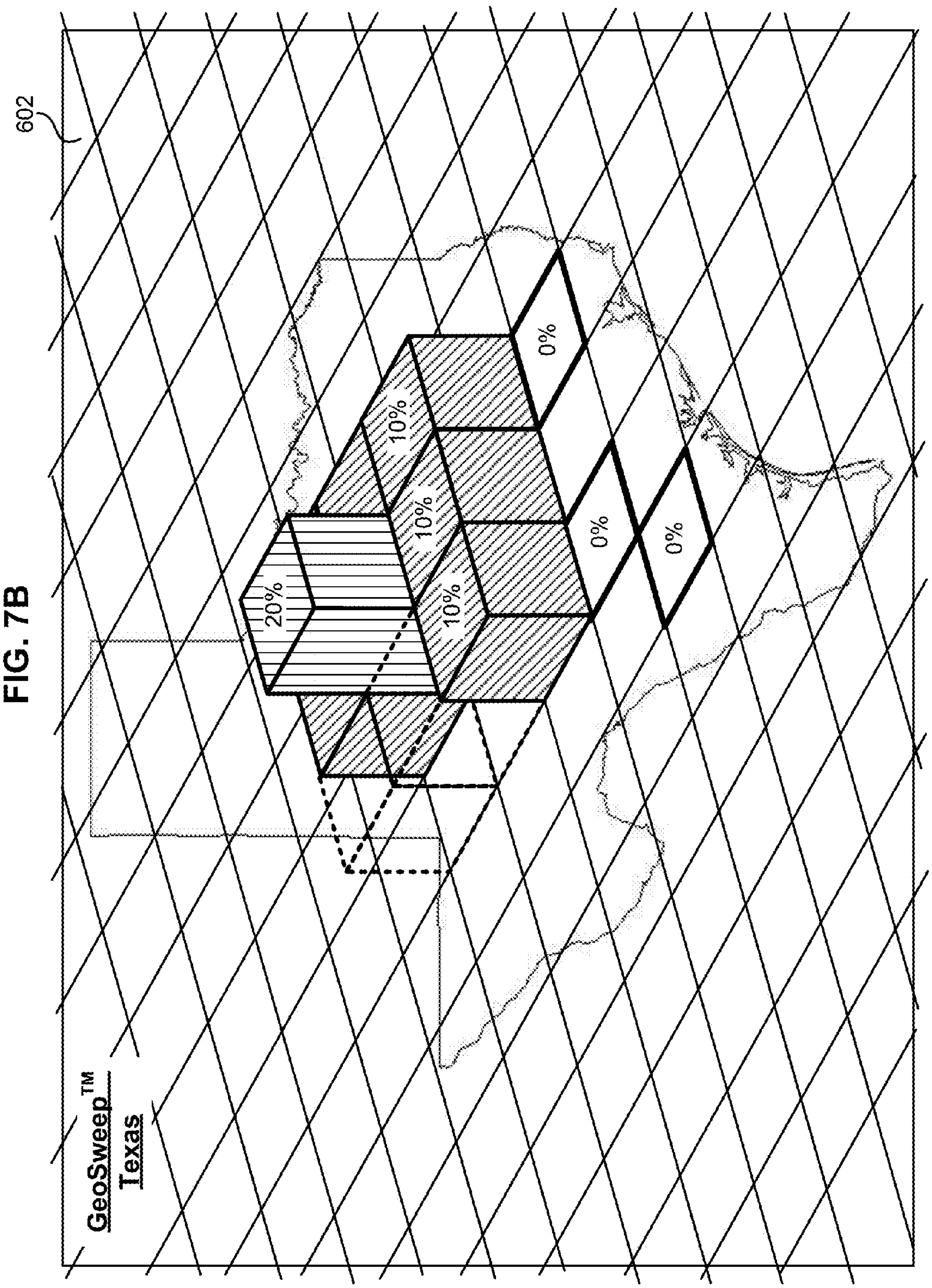

FIGS. 7A-B illustrate an exemplary payout structure for the GeoSweep Texas game described above.

FIG. 7A shows one grid unit that has been selected as a first-prize winner. That first-prize winning grid unit has eight neighboring grid units among which six are owned by participating players while the other two (702 and 704) are not owned by any player. Grid units 706, 708 and 710, which are owned by some players, do not share any common boundary with the grid unit selected for the first prize.

Referring to FIG. 7B, the first-prize winning grid unit may be allocated a prize amount that equals 20% of the jackpot available for that drawing. The eight grid units which happen to be the winner's neighbors may each be allocated 10% of the jackpot. Thus, were all eight grid units of the winner's neighbors owned by participating players, the entire jackpot would have been disbursed among owners of the nine parcels (i.e., $1\times20\%+8\times10\%=100\%$). However, since two of the winner's neighbors (702 and 704) are not occupied or owned by any player, the two 10% shares (i.e., 20% of jackpot) that would have been allocated to owners of grid units 702 and 704 may now be deemed not won by anyone and can be rolled over to the next drawing. The grid units 706, 708 and 710, which are further away from the first-prize winning grid unit than the winner's neighbors, do not win anything in this round of drawing.

According to one embodiment of the present invention, the GeoSweep game may include mechanisms to encourage player referrals. For example, in a GeoSweep Texas game where Texas is divided into 20 million parcels, a player owning 20 parcels may be gifted an additional unit for every new player that he or she refers. Each parcel has an equal chance of winning the first prize. Thus, the effect of the referral reward may be somewhat different from that in a proportional lottery-style game described earlier. In a lottery-style game, the referral reward has the effect of increasing the proportion of the prize that a referring player would win. Here, in a GeoSweep game, the referral reward has the effect of increasing the chance of winning.

According to another embodiment of the present invention, the GeoSweep game may also have a proportional lottery aspect to it. In that case, at or shortly after registration, a player in the GeoSweep Texas game may specify how many tokens to be entered for drawings on behalf of a parcel the player owns. The number of tokens entered for each drawing and on behalf of each parcel may be within a predetermined range, for example, between 1 and 100 inclusive. In a drawing, if a parcel is selected as a first-prize winner, then a proportional value may be calculated based on the number of tokens that have been entered on behalf of that parcel. For instance, if 100 is the maximum number of tokens that can be entered for each parcel and 45 tokens are actually entered on behalf of the first-prize winning parcel, then the proportional value is calculated to be 45% (i.e., 45/100). Next, that proportional value may be applied to whatever payout structure is applicable, such that the owner of the first-prize winning parcel will only be awarded a fraction (e.g., 45%) of the full first-prize amount. According to some embodiments, owners of the winner's neighboring parcels may be subject to the same proportional value applied to the first-prize winner. Alternatively, according to some other embodiments, the payout to a winner's neighboring parcel may be subject to a different proportional value calculated based on the number of tokens contributed on behalf of that particular parcel. Therefore, the above-described map-based payout structure may be used to determine full prize amounts for the winner's neighbors, whereupon such full prize amounts may be reduced according to the individual proportional values calculated for each of those parcels.

It should be appreciated that the above description of the GeoSweep Texas game is exemplary only. Numerous variations or modifications may be applied to that exemplary game, such as payout structure, grid geometry, and map subject.

Figure 8:
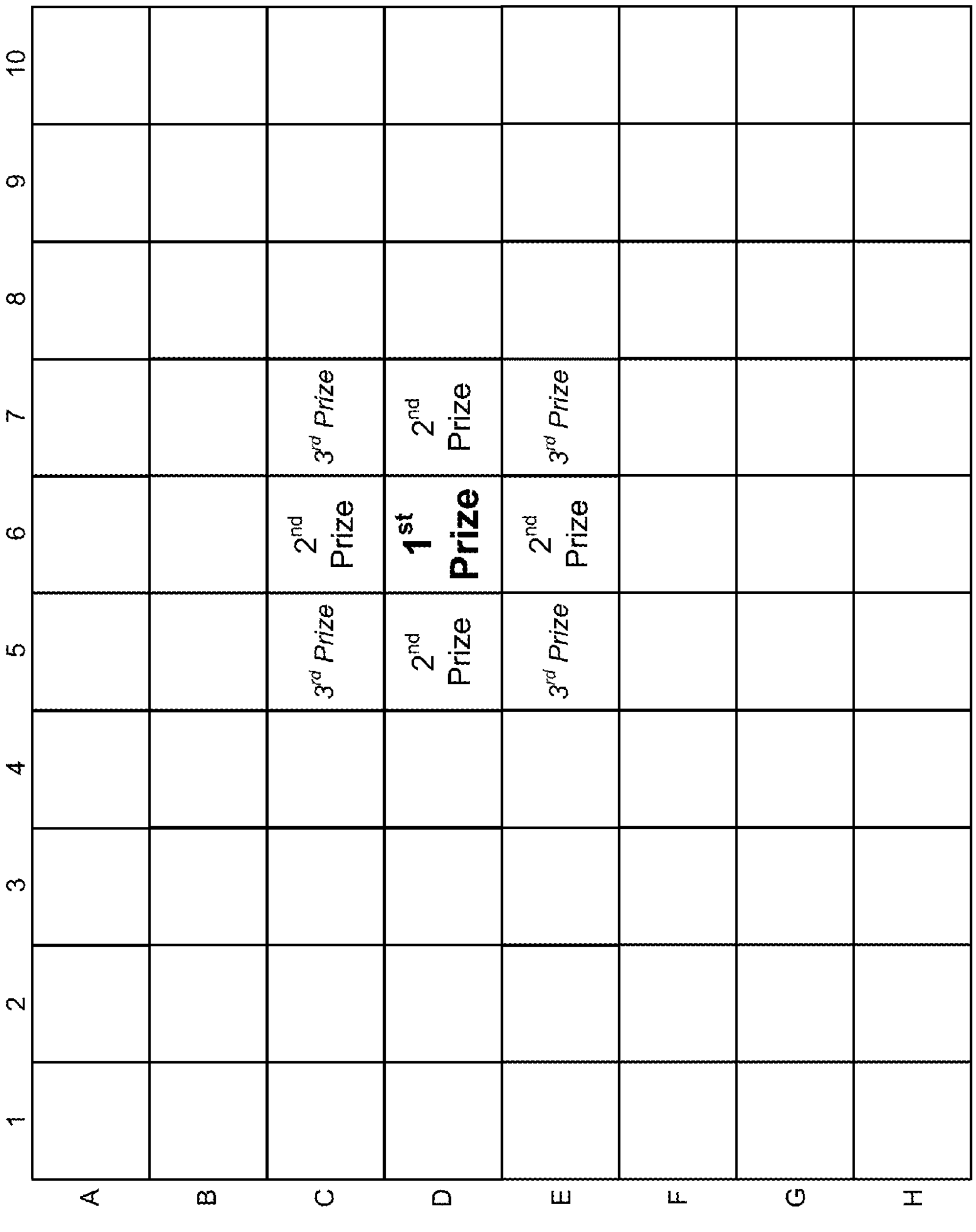
FIG. 8 illustrates an alternative payout structure in an exemplary GeoSweep game in accordance with one embodiment of the present invention.

FIG. 8 illustrates an alternative payout structure in an exemplary GeoSweep™ game in accordance with one embodiment of the present invention. In a grid with rectangular or square shaped units, cell D-6 may be selected as a first-prize winner during a drawing. Then, four closest neighbors of cell D-6 (i.e., D-5, D-7, C-6, and E-6), each of which shares one side with cell D-6, may become entitled to second prizes. Four other neighbors of cell D-6 (i.e., C-5, C-7, E-5, and E-7), each of which shares only one node with cell D-6, may be entitled to third prizes. The third prizes may be of a lesser amount than the second prizes, and the second prizes of a lesser amount than the first prize. For example, the third prizes may each be 5% of a jackpot amount, the second prizes may each be 10% of the jackpot amount, and the first prize may be 40% of the jackpot amount. According to another embodiment, the first prize may be 60% of the jackpot, the second prizes may share 30% (i.e., 7.5% each), and the third prizes may share the remaining 10% (i.e., 2.5% each).

Figure 9:
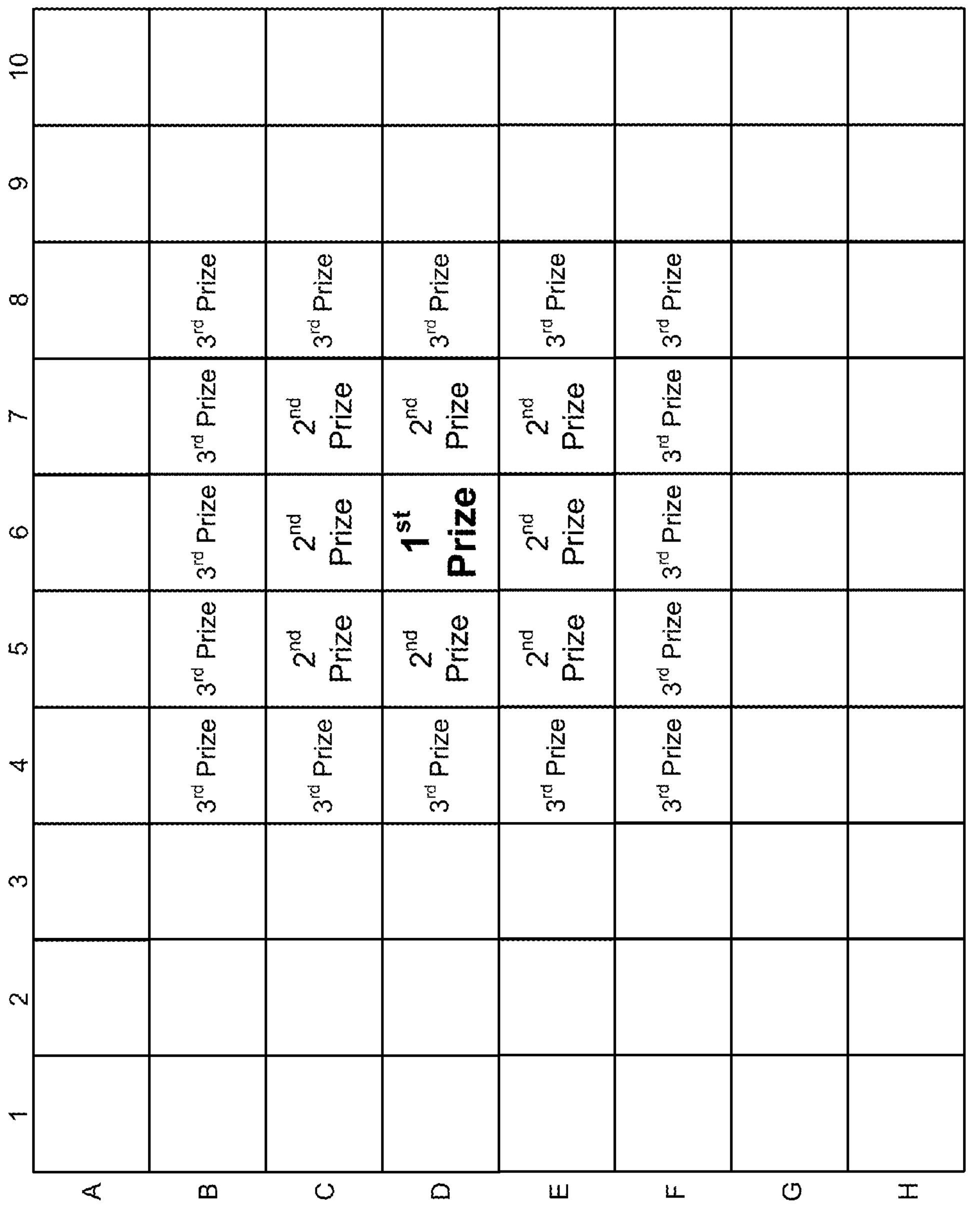
FIG. 9 illustrates another alternative payout structure in an exemplary GeoSweep game in accordance with one embodiment of the present invention.

FIG. 9 illustrates another alternative payout structure in an exemplary GeoSweep game in accordance with one embodiment of the present invention. In this embodiment, cell D-6 is again selected as a single first-prize winner. The eight neighbors of cell D-6 may become winners of second prizes. Further away from cell D-6, the sixteen next closest neighbors of cell D-6 may be winners of third prizes. For example, the first prize may be 68% of a jackpot, the second prizes may share 16% of the jackpot (i.e., 2% each), and the third prizes may share 16% of the jackpot (i.e., 1% each). According to other embodiments, additional "rings" of neighbors may be included as winners of even lesser prizes.

According to some embodiments of the present invention, two or more grid units may be selected as first-prize winners. A set of rules may be established to determine which other grid units qualify as second-prize winners, third-prize winners, and so on. For example, grid units which are immediate neighbors of the selected first-prize winners may win second prizes. Then, if the first-prize winning grid units are far apart from one another, there may be multiple pockets or clusters of prize winners, each pocket or cluster being centered around one first-prize winner.

Figure 10:
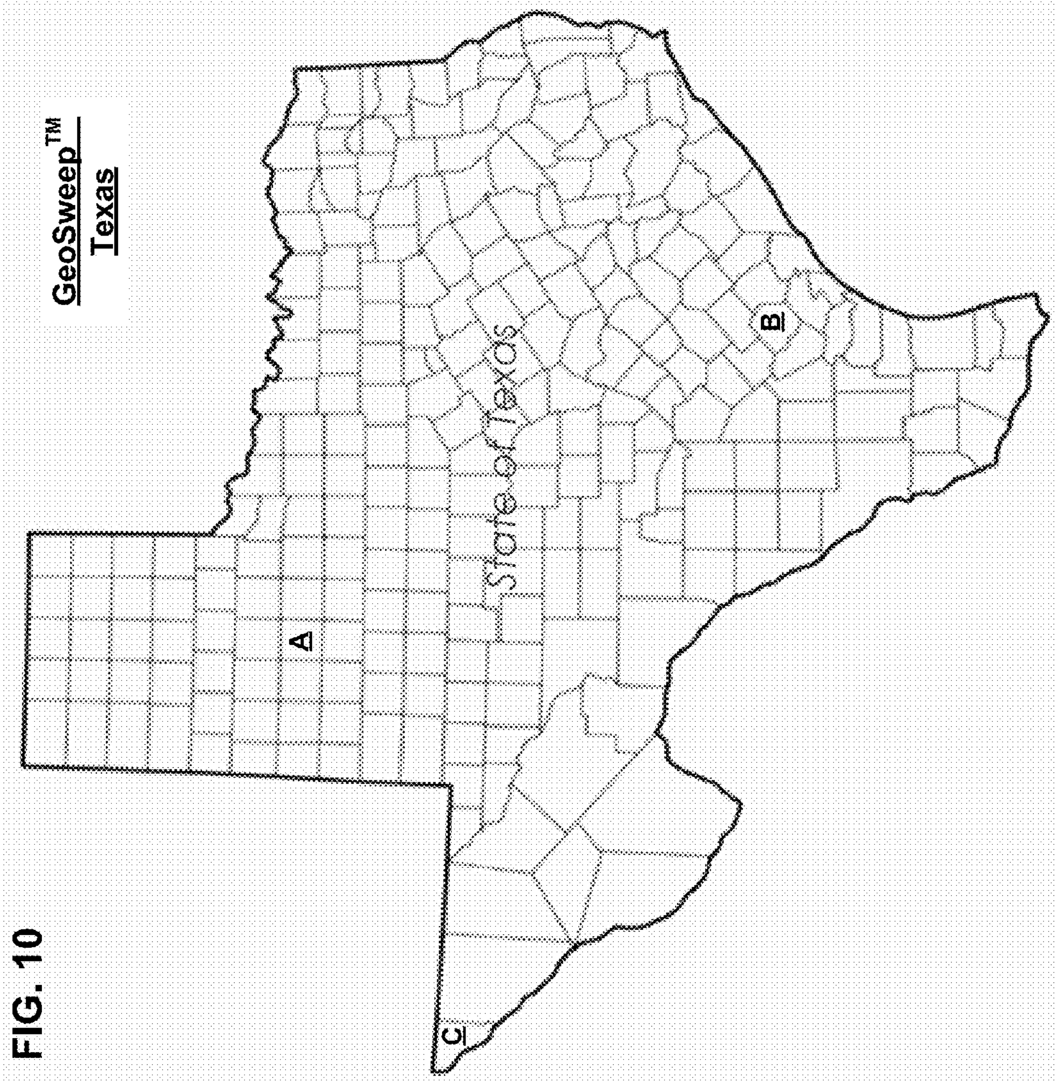
FIG. 10 illustrates an alternative method of establishing a grid or land boundaries in an exemplary GeoSweep game in accordance with one embodiment of the present invention.

FIG. 10 illustrates an alternative method of establishing a grid or land boundaries in an exemplary GeoSweep game in accordance with one embodiment of the present invention. In this version of the GeoSweep Texas game, rather than overlaying a uniform grid over the Texas map, actual boundaries among the Texas counties may help define grid units of various sizes and shapes. Alternatively, actual land boundaries may define grid units for the GeoSweep game, such that the GeoSweep grid units correspond to actual land parcels. According to one embodiment, every grid unit (e.g., county or smaller parcels) may still cost exactly the same to "own" and/or have the same chance of being selected as a winner. According to another embodiment, the grid units or counties may cost differently and/or have varying chances of winning based on size and popularity of each county or parcel. In some embodiments, game parameters associated with a parcel on the GeoSweep map may be correlated to or associated with the conditions, market value, and popularity of the corresponding piece of land in the real world.

Since the grid units are irregularly shaped and in a non-uniform grid, different grid units may have different number of neighbors. For example, County A has eight neighboring counties, County B has five, and County C has only one. Depending on which grid unit is selected as a first-prize winner, there may be at least one but up to eight immediate neighbors who may be entitled to a second prize. One solution is to designate a fixed percentage of the jackpot that each second-prize winner is entitled to. For example, if each second-prize winner takes 2% of the jackpot, then 9 neighbors of the first-prize winner will share 18% of the jackpot while 2 neighbors (if there are only two) will only take 4% of the jackpot. Alternatively, a fixed percentage of the jackpot may be shared among the second-prize winners regardless of how many second-prize winners there may be. In that case, if a first-prize winner has only one neighbor, such as the case of County C, that single neighbor will be the sole second-prize winner taking the entire amount that has been allocated to second prizes. If the first-prize winner has eight neighbors, such as the case of County A, the eight neighbors will each take ⅛ of the entire amount that has been allocated to second prizes.

Many variations of prize-sharing schemes may be implemented for GeoSweep and/or proportional lottery-style games. In one embodiment, players that were introduced to the game by an existing player may share some of their winnings with that original (referring) player. In a further embodiment, groups of players may form prize-sharing clusters or syndicates.

Although a map of the State of Texas is used above as an example, it should be appreciated that maps of other types of geographic regions (e.g., township, city, county, country, ocean, island, and continent) may also be appropriate in GeoSweep games in accordance with embodiments of the present invention. For example, there may be GeoSweep USA, GeoSweep Europe, GeoSweep London, GeoSweep Hawaii, and so forth. In fact, a GeoSweep game may be established for a tourist destination and help promote tourism by offering prizes related to that destination or portions thereof. For example, a GeoSweep Alaska game may offer free roundtrip airline tickets as or in addition to a first prize. The game may also offer free hotel accommodation in hotels that happen to be located within a winning grid unit. Since the GeoSweep games are map-based and/or location-specific, promotional opportunities and variations are almost endless, as will be appreciated by those of ordinary skill in the art of advertising and marketing.

Figure 11:
FIG. 11 illustrates another alternative method of establishing a grid or land boundaries in an exemplary GeoSweep game in accordance with one embodiment of the present invention.

FIG. 11 illustrates part of a New York City map to be used in an exemplary game which may be referred to as "GeoSweep Big Apple." As shown, the actual streets and avenues in mid-town Manhattan may serve to define grid units for the GeoSweep game. Local residents, business entities, and/or tourists may be encouraged to participate in this game. Each potential group of players may be offered different incentives. A local resident may be interested in virtual ownership of a street block that he or she actually lives on, and participation in the GeoSweep game may also be a social networking opportunity with other community members. A local business might be interested in sponsoring promotions and placing its name on the GeoSweep map. In fact, the GeoSweep map may be an online, interactive map with promotional and informational features. A tourist may also be interested in the game for various reasons, such as to get familiar with the area and to win travel-related prizes offered by local businesses.

Free2Play Games

In certain preferred embodiments, the GeoSweep game may be played without costs to the players. In these instances, the sweepstake-style game includes the use of advertisements to contribute to the jackpot and/or to cover other costs associated with game operations, thereby allowing players to play for free. Many of the features discussed in connection with embodiments of this game, which may be called Free2Play, may be incorporated into the embodiments of GeoSweep™ and others discussed herein.

Figure 12:
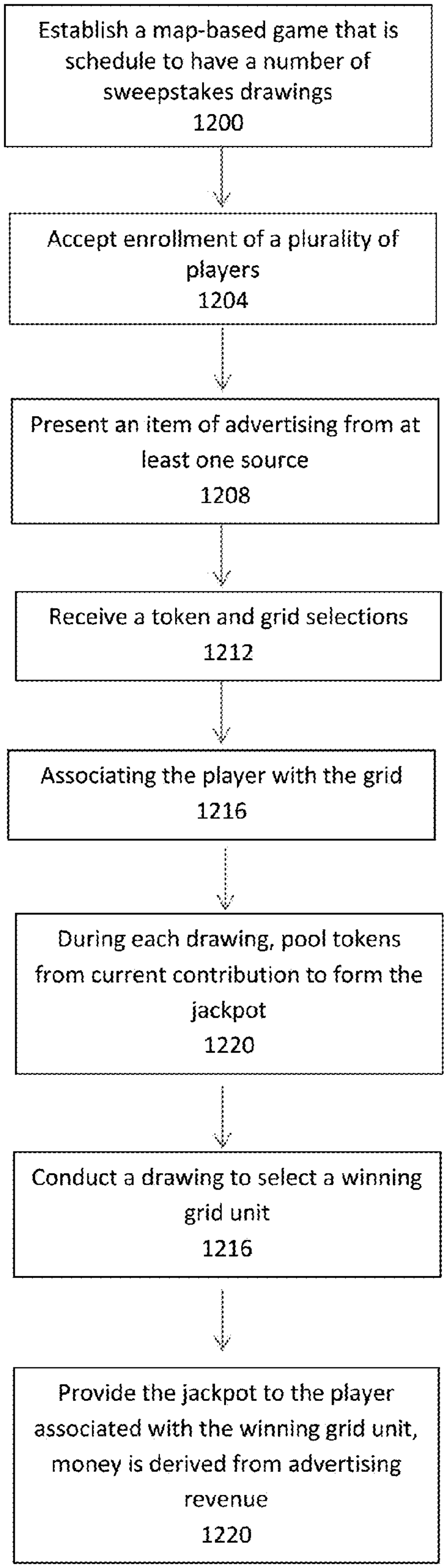
FIG. 12 is a flow chart illustrating an exemplary method of facilitating a sweepstakes-style game in accordance with one embodiment of the present invention.

Referring now to FIG. 12, there is shown a flow chart illustrating an exemplary method of facilitating a sweepstake-style game in accordance with the Free2play embodiments. In step 1200, a sweepstake game may be established in a similar manner to the GeoSweep™ lottery-style games disclosed above. The game may be established online and may be accessible via any Internet browser. Through the Internet browser, the game's map is shown to contain a plurality of grid units. The maps and their grid units may contain the same attributes as with those of GeoSweep™ as described above. In addition, real world or, alternatively, fictional areas of land may be used as a map in the game. A grid pattern is shown overlaying or dividing up each map, thereby creating the plurality of grid units (referred to in GeoSweep™ games as Geos). The sizes of these maps, the number of grid units, the shape and sizes of the grid units may differ accordingly from map to map.

The sweepstake drawings may take place according to a schedule and/or may occur on a periodic basis. The players of the game may themselves determine the schedule of any drawings. One method in which this might be made possible is by designating an administrator who may be in charge of setting the schedule or by allowing players to vote for certain schedules. Rules, terms of conditions may be similarly established similarly to those of GeoSweep™ games.

Next, in step 1204, a plurality of players are accepted for enrollment to play the game. Like GeoSweep™, players may be enrolled by visiting a game's website and registering with the game. Information about the players, at that point, may be recorded for administrative use. In most cases, there will not be a limit to the number of players that may be enrolled in the game. It would be beneficial to have as many players play the game as possible as, as more players results in higher advertising revenue. In one embodiment, however, only a predetermined number of players are allowed to enroll for each map or participate in each Free2Play game, creating a sense of privilege for the selected few, which in turn may entice even more people to vie for an opportunity to enroll in subsequent games. Unlike GeoSweep™, the players of this style of game do not need to commit to participate in a number of scheduled drawings. According to some embodiments, players may decide, from drawing to drawing, whether he or she would like to participate.

When a player is enrolled in the game, he or she will receive a predetermined number of tokens to play each round without costs to the player. As used previously, a "token" may be or represent any physical or virtual thing of value that can be counted or quantified such as cash, credit, or simply a basic unit of monetary or virtual value that may be exchanged for services, merchandise, and general items of interests. Here, in the Free2Play context, a token may not be exchanged directly for things of value other than an opportunity to win in a Free2Play GeoSweep game. The number of tokens given to a player may vary from time to time, from player to player. For example, a player may receive one or more tokens to play when the player watches a television commercial or select an advertisement. The player may also receive extra tokens when he or she uses a social network function of the game or shares his or status with an external website. As another example, a player may receive additional tokens when he or she plays at an off-peak time of the day (e.g., during early morning hours) or on a less busy day of the week (e.g., Monday) when participation level in the game is typically low.

If he or she would like to increase his or her chances of winning, the player may purchase additional tokens to play. The player may also purchase tokens in bulk at a discounted rate. The player may spend the tokens that he or she receives over a number of rounds. In one embodiment, the tokens that are given to a player for free may expire after a certain period of time, if not used. However, tokens that were purchased may last until they are spent. The player may also take part in online surveys, view online advertisements, view in-game advertisements, or increase activity level at social networking or blogger websites to earn tokens.

At step 1208, advertisements from one or more sources (e.g., third-party sponsors) are presented to the viewer. Advertisements include any form of communication, visual or otherwise, that delivers information for the benefit of the advertiser. Thus, advertisements may be in the form of an image (static or animated) such as a banner advertisement similar to that of a billboard; in the form of an audio presentation such as an audio commercial; in the form of a video presentation such as a television commercial; or any combination thereof.

Additionally, there could be any number of advertisement sources and could include any company or persons who may be interested in promoting an idea, a product, or a service. The sources of advertisements and therefore the advertisements presented will differ from player to player. The game may be able to detect a player and his interests and display an advertisement according to these interests. In order to accommodate for the wide range of users that are playing the game, the game may have access to advertisements from various sources that cover diverse interest.

Advertisements may be received by players of the game in numerous manners. For example, the advertisement source may manually upload its advertisements to a server where it may then be accessed by the players. Alternatively, the game may have the capability to retrieve the advertisements from a plurality of sources. In a preferred embodiment, the players are provided with addresses to the advertisements. This would allow third party sources to quickly change or update items of advertising without having to upload manually every advertising item that have been updated.

The advertisements may be presented to the players in a variety of manners. Particularly, advertisements may be presented to the user internal or external to the game. In-game advertisements may be shown to the players through a traditional banner advertisement. Popups may also be presented to the players in the game. In that case, a window is shown overlaying the map presented to the user. Additionally, a click-through advertisement may be presented to the player in the form of a full or restrictive window that requires players to view its advertisements before the player is able to perform a certain action. For example, the game may require the player to view an advertisement before he or she may see the map of the game. The player may also be required to view an advertisement before his or her grid unit selection is processed. The player may also be required to select on a link to visit a sponsor's website. In another embodiment, the user may be required to periodically answer a survey that is presented to the user in the game. Upon the player' submission of his answers to the survey, the player may be able to play the map-based game for additional lengths of time. Upon viewing one or more advertisements, a player's Free2Play account may be automatically credited one or more tokens or the player may be immediately directed to the Free2Play game interface to enter the game.

In one preferred embodiment, advertisements are embedded into the map of the game. As will be discussed in further detail below, images or videos may take up the equivalent space of one or more grid units or objects in the map. In embodiments wherein the map is a real location, pins (or other icons) on the map may directly correspond to one of the sponsors' stores. In one additional embodiment, grids are grouped together to form islands or territories similar to states of the United States with each territory being sponsored by an advertiser. The name of the territory may be the name of the sponsor or a name associated with the sponsor. For example, one large game may contain the entire continental United States including its large cities and with each grid units in the game representing a city block. In this game, sections of cities may be associated with a particular sponsor. For example, a baseball team, such as the New York Yankees, may sponsor the entire city of New York. Thus, the region may be called the Yankees Nation for a period of time. Other sponsors who are willing to pay even more, may sponsor an entire state or an entire region of the map such as the Midwest. In some embodiments, regions within a sponsored region may also be sponsored. Thus, even though the city of New York may be sponsored and be called the Yankees Nation, a certain city block may also be sponsored by another business. In many of these embodiments, players who play in certain territories may be eligible to receive prizes directly from that sponsor.

Advertisements external to the game may also be presented to the players. For example, images, videos, and audio may be presented to the players on a website external to the game. Advertisements on television, billboards and radio may also be used. Sponsors may direct the players to a particular website or distribute special codes that can be used to redeem extra tokens. In fact, according to some embodiments of the present invention, a player may simply visit any third-party website or view sponsored advertisements anywhere on the web, whereupon the player may be given a unique code with which he or she could either redeem token(s) at the Free2Play website or directly gain an entry into the game. This way, there is no need for direct links between the Free2Play website and sponsors' websites.

Any number of the above-described forms of advertisement presentation may be used in combination. In fact, it may be most beneficial to use a combination of advertisements in order to maximize advertising revenue received. However, one of ordinary skill in the art would understand that using advertisements to a level of excess may be counter-productive to the growth of revenue received as players may begin to resent such efforts.

At step 1212, a token and a player selection is received. A player may enter his or her commands through a device that includes a user interface and peripheral devices previously described. Upon confirmation that the user would like to play a particular grid unit for the next drawing, the user may be asked to confirm his or her desire to spend one or more tokens. In other embodiments, the game may be configured to automatically spend the default number of tokens upon a user selection of a grid unit.

After the player's tokens and selections are received, the player is automatically associated with the grid unit that he or she has selected with a requisite contribution of tokens, as seen in step 1216. A record may be kept that ensures that when the drawing takes place, each grid unit's association can be tracked. Thus, a table may be kept that continuously tracks and identifies each grid unit and each unit's corresponding associated player. The table, for example, may record the player's associations based on the unique player ID. Alternatively, a table may also be kept for each player that identifies each player's associated grid units. These tables may also contain information describing how many tokens were contributed for each associated grid unit and other player selection information. The tables may be archived after a round has been completed and the jackpots have been distributed.

When a drawing is conducted, a winning grid unit may be chosen from the map (step 1220). A random drawing from all of the grid units in the map may be achieved in a number of computational methods well known in the gaming industry. In one simple example, each grid may be assigned a unique grid unit number starting at 1. If there are 64 grid units in the map, then they will be numbered 1 through 64. A drawing is then conducted by running the random number generator to select a number 1 through 64 to find the number corresponding to the winning grid unit. It is then checked whether the grid unit has an associated player. The table containing the grid units and each grid unit's corresponding associated player may be checked to find the winner, if any. If the drawing is not limited to those "participating" grid units (i.e., those selected by players for this particular round of prize draw), the winning grid unit may not have been selected by any player. In these cases, the prize may then be added to the next drawing's prize. In order to guarantee there will be a winner emerging from each prize draw (otherwise players might be discouraged from participation), it may be preferable to exclude unoccupied grid units from the random drawing. According to some alternative embodiments, two or more winners may be selected for each drawing. In other embodiments, a drawing is conducted from only a portion of the map's plurality of grid units. As another example, a drawing may be conducted only among the grid units in a region of the map. Thus, such a drawing may be used to give those in a specific region a bonus drawing in order to, for example, promote the area of the map or sponsors in that area.

The jackpot is then provided to the player that is associated with the winning grid unit (step not shown). According an embodiment of the present invention, a single winner may be selected for each lottery drawing. Jackpots may also be given to multiple users by performing multiple random drawings. In one embodiment, a portion of the jackpot may be given to players with associated grid units within the proximity of the winning grid unit, in a manner described above. They may also share a jackpot on equal footings or according to an award hierarchy. The jackpots that are awarded to players are derived from some of the advertising revenue received from presenting advertisements to the players. The jackpots may also be funded by token sales revenue. Although players do receive tokens for free at each round, many players will have the desire to increase their chances of winning the jackpot. In addition to the jackpot consisting of cash prizes or merchandise, in-game tokens may be given from time to time to ensure that budgets are maintained.

Figure 13:
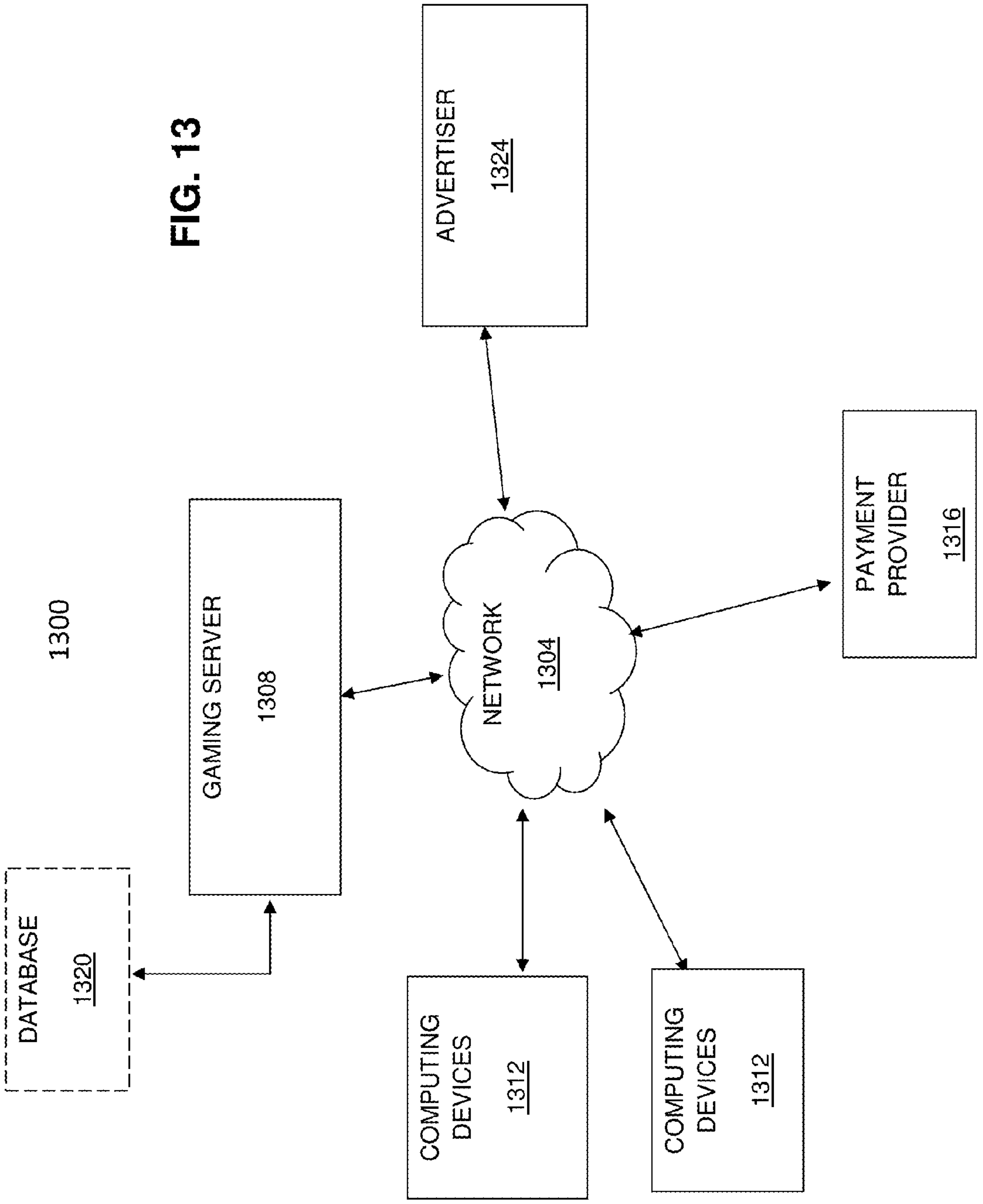
FIG. 13 is a block diagram illustrating an exemplary system for facilitating sweepstakes-style games in accordance with one embodiment of the present invention.

FIG. 13 is a block diagram illustrating an exemplary system 1300 for facilitating sweepstake-style games in accordance with one embodiment of the present invention. FIG. 13 depicts a gaming server 1308 connected to at least one database 1320. The gaming server 1308 is connected to network 1304, which allows communications with a plurality of computing devices 1312, payment provider 1316 and advertiser server 1324. The gaming server 1308, computing devices 1312, payment provider 1316, network and database of FIG. 13 have many of the same capabilities of the corresponding devices described in connection with FIG. 4. The underlying hardware and software structure of each of these devices, therefore, will not be discussed in detail. The capabilities of the devices of FIG. 4 and their embodiments may be incorporated into the corresponding devices in FIG. 13. The following will discuss the additional features and devices in detail.

The gaming server 1308 will enroll a plurality of players, each of whom are connected from various client devices 1312. The gaming server 1308 will have the capability to enroll a plurality of players. It would certainly be beneficial from a revenue standpoint, to enroll as many players to play the game as possible. However, there may be certain cases in which the game may be limited to a small number of players. This may be due to the physical limitation of a gaming server 1308 or it may simply be the game host's desire to set a limit the type of players. For example, a school may only allow its students to participate in an instance of the game. In such cases, invite codes may be generated and may be required in order to register and enroll in the game.

The gaming sever 1308 also has the capability to receive from players at client devices 1312 at least one token and a selection of at least one grid unit for the current drawing. In response, it will associate each player with his or her respective grid unit as selected. The server will continue to update its database 1320 in a manner previously described in connection with system 400. Furthermore, by executing the instructions at gaming server 1308, the tokens of each round are pooled together similarly to the pooling capabilities of gaming server 402. The gaming server 1308 then has the capability to conduct a drawing to select at least one winning grid unit to win the jackpot. After determining the winning grid unit, the gaming server 1308 will access database 1320 to determine the player associated with the winning grid unit. The gaming server 1308 then has the capability to provide the jackpot to at least one player associated with the at least one winning grid unit. In one embodiment, the financial information of the winning player is updated to include the jackpot. Alternatively, the gaming server may transmit to the player's bank account at the payment provider 1316 an electronic money transfer order in the various methods known in the art.

The gaming server of 1308 additionally has the capability to present the players of the game with advertisements. The advertiser server 1324 of system 1300 stores a plurality of advertisements at the advertiser server 1324. The advertiser server 13024 may contain a database of advertisements that is publicly accessible to a plurality of computing devices 1312 and the gaming server 1308. In order to provide the players at the computing devices 1312 advertisements, the gaming server 1308 will transmit to the computing devices 1312 an address to the advertisements at the advertiser server 1324. Upon receiving this address, the computing devices 1312 then has the capability to access the address and directly download the advertisements from the address for display at the computing device 1312. In one alternate embodiment, the gaming server 1308 may download any advertisements from the advertiser server 1324 and then transmit these items of advertisements to the computing devices 1312 for display. In another embodiment, the advertiser server 1324 will upload to the database 1320 its advertisements. The computing devices 1312 may then access the advertisements directly from the gaming server 1308 using the various methods well known in the art.

The database 1320 may further have the capability to store information related to the advertisements and the advertiser server 1324. Particularly, in addition to information related to the players (e.g., name, email address, password, preferences), information related to technical functions (e.g., internet protocol address), information related to player financial information (e.g., bank name, bank account number, credit card number, addresses, payment history), information related to the play history (e.g., history of specific grid units chosen, winning data), and information related to the players' current selection of grid units for the current drawing, the database 1320 further contains information related to advertisements including the address of each advertisement, the type of advertisements and various other technical information that may be required to display each advertisement correctly at the computing devices 1312.

As previously discussed, the gaming server 1308 further conduct a drawing to determine a winning grid unit and present to the player that is associated with the winning grid unit the jackpot. In particular, the presented jackpot in these embodiments are at least partly derived from revenue received for presented advertising. From time to time, such as every month, the advertiser server may transmit to the payment provider 1316 an electronic money transfer order intended for the organization associated with the gaming server 1308 in exchange for the gaming server 1308's presentation of the various advertisements to the players at computing devices 1312.

Figure 14:
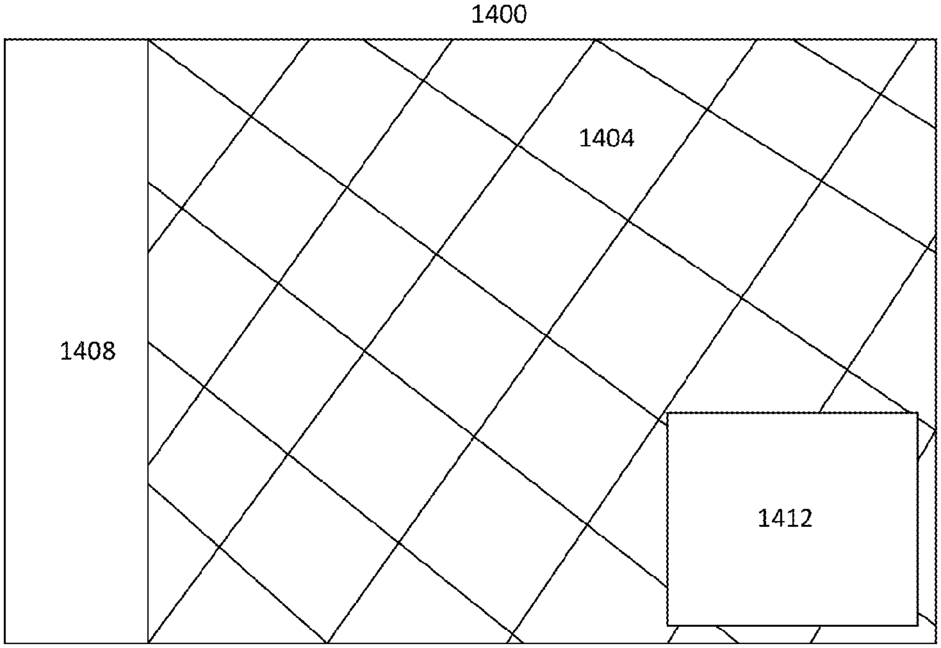
FIG. 14 illustrates an exemplary user interface of one embodiment of the system containing advertisement.

The gaming server 1308 further may present advertisements to the players using several different methods. In one exemplary embodiment depicted in FIG. 14, advertisements may be presented to the player through the banner advertisements. Thus, the user interface 1400 displayed at a computing device depicts a map 1404 with a banner advertisement 1408, in this case, to the left side of the screen. This and other depictions are by no means the only manner in which these form of advertisements may be shown as part of user interface 1400. In certain embodiments, and as shown in FIG. 14 as well, an advertisement may be presented in the form of an overlaying image over the map 1404. In the ordinary case, the advertisement 1412 would only take up a small portion of the screen so as to not obstruct the view of the map 1404. In these disclosed embodiments, selecting the advertisements 1408, 1412 or other forms of advertisements results in a pop up screen that displays a related website. In certain embodiments of the disclosed system, a click-through advertisement is presented to the player. In these cases, the player must view the advertisements prior to entering the game, prior to submitting his or her selection of a grid unit or at intermittent periods.

Figure 15:
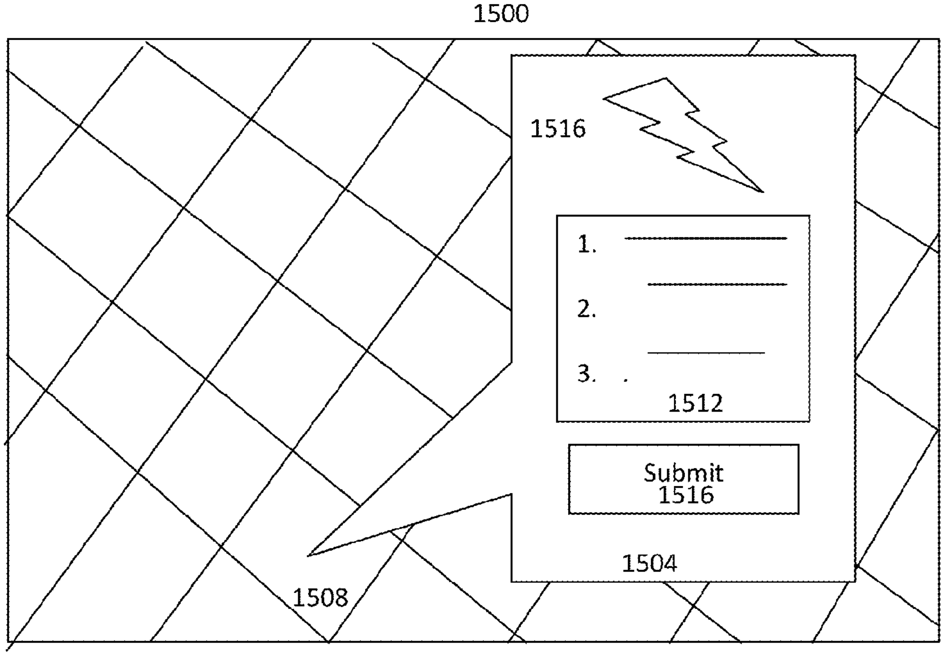
FIG. 15 illustrates an exemplary user interface of one embodiment of the system containing a different manner of presenting advertisement.

In another embodiment illustrated in FIG. 15, the user may be required to answer a survey prior to his or her selection of a particular grid unit may be processed by the gaming server 1308. Thus, when a player selects a grid unit 1508 shown in user interface 1500, a menu 1504 is shown. An advertisement 1516 may be shown. The advertisement 1516 may be an image, a video clip or an audio clip. A survey 1512 is shown in menu 1504 that asks various questions. Such surveys are often very important and valuable to advertisers and businesses. Once the questions are answered, the user may select the submit button to submit his or her survey and to automatically have the grid unit associated with his account.

Figure 16:
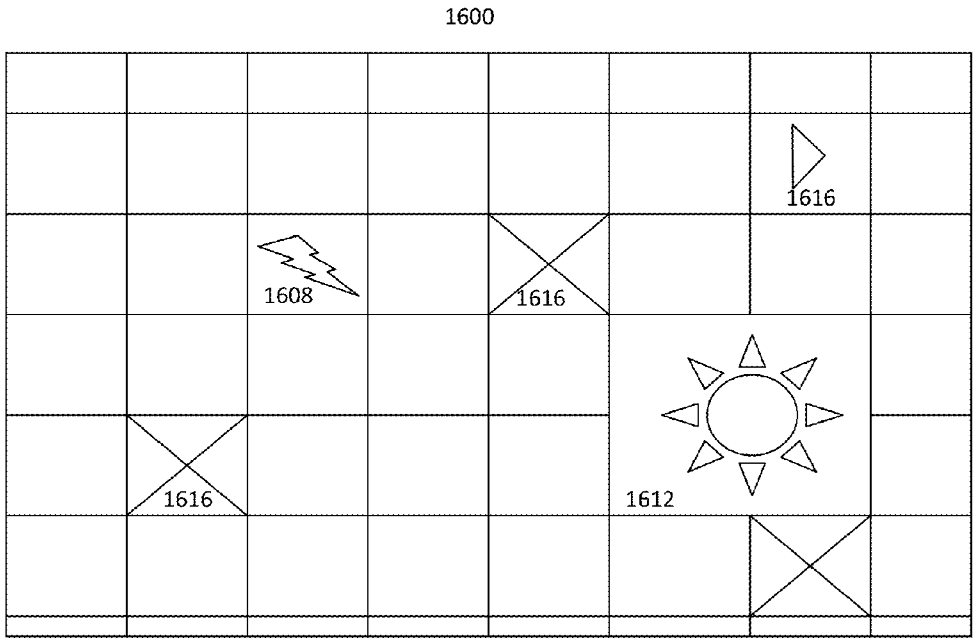
FIG. 16 illustrates an exemplary user interface of one embodiment of the system containing advertisement in various grid units.

In several preferred embodiments, advertisements are embedded into the map of the game. An exemplary embodiment is depicted in FIG. 16. An interface 1600 is shown depicting a map containing a plurality of grid units. FIG. 16 further depicts several grid units 1616 that have already been selected by another player. FIG. 16 also depicts embedded advertisement 1608, 1612 and 1616 in the map of the game. Advertisement 1612 is a video advertisement. Upon selecting advertisement 1612, a video is shown within the grid unit in which the advertisement 1612 resides. In certain embodiments, the video advertisements automatically play when the entire grid unit of the advertisement is entirely depicted in the user interface 1600. FIG. 16 further depicts an audio clip 1616 that may play automatically or upon selection. In the preferred embodiment, the players that select an advertisement may be automatically associated with the respective grid unit for at least one drawing. The player would win the jackpot if the grid unit is selected as the winning grid unit.

Figure 17:
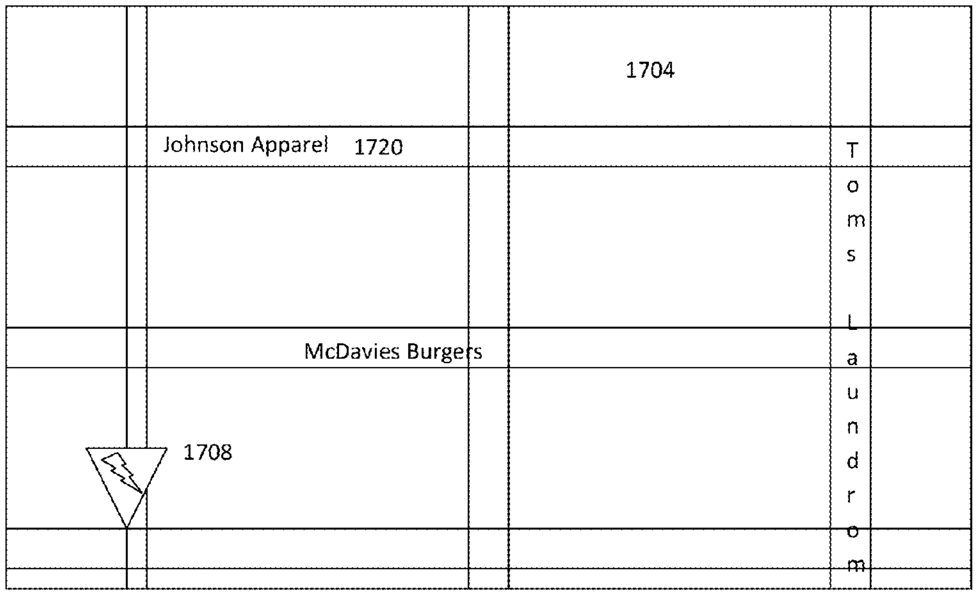
FIG. 17 illustrates an exemplary user interface of one embodiment of the system containing presenting advertisement in a map of real world locations.

In another embodiment, the map depicts real-world locations such as the map depicted din FIG. 17. It contains a plurality of intersecting streets and roads and a plurality of city blocks such as block 1704. The city blocks, in this embodiment, are equivalent to the grid units. In this embodiment, the street names may be names of advertisers. For example, John Apparel may place their advertisement along the street. The advertisement may be a name, a phrase or even a short announcement. This manner of advertisements allows advertisements to be non-obtrusive while still providing the players with exposure to them. In yet another embodiment, also depicted in FIG. 17, a pin or icon may be placed in a map. Each pin or icon may depict an advertiser's logos or products. The location of these pins or icons may correspond to the real world location the advertiser's business. In one additional embodiment, the system allows for the presenting of a map that depicts a group of grid units in the form of an island. Each island of grid units may be sponsored by an advertiser such as a business and named as such.

GeoSweep Treasure Hunt

One embodiment of GeoSweep™, called the GeoSweep Treasure Hunt, will now be described. In this variation of the GeoSweep game, at least one prize, or "treasure," may be hidden in a map and in particularly, a grid unit. The goal of the game is for the players to find the one or more treasures hidden somewhere in the map. Generally, when the game begins, players take turns choosing grid units to determine whether that grid unit contains a prize. This continues until all of the prizes have been found on the map, whereupon the game ends. The game may then be restarted. Unlike traditional lottery games, the presently disclosed embodiments establish a game that may have increasing chances to win even while the jackpot is also increasing. In addition, the presently disclosed embodiments may require strategies in order to maximize one's winnings, unlike traditional lottery games which are based on chance only.

Figure 18:
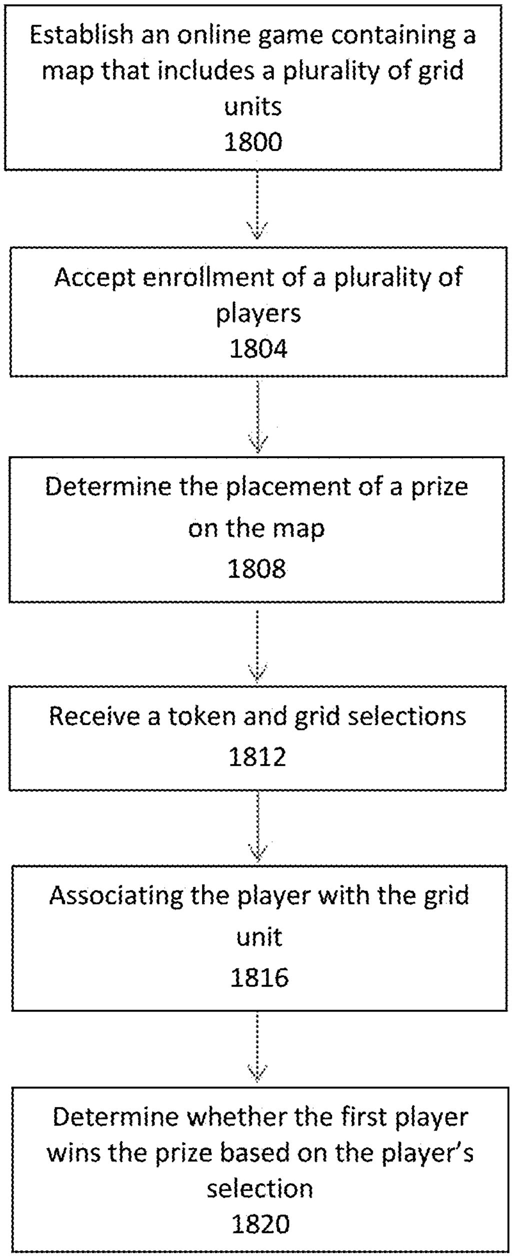
FIG. 18 is a flow chart illustrating an exemplary method of facilitating a prize-searching style game using predetermined play in accordance with one embodiment of the present invention.

FIG. 18 depicts one particular embodiment of the GeoSweep Treasure Hunt. At a first step 1800, an online game is established containing map that includes a plurality of grid units. The disclosed map may be similar to those already described with respect to the other embodiments of the present invention including GeoSweep™. Particularly, it may be a map of a real world location or it may be of a fictional place. A plurality of grid patterns may be overlaid on the map, thereby creating a plurality of grid units on the map. Grid units may be any shape or sizes and may even contain multiple layers. In certain embodiments, the grid units may be associated with information about each grid unit including the grid unit ID or the grid unit coordinates on a map.

Next, at step 1804, enrollment of a plurality of players takes place. Players, for example, may load up an Internet web browser to access the game. Before a person may play the game, he or she may have to register as a user with the game. In addition, enrollment to the game may be temporary or permanent. That is, the user may simply be enrolled as a temporary user in order to play the game in that instance. No personal information may be stored in such cases. In the alternative, a user may be enrolled to play the game as a permanent player whereby information about the user is requested, gathered and saved. Such information may include the person's name, username, login information and any other desired address fields. In certain embodiments, financial information about the user may also be stored as part of the enrollment process. In particular embodiments of the present invention, players are enrolled simply by playing the game and neither registration nor log-in is not required in any manner or form, though some form of age and/or residency validation may nonetheless be required for a player to claim a prize.

At step 1808, the prize's location on a map is predetermined prior to any player's selections or token submissions. Thus, prior to any actions by the players, the prizes are hidden throughout the map in grid units. As such, the prizes are not indicated in any way on the map. For example, where there are two prizes available, each prize may be hidden at a different grid unit. However, in certain embodiments, more than one prize may be placed at particular a grid unit.

The location of each prize may be randomly generated by a random number generator well known in the art. In such cases, each grid unit may be associated with a particular number. Thus, where there are 100 grid units, the random location of one prize may be determined by generating a randomly generated integer number, n, using the random number generator for a number from 1 to 100. Where the grid units have unique IDs ranging from 1 to 100, the random location, therefore, is determined to be the grid unit with the unique ID equal to the generated number. Where the unique IDs of the grid units are not all in the range from 1 to 100, then they are placed in some canonically ordered list (for instance in ascending order of ID if the IDs are numbers) and the nth grid unit in that list is selected as the random location. Where there are a number of prizes, the generator may be invoked again, for example, to pick from all possible combinations of grid unit locations wherein each combination represents one possible way of hiding the treasures. Another method of generating a number may be based on a predetermined routine that considers various factors including historical user selection data, historical jackpot winning history, the number of numbers to be generated and other factors. Examples of possible number generators that may be used include standard random number generators (RNG), pseudorandom number generators (PRNG), and cryptographically secure PRNG. Some embodiments determine the placement of a prize on the map by generating two numbers that may correspond to the coordinates. In a simple example, where a map comprises of 8 by 10 grid units, the number generator may randomly pick two numbers: one with the range of 1 to 8 and a second number with a range of 1 to 10. This way, a coordinate, such as (5, 2) may be generated. Where the size of grid units varies or they are not in a rectangular configuration, this may introduce bias—i.e., some grid units may grant players a greater or lesser chance of being chosen than others. This bias can either be corrected for in the probability algorithm or retained as a feature of the game—for instance by varying the price and/or prizes for grid units with non-average probabilities of being selected. In some games with real world locations, longitude and latitude coordinates may be used. Upon the generation of the number, the number is then stored for later comparisons.

Next, at Step 1812, a token and a grid selection is received. Each token represents a unit of wager in the game and, in this particular instance, represents a wager that there is a prize hidden at the selected grid unit. In a preferred embodiment, a player may only select grid units that have not been selected (or "unlocked") by other players and therefore are still available for selection. This may prevent players from wasting their tokens since any prize that may have been at that previously selected grid units would have already been awarded to the other player. In some embodiments, selection of multiple grid units still results in a sequence of individual wagers—one per grid unit selected—and, in the event that the game terminates after one of these wagers, the remaining unplaced wagers will be cancelled and any tokens corresponding to them returned to the player. However, in certain embodiments, players are allowed to select a grid unit that has previously been selected. In these cases, multiple prizes may be available to win at each grid unit. In some embodiments, players may enter multiple tokens per grid unit. If the player ultimately wins the jackpot, the amount of money that he or she receives may be dependent on the number of tokens wagered. Similarly, multiple grid units may be selected at the same time thereby increasing the chances of winning. However, in most embodiments, the selection of multiple grid units will require the player to contribute at least one token to unlock each grid unit.

In particular embodiments of the GeoSweep Treasure Hunt game, players may select grid units and play the game for free. Similar to the features of the Free2Play game, the game allows players to receive at least one token for free to be used to select a grid unit. Prizes in the game are supported, at least in part, by the revenue received from advertisements that are presented to the player while playing the game. Any known manners of presenting advertisements to the players may be used including those manners discussed in connection with the Free2Play game discussed previously. Furthermore, players may receive additional tokens by purchasing, completing surveys, entering special codes received from external forms of advertisements, play other games such as GeoSweep™, referring friends, visit retail gaming machines or other methods described herein. Other features of Free2Play may also be incorporated in these free games.

Upon receiving the token(s) and the grid selections from the player, the player is then associated with each selected grid unit, as seen in Step 1816. In one embodiment, a table containing each grid unit and any corresponding associated player is tracked and updated automatically as the game progresses with player selections of grid units.

After the player is associated, it is determined whether the player wins the prize based on the player's selection, as seen at Step 1820. Specifically, it is determined whether the selected grid unit was the same grid unit at which the prize is "hidden" or "located." In one embodiment, this may be done by comparing the grid unit ID of the selected grid unit or, as described above, its position in a canonically ordered list of grid unit IDs with the stored generated number from the random number generator. A similar comparison takes place when cases in which the number generator produces coordinates to identify grid units in the map. When there is a match, the player is rewarded the prize. In some embodiments, if this is the jackpot prize, then the game ends at this point. When there is not a match, such that the jackpot was not hidden at the selected grid unit, then, in some embodiments, the token received from the player is added to the jackpot's total value. Thus, in these embodiments, the jackpot will continue to increase as the game progresses without a winner.

One of ordinary skill in the art would appreciate that the probability of winning increases at the same time that the number of available grid units decreases as the game progresses. At the beginning of a game containing M grid units in the map, the probability that a player selects one of the p prizes on the first turn is $$\frac{p}{M}$$

As the game progresses without a prize being won (or with the number of prizes available at any time being held constant—i.e. not decremented when a prize is one) and the number of available grid units (i.e. those not previously selected in the game) begin to reduce, the probability of winning one of the remaining prizes increases. The probability may be calculated as the following formula, where t is the number of turns already taken since the start of the game:

$$\frac{p}{M-t}$$

For instance, on a board of 100,000 grid units, with a single top prize, the chance of winning that top prize at on the first turn (i.e. after 0 turns already taken) is:

$$\frac{1}{100{,}000-0}=\frac{1}{100{,}000}$$

If the game proceeds for another 99,999 turns without the top prize being one, then the chance of winning that top prize on the one remaining possible turn in the game is:

$$\frac{1}{100{,}000-99{,}999}=1$$

More generally, the chance of the game on a board of M grid units with a single top prize being won on or before (WOOB) turn t for t>0 is:

$$P(WOOB(t))=P(WOOB(t-1))+\frac{1-P(WOOB(-1))}{M-t}$$

Now, suppose there is a t, such that $$P(WOOB(t-1))=\frac{t}{M}.$$

In that case, we would have:

$$\begin{aligned}P(WOOB(t)) &= P(WOOB(t-1))+\frac{1-P(WOOB(t-1))}{M-t}\\ &= \frac{t}{M}+\frac{1-\frac{t}{M}}{M-t}=\frac{t}{M}+\frac{\frac{M-t}{M}}{M-t}=\frac{t}{M}+\frac{1}{M}=\frac{t+1}{M}\end{aligned}$$

However, for t=1, we do indeed have $$P(WOOB(t-1))=P(WOOB(0))=\frac{1}{M}$$

so by induction:

$$P(WOOB(t))=\frac{t+1}{M}\forall\, 0\le t<M$$

And the probability that the game is won after turn t is just $$\frac{M-t-1}{M}$$

The above-described game is just one embodiment of the GeoSweep Treasure Hunt game. It may be considered a "predetermined play" of the game because the treasures are hidden on the map prior to the start of each game. According to one embodiment of the present invention, players may have already been associated with their respective grid unit before the "start" of a Treasure Hunt game is announced. For example, the Treasure Hunt game may be implemented in connection with the original GeoSweep game, for example, either as a bonus round to the regular GeoSweep drawings or being limited to GeoSweep players who have paid for or otherwise qualify for the Treasure Hunt game. At a predetermined time, the Treasure Hunt game operator may randomly hide treasures at one or more grid units and announce the start of a treasure hunt. Each player may then simply check his or her own grid units to see whether he or she is the lucky winner of the treasure. In other cases, each player is further allowed to unlock his or her neighboring unoccupied grid units to win any treasure found therein.

Figure 19:
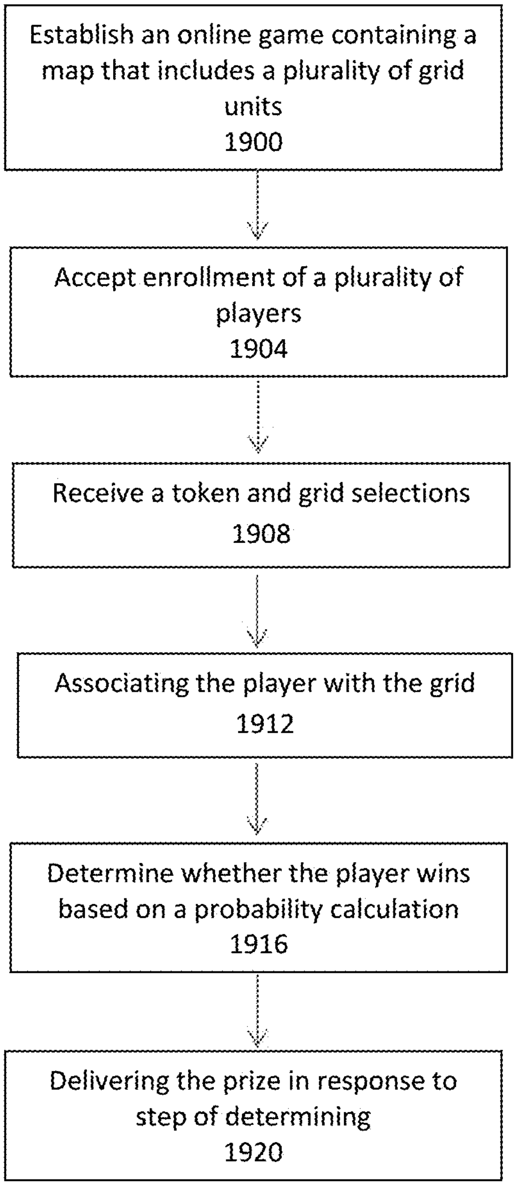
FIG. 19 is a flow chart illustrating an exemplary method of facilitating a prize-searching style game using dynamic play in accordance with one embodiment of the present invention.

One additional embodiment of the GeoSweep Treasure Hunt game, called a "dynamic play" of the game, is shown in FIG. 19. Similar to the previously described embodiments, an online game containing a map that includes a plurality of grid units is established at step 1900 in a manner similar to step 1800. Prizes are also associated with the game. Next, enrollment of a plurality of players is accepted at step 1904, just as it is in step 1804. Unlike the embodiment of FIG. 18, the embodiments of FIG. 19 do not determine the placement of a prize on the map prior to a player's interaction. After the plurality of players is enrolled, the game begins by allowing players to select grid units. At step 1908, a grid unit selection and a token is received. Just as in FIG. 18, a plurality of tokens may be wagered on any number of selected grid units. Once this occurs, the player is associated with the grid units according to step 1912, for example, by updating the table of grid units and associated players.

After the player is associated with each of selected grid units, it is determined whether the player wins by executing a probability algorithm at step 1916. Thus, in the dynamic play of the game, it is unknown whether the player would win a prize even at the moment the player chooses a particular grid unit. It is not until the probability algorithm is executed that the results of the player's selections are known. In other words, at the start of each dynamic play game, each grid unit has a chance of containing the prize. In contrast, in the predetermined game, each tile either has a winning prize or it does not, i.e., each grid unit either has a 0% or 100% chance of containing a prize. It should be noted, however, that the player's chance of selecting a grid unit that contains a prize in the predetermined game may still be given by the probability formulas above.

In one basic probability algorithm, the number of not yet won prizes (P), the number of grid units not yet selected (U), and a randomly generated number (R) are considered. The random generated number (R), when generated, will be in the range, $$0<R\le U$$

Once R has been generated, the following comparison is made to determine whether the player wins:

The player wins if R≤P

The player loses if P<R

Figure 20:
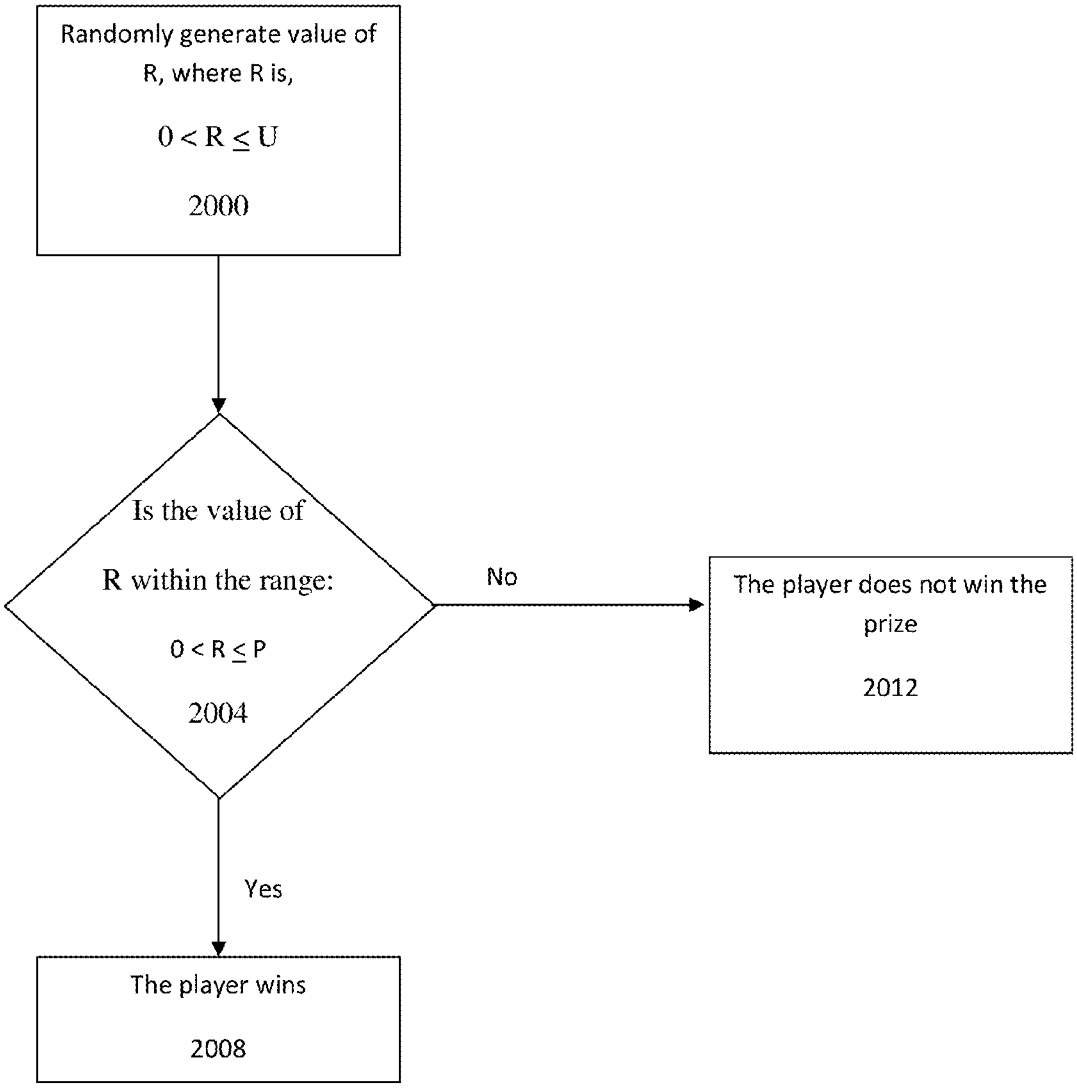
FIG. 20 is a flow chart illustrating an exemplary probability algorithm in accordance with one embodiment of the present invention.

A flowchart of the basic probability algorithm is depicted in FIG. 20. The above-described basic algorithm may be used in a fair game, where each grid unit has the same chance of winning. In an exemplary game where there are 2 known prizes on the map and 10 remaining grid units to be selected, the probability algorithm, when executed, will determine whether the player wins. Each grid unit has a 20 percent chance of winning in a fair game. When executed, the simple algorithm determines that the player will win when the random number generator generates a value of R that is less than or equal to 2 from the possible range of 1 to 10 (i.e. a 20 percent chance of winning). The exemplary function used above is used to demonstrate the one possible function of the probability algorithm and is not meant to be limiting in anyway. After it is determined that a player wins the prize, the player is awarded the prize in any number of known manners such as crediting the player's associated bank account with the fund or crediting the player's credit within the game. Once all prizes have been distributed, the game restarts.

In certain embodiments, the chances of winning a prize may vary from grid unit to grid unit. In these games, each grid unit may be associated with predetermined winning factor, $F_W$. The value of $F_W$ may be any number greater than 0. The closer the value of $F_W$ to 1, the closer the algorithm is equivalent to the algorithm in a fair game. Further, when the value of $F_w$ is greater than 1, it is easier to win the prize. Once the value of R has been randomly generated, the determination of whether the player wins the prize may be, The player wins if $R \le F_W \times P$ The player loses if $F_W \times P < R$ Where the value of $F_W$ is 2, the player has twice the probability of winning the prize. When used in the map-based game, the value of $F_W$ may be known for each grid units or it may be hidden. Further, the value of $F_W$ may be represented by the size of the grid unit relative to the other grid units. A larger grid unit may have a larger value of $F_W$ and therefore the higher chance of winning the prize. In some embodiments, the player may have to contribute a larger number of tokens in order to select these larger grid units.

In various embodiments of the GeoSweep Treasure Hunt game, prizes are categorized by a plurality of tiers. Valuable prizes are considered to be in the highest tier while prizes of less value are in the lowest tier. Accordingly, prizes of the highest tiers are much more difficult to win than prizes at the lowest tiers. The number of tiers in the game may either be determined in advance, or can be determined dynamically using a particular probability weighting.

Figure 21:
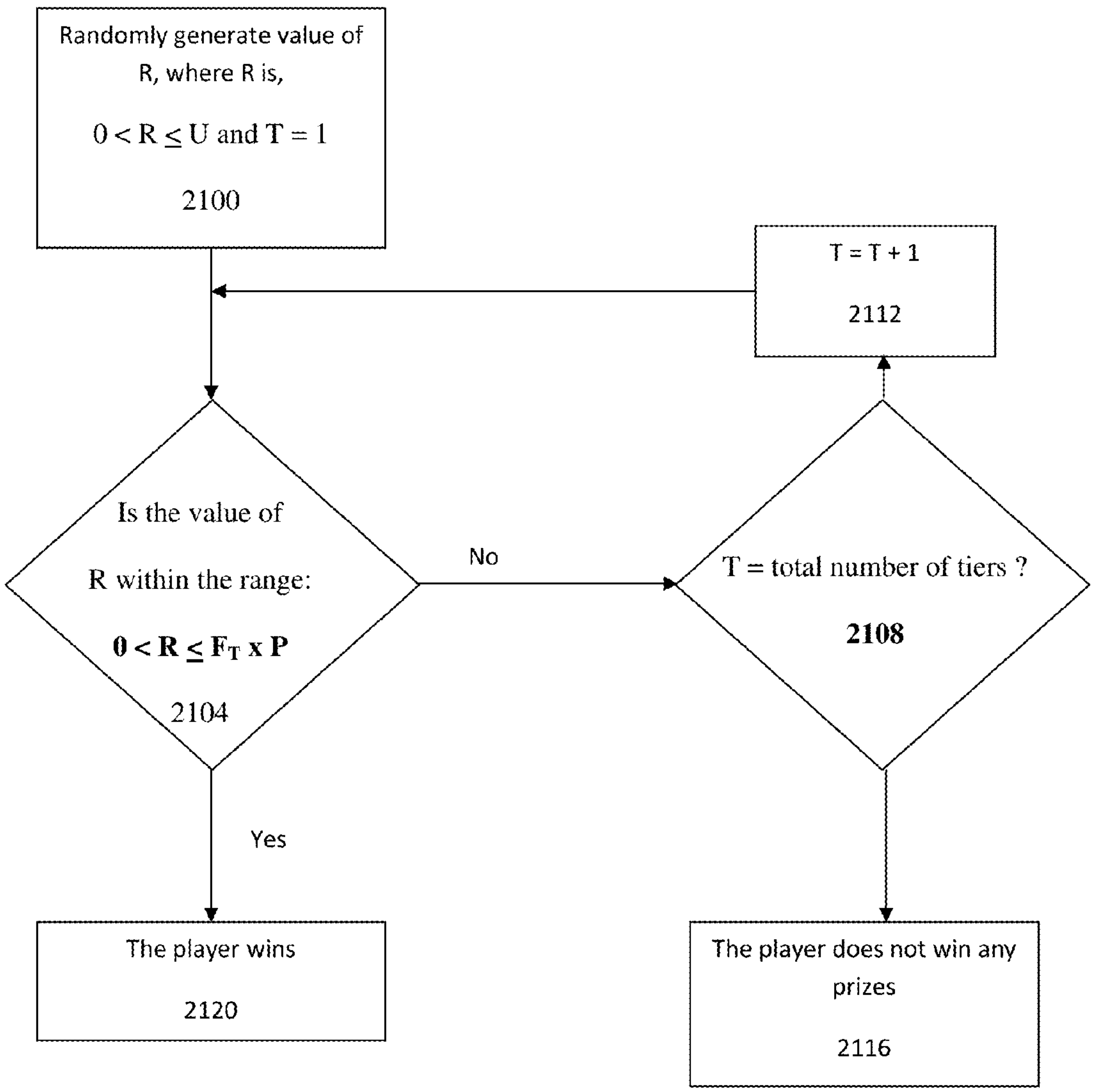
FIG. 21 is a flow chart illustrating an exemplary probability algorithm used in a game containing tiers of prizes in accordance with one embodiment of the present invention.

In the "dynamic play" of the GeoSweep Treasure Hunt game, a probability algorithm may take into consideration the multiple tiers of prizes with each tier having differing probability of winning a prize. A variance of the basic probability algorithm may be used that further considers a tier adjustment factor ($F_T$). FIG. 21 depicts a flowchart of the steps taken in the exemplary probability algorithm. As described above, a value of R is the randomly generated value at step 2100, where R is within the range, $$0 < R \le U$$

When R is generated, multiple levels of comparisons are made, with a level of comparison made for each tier. First, a step 2104 is taken to determine whether the value of R is within the range $0 < R \le F_T \times P_T$, where $P_T$ is the number of not yet won prizes in tier T. If it is within this range, the player wins the prize for that tier and the probability algorithm terminates. In certain embodiments, a player may win prizes from multiple tiers, whereby the determination of the lower tier winnings are still made even after it is determined that the player wins a prize of a higher tier.

If the value of R is not within that the range of step 2104, a step 2108 is taken to determine whether there is a lower tier of prizes. If so, the algorithm adjusts to determine whether the player may win the next tier of prizes. Therefore, the value of T may be incremented at step 2112 and the determination of R within the range is made using the adjustment factor $F_T$ corresponding to the next (lower) tier.

The adjustment factor $F_T$ may be any value greater than 0. In the most basic and simple game, an adjustment factor $F_T$ of 1 is used for the highest tier prizes. The adjustment factor may be greater than 1 for lower tiers. The lower the tier, the higher the value of $F_T$ may be. For example, the lowest tier prize may have an adjustment factor of 2. In such cases, the players are twice more likely to win a lowest tier prize than the highest tier prize.

In a game with 1 highest tier prize and 2 lowest-tier prizes and 15 remaining grid units on the map, it is first determined whether the player may win the highest tier prize using an adjustment factor $F_T$ of 1. If the value of R, when randomly generated, is no greater than 1, out of a possible range of 1 to 15, the player wins. Otherwise, the player does not win the first tier prize and a determination is made whether the player may win the second tier prize. Specifically, if the value of R is greater than 1 but less than or equal to 2, then the player will win the second tier prize. Otherwise, the algorithm will terminates and the player does not win any prizes for his selection of the grid unit.

In the "predetermined game" of the GeoSweep Treasure Hunt game, an adjustment algorithm may be used during a game to dynamically adjust the probability that a prize from a particular tier may be won. This may be especially useful for lower tier prizes, as it would make the probability of winning these lower tier prizes much higher. For example, in a map containing 1,000 grid units, 1 higher tiered prize and 1 lowest tiered prize, it may be desirable to have the probability of winning the lower tier prize to be equivalent to the probability of winning in a game that only has 200 grid units. In other words, it may be desirable to have a predetermined play of GeoSweep Treasure Hunt wherein the initial probability of winning the lower tier prize is 1 out of 200 while the initial probability of winning the highest tier prize is higher, such as 1 out of 1000.

The adjustment algorithm thus allows a game with multiple tiers of prizes with varying probabilities of winning, even in a "predetermined game" of the GeoSweep Treasure Hunt game. Such a game may be called a Key Treasure Hunt game.

In order to ensure that the probability of winning the lower tiered prize will be the equivalent to that of a game with 200 grid units and one prize, the number of prizes available on the board must be dynamically adjusted after each selection of a grid unit. This may be possible by using "keys" in the grid units of the map to represent a tier of prizes. This is different from the traditional GeoSweep Treasure Hunt game wherein grid units are associated with each available prize. The use of keys allows multiple keys to represent one prize. The discovery of one key will automatically allow the player to win the prize. Once all of the prizes have been won, the game would reset. Thus in a game with 1000 grid units, 1 highest tier prize and 1 lowest tier prize, 1 key may be placed in a grid unit in the map, representing the highest tier prize. Further, 5 keys may be placed in various grid units to represent the 1 lower tiered prize. With 5 keys in the map, the initial probability of winning a lower tiered prize is 1 out of 200, or equivalent to a game with only 200 grid units and 1 prize.

The number of keys for each tier of prizes may be adjusted each time a grid unit is selected. This ensures that the probability of winning the lower tiered prize is the same as if the player were searching for the prize in the smaller map.

The following formula may be used to determine how many keys are required in the map for a given tier of prizes at turn t.

$$K_t = \left\lfloor \frac{G - t}{M - t} \right\rfloor$$

The formula takes into consideration the total number of unselected grid units at the start of the game (G), the adjusted total number of unselected grid units at the start of the game (M), and the total number of turns taken since the beginning of the game (t). In one embodiment, the value of M may be calculated using the tier adjustment factor, $F_T$.

$$M = \frac{G}{F_t}$$

When the value of $F_T$ is 2, a player will have twice the probability of finding the prize than when an adjustment algorithm is not used. Thus the chance of winning the top prize once we reach turn t (counting from 0) is $$\frac{K_t}{G-t} = \frac{\left\lfloor \frac{G-t}{M-t} \right\rfloor}{G-t} \approx \frac{1}{M-t}$$

As seen, the probability of winning the lower tier prize is the equivalent of the probability of winning on a smaller map with M grid units, even though the game is played on a larger map with G grid units. Self-evidently $K_t$ is a monotonically increasing (but not strictly monotonically increasing) sequence, i.e.:

$$K_t \le K_s \forall t < s$$

In the example, after 100 grid units are selected without finding the prize, there are 900 grid units remaining on the map. The probability of selecting the highest tier prize is 1 out of 900. If keys were not dynamically adjusted as the game progresses, the probability of selecting the lower tier prize is 5 out of 900. However, this probability is not what the probability of finding the lower tier prize would be in a map with only 200 starting grid units. After 100 grid units are selected, there remains only 100 grid units in that map and thus, a probability of finding the prize of one out of 100, or 1 percent. As such, the probability of winning the lower tier prize in a map containing 1000 grid unit map (with 900 grid units remaining) must also be adjusted to be 1 percent. Using the formula above, the following values are used in the formula:

$$G = 1000$$

$$M = 200$$

$$t = 100$$

$$K_{100} = \left\lfloor \frac{1{,}000 - 100}{200 - 100} \right\rfloor = \left\lfloor \frac{900}{100} \right\rfloor = 9$$

It is determined that a total of 9 keys must be in the map after 100 grid units have been selected. With 9 keys, there is a probability of winning a lower tier prize of 9 out of 900, or a 1 percent. Thus, the number of keys will be dynamically adjusted each time a selection is made in order to ensure a consistent probability of winning lower tier prizes as if played in a smaller map. Other formulas and algorithms may be used in order to determine how many keys may be added and the formula used above is just one of many possibilities.

The Key Treasure Hunt game may also be used to limit the number of turns the game may have before all of the prizes are found. This is possible by setting the number of adjusted grid units M to the desired maximum number of turns. For a Key Treasure Hunt game of at most 100,000 turns on a 60,000,000 grid unit map—which for brevity we write KTH(60,000,000, 100,000)—the number of keys hidden once we reach turns 0, 100, 1,000, 50,000, 90,000, 99,000, 99,745, 99,988, 99,989, 99,990, 99,997, 99,998, 99,999 is:

| Turn | Max turns left | Approx. odds of winning | Unsearched Geos | Keys on Map |
|---|---|---|---|---|
| 0 | 100,000 | 1/100,000 | 60,000,000 | 600 |
| 100 | 99,900 | 1/99,900 | 59,999,900 | 600 |
| 1,000 | 99,000 | 1/99,000 | 59,999,000 | 606 |
| 50,000 | 50,000 | 1/50,000 | 59,950,000 | 1,199 |
| 90,000 | 10,000 | 1/10,000 | 59,910,000 | 5,991 |
| 99,745 | 255 | 1/255 | 59,900,255 | 234,902 |
| 99,988 | 12 | 1/12 | 59,900,012 | 4,991,667 |
| 99,989 | 11 | 1/11 | 59,900,011 | 5,445,455 |
| 99,990 | 10 | 1/10 | 59,900,010 | 5,990,001 |
| 99,997 | 3 | 1/3 | 59,900,003 | 19,966,667 |
| 99,998 | 2 | 1/2 | 59,900,002 | 29,950,001 |
| 99,999 | 1 | 1/1 | 59,900,001 | 59,900,001 |

There are several possible variants on the base KTH. One notable one is the Limited Key Treasure Hunt (LKTH). An LKTH is simply a KTH which ends early by putting keys under all unsearched grid units at an earlier turn than in a normal KTH game. Specifically, an LKTH(G, M, e) is a modification of a corresponding KTH(G, M) where at turn M−e, G-M+e keys are hidden on the map (thus forcing a winner on that turn). For instance, for an LKTH(60,000,000, 100,000, 10), the table above would be amended to remove turns 99,990 and beyond, and force the game to end by that turn at the latest:

| Turn | Max turns left | Approx odds of winning | Unsearched Geos | Keys on Map |
|---|---|---|---|---|
| 0 | 100,000 − 10 = 99,990 | 1/100,000 | 60,000,000 | 600 |
| 100 | 99,900 − 10 = 99,890 | 1/99,900 | 59,999,900 | 600 |
| 1,000 | 99,000 − 10 = 98,990 | 1/99,000 | 59,999,000 | 606 |
| 50,000 | 50,000 − 10 = 49,990 | 1/50,000 | 59,950,000 | 1,199 |
| 90,000 | 10,000 − 10 = 9,990 | 1/10,000 | 59,910,000 | 5,991 |
| 99,745 | 255 − 10 = 245 | 1/255 | 59,900,255 | 234,902 |
| 99,988 | 12 − 10 = 2 | 1/12 | 59,900,012 | 4,991,667 |
| 99,989 | 11 − 10 = 1 | 1 (NB not 1/10) | 59,900,011 | 59,900,011 |

The potential advantages of an LKTH over a KTH are twofold. It simplifies some aspects of implementation because removing a small number of moves from the end of a KTH can dramatically decrease the number of random key positions that need to be generated. And, especially if the exact value of the parameter e is not revealed to players then, for very small loss of revenue, it could increase player excitement that the game could end at any time with a guaranteed winner.

Trivially, any KTH(G, M) is also an LKTH(G, M, 0). In other words, KTHs are a subset of LKTHs. In the analysis below, most of what is said about KTHs applies equally to LKTHs with the changes made for the final possible turns of the game.

As can be seen, not every turn in a (L)KTH necessarily results in an increase in the number of keys hidden on the game board. Thus a sequence Key Increment Turns, $I_0$, $I_1$, . . . $I_n$ may be determined, the sequence listing the turn numbers on which the number of keys increases. For convenience, $I_0=0$. For example, for KTH(60,000,000, 100,000), $I_1=167$. As seen from the following calculation using the above-described formula, the number of keys necessary for the map increments from 600 to 601 on turn 167:

$$K_{166} = \frac{60{,}000{,}000 - 166}{100{,}000 - 166} = \frac{59{,}999{,}834}{99{,}834} = 600\frac{99{,}434}{99{,}834} = 600$$

-continued $$K_{167} = \frac{60{,}000{,}000 - 167}{100{,}000 - 166} = \frac{59{,}999{,}833}{99{,}834} = 601\frac{200}{99{,}833} = 601$$

The following Python program outputs (to stdout) a CSV file showing the Key Increment Turns for a KTH of at most T turns on a G Geo board (where G and T are supplied as command-line arguments):

```
#
# Treasure Hunts Key Increment Calculator
#
# Takes two arguments:
# number of Geos on the game board
# maximum number of turns in the game
#
# Outputs CSV of Increment, Turn, Num Keys
#
importargparse
parser = argparse.ArgumentParser(description='Calculate Key Increment
Turns')
parser.add__argument('numGeos', metavar='G', type=int, nargs=1,
help='number of Geos on the game board')
parser.add__argument('maxTurns', metavar='M', type=int, nargs=1,
help='maximum number of turns in the game')
args = parser.parse__args( )
numGeos = args.numGeos[0]
maxTurns = args.maxTurns[0]
incrementNum = 0
curKeys = 0
print "Increment, Turn, Num Keys"
for turn in range (maxTurns):
thisTurnKeys = (numGeos – turn) / (maxTurns – turn)
ifthisTurnKeys>curKeys:
    #print "Increment", incrementNum, "is at turn", turn, "when there
    are",
thisTurnKeys, "keys"
    print incrementNum, ",", turn, ",", thisTurnKeys
curKeys = thisTurnKeys
incrementNum += 1
```

Running this program with parameters for KTH(60,000,000, 100,000) produces a list of the 14,880 Key Increment Turns for this game. Running a variant of this code, suggests that, for any value of M (1≤M≤60,000,000) the number of KITs in KTH(60,000,000, M) is always lower than 16,000.

To determine the number of locations that key need to be buried at the start of KTH(G, M) game, the following formula may be used:

$$K_{M-2} + M - 2 = \left\lfloor\frac{G-(M-2)}{M-(M-2)}\right\rfloor + M - 2 = \left\lfloor\frac{G-M+2+2M-4}{2}\right\rfloor = \left\lfloor\frac{G+M-2}{2}\right\rfloor$$

This is because:

By turn M−1, every unsearched grid unit contains a key.

By turn M−2, $K_{M-2}$ keys are hidden.

By turn M−2, there will be M−2 searched grid unit. So there will be up to M−2 grid units originally planned to contain keys that by turn M−2 are no longer valid hiding places.

Similarly, for an LKTH(G, M, e) game, to predetermine all locations where keys might be buried, then the number of grid units to be selected is $$K_{M-e-2} + M - e - 2 = \left\lfloor\frac{G-(M-e-2)}{M-(M-e-2)}\right\rfloor + M - e - 2 =$$

-continued $$\left\lfloor\frac{G-(M-e-2)+(M-e-2)(e+2)}{e+2}\right\rfloor = \left\lfloor\frac{G+(M-e-2)(e+1)}{e+2}\right\rfloor$$

Predetermining key locations brings up two implementation issues: efficiency of storage and security of storage.

For a KTH(60,000,000, 100,000) game, 60,999,998/2=30, 049,999 grid units may require ID designations in advance.

For an LKTH(60,000,000, 100,000, 10) game, $$\left\lfloor\frac{60{,}000{,}000 + 99{,}988\times 11}{12}\right\rfloor = \left\lfloor\frac{61{,}099{,}868}{12}\right\rfloor = 5{,}091{,}655 \text{ grid units may require ID designations in advance.}$$

In one exemplary embodiment, the approach to storing predetermined key locations may include the following steps:

Before the game starts, generate sufficient unique grid unit IDs and encrypt the IDs with a two-part public key. The application may require two separate system administrators from a administrator group of at least 2 or 3 administrators to type in their passwords to begin generating the IDs.

Store the encrypted data in the database (DB) and with some external game validator well known in the art. This may be done for numerous games in succession such that there are backlogs of games to be played.

Start two or more instances of a load-balanced Treasure Hunt Key Server (THKS), also known as the "Scratch Server"—again, this may require two separate system administrators to enter encryption codes from the group of administrators.

The THKS may then receive the encrypted grid unit ID list and decrypts the list to memory. It also may receive and store information of the number of turns that have been played in the current game and the grid units have been selected (i.e. searched).

The grid units that have been selected may then be stored in a bitmap in memory. This bitmap may be updated each time a Key Increment Turn (KIT) is reached. Periodically the bitmap may be saved to disk or database along with the latest turn number. This may save numerous database accesses to determine the individual turns.

Based on the last KIT reached and knowledge of which grid units have been selected, the THKS may construct another bitmap in memory, storing which grid units contain hidden Keys. This bitmap may never be written to the disk or database.

For an LKTH(60,000,000, 100,000, 10) game:

The unencrypted list of grid unit IDs is 5,091,655×4 bytes≈20 MB

Each of the two bitmaps (searched/unsearched grid units, grid units with keys) takes 60,000,000/8 bytes 7.5 MB The list of KITs takes (14,880−10)×4 bytes≈60 KB The mapping of non-sequential grid unit IDs to positions in the bitmap will require an amount of additional memory related to the number of continuous ranges in the IDs Each time a player selects a grid unit in the game, the application server handling her/his session may transmit a request to one of the THKSs to do so. This THKS has write access to a database table listing all turns taken in the game and include information such as the turn number, timestamp, grid unit ID, user ID, and results of each grid unit selection. Application servers have read-only access to this table. By serializing inserts to this table and making grid unit ID a primary key, turn numbers as a result are sequential. Scratch server may update this table and return response to request from an app server such as that described below.

Figure 22:
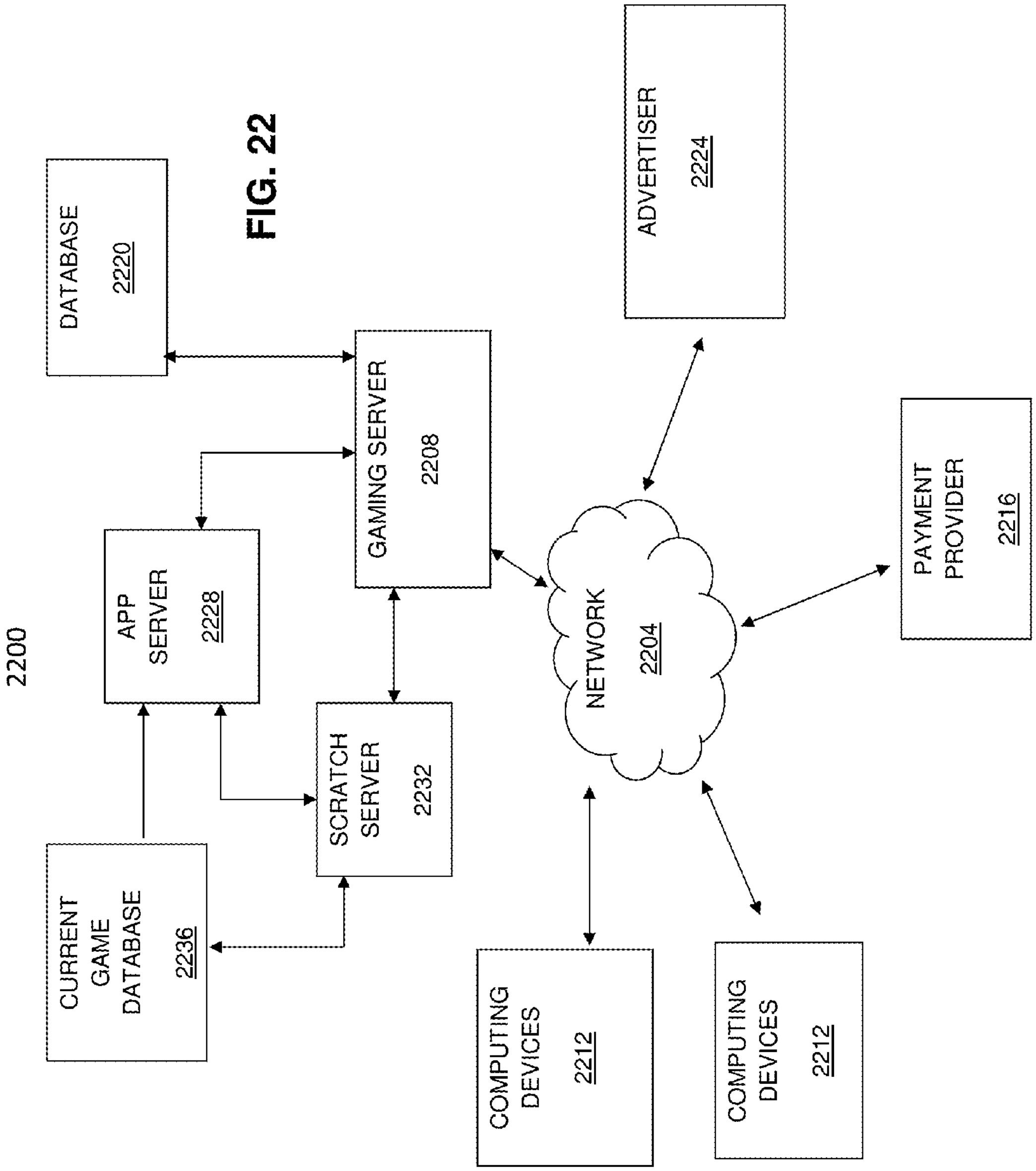
FIG. 22 is a block diagram illustrating an exemplary system for facilitating treasure hunt game according to one embodiment of the present invention.

Collectively, the unencrypted list of grid unit IDs and the bitmap listing grid units with keys are called the Table of Answers. FIG. 22 is a block diagram illustrating an exemplary system 2200 for facilitating a GeoSweep Treasure Hunt game in accordance with one embodiment of the present invention. FIG. 22 depicts a gaming server 2208 connected to a database 2220, a scratch server 2232 and an app server 2228, which also communicates with the scratch server 2232. In addition, the scratch server 2232 and the app server 2228 are connected to a current game database 2236. The gaming server 2208 is connected to network 2204, which allows communications with a plurality of computing devices 2212, payment provider 2216 and advertiser server 2224. The gaming server 2208, computing devices 2212, payment provider 2216, advertiser server, network 2204 and database 2220 of FIG. 22 have many of the same capabilities of the corresponding devices described in connection with the systems described with FIG. 4 and FIG. 13 The underlying hardware and software structure of each of these devices, therefore, will not be discussed in detail. The capabilities of the devices of FIG. 4 and their embodiments may be incorporated into the corresponding devices in FIG. 22. While the following description of the system 2200 describes the capabilities of the system 2200 in connection with a Key Treasure Hunt game, the various components and capabilities of the components, including those of the scratch server 2232, the app server 2228, and the current game database 2236 may be used in establishing any of the other embodiments of games described herein.

Generally, players at a plurality of computing devices 2212 may play the Key Treasure Hunt game by interacting and communicating with the gaming server 2208. Information about the game, such as the map, the prizes, the prizes' location are transmitted to the computing devices 2212 where the players can view the information and make decisions accordingly with regard to the game, such as selecting a particular grid unit or purchasing additional tokens. The selections and requests of the players at the computing devices 2212 are transmitted to the gaming server 2208 for processing. Just as in the systems 1300 and 400, the gaming system 2208 also communicates with payment providers 2216 to process requests by players to purchase additional tokens in the game. Further, the gaming server 2208 may also communicate with payment providers 2216 to transfer prizes or jackpots won by players to the players' bank accounts. Similar to the system 1300, the gaming server 2208 has the capability to transmit information containing advertisements to players at computing devices 2212. This is made possible by its communications with advertiser server 2224 in order to gather data concerning the advertisements. The manner in which these devices communicate in order to process the players' requests are similar to those already described in connection with the systems 1300 and 400 and will not be described in further detail.

Unique to the system 2200 is the use of scratch server 2232, app server 2228 and current game database 2236. Unlike the systems 1300 and 400, the database 2220 that is directly accessible by the gaming server 2208 may not contain information concerning the particular iteration of the game. Such information is contained separately in a current game database 2236. In other words, while the database 2200 contains information related to the players profile, the player's financial information, the play history, the advertisements and various technical information, the current game database 2236 contains information related to the players' selections grid units for each round of the active current game. This includes information concerning each turn such as the grid unit ID, grid unit location, selection identification, time of selections, user identification of selector, and results of the selections. The current game database will also contain the Table of Answers. In certain embodiments, the database 2220 and the current game database 2236 are contained in one single database. In these embodiments, the gaming server 2208 may have access to all of the information in this single database. Alternatively, the gaming server 2208 may only have permission to read or make changes to certain portions of the database and may only make changes or view the other portions by controlling the scratch server 2232.

As seen in FIG. 22, the gaming server does not have direct access to the current game database 2236 but does have access to the general information contained in database 2220. The gaming server 2208 may transmit instruction signals and information to the scratch servers 2232 and app servers 2228. The scratch server 2232 has the ability to make changes to the current game database 2236. In contrast, the app server 2228 may only request information from the current game database 2236 and may not directly make changes to it. Instead, the app server 2228 may only request changes to the database by transmitting a request to the scratch server 2232. There may be any number of scratch servers 2232 and app servers 2228 in similar embodiments of the presently disclosed invention. Multiple app servers 2228 may be used to handle multiple requests by the gaming server 22208 in parallel. Similarly, multiple app servers may handle multiple requests to make changes to the current game database 2228 in parallel with each scratch server responsible for a portion of the database.

In other embodiments, the scratch server 2232 or app server 2228 may be incorporated into the gaming server 2208 such that the gaming server 2208 will have the capabilities of these devices. In yet other embodiments, the scratch server 2232 and the app server 228 may be incorporated into one server.

Prior to the start of a Key Treasure Hunt game, the gaming sever 2208 may transmit an instruct signal to the scratch server 2228 to generate the Table of Answers—or else the Table of Answers may be generated on another machine, stored in an encrypted fashion, and subsequently read in and decrypted by the scratch server. In certain embodiments, including embodiments wherein the functions of the scratch server 2228 are incorporated into the gaming server 2208, this may occur automatically without the requirement of an instruct signal. Using predetermined gaming settings such as the number of grid units in the map, the number of prizes, and the maximum number of turns desired in the game, the scratch server may generate the Table of Answers. In particular, using the number of grid units and the maximum number of turns, the scratch server 2232 can determine the sequence of Key Increment Turns in the game, such as by using the Python code disclosed above. For each turn in which a key is known to be added to the map, the scratch server 2228 may randomly determine the key's location using any of the known methods including those previously discussed in connection with the other embodiments of the present invention. One of ordinary skill in the art would realize that additional, previously discussed factors may also be used to generate the Table of Answers including the number of tiers of prizes, the desired number of maximum turns for each tier of prizes.

After the Table of Answers is generated, it may be encrypted and stored at the current game database 2236. In one preferred embodiment, the Table of Answers is encrypted with a public key. Any known manner of encryption by one of ordinary skill in the art may be used including the Data Encryption Standard (DES) algorithm, Advanced Encryption Standard (AES) algorithm, Twofish, Serpent, Triple DES, International Data Encryption Algorithm, RC4 or other known symmetric key algorithms. In certain embodiments, asymmetric encryption may also be used.

Each scratch server may access the information in the current game database 2232 by downloading the information, decrypting it with a private encryption key well known in the art, and storing the information in its local memory.

When a player views information concerning the currently played game, such as map information, previous selection information, current available prizes information, prize award history and all other relevant information, the client's computing devices 2212 may request the information from the gaming server 2208. The gaming server then may transmit a signal that requests such information from the app server 2228. The app server 2228, with its read-only access to the current game database 2236, may then receive the information and reply to the gaming server 2208. Using this information, the gaming server may format the information in a manner that may be received by client device 2212 and displayed to the player.

When a player selects a grid unit during a play of the Key Treasure Hunt game, the gaming server 2208 may receive this request and transmit a signal to at least one app server 2228. At least a portion of the transmitted signal contains information concerning the request including the grid unit ID, grid unit location, selection identification, time of selections, user identification of selector, and results of the selections. Upon receiving this request, the app server 2228 will transmit a request to at least one scratch server 2232.

Using the information contained in the signal, the scratch server 2232 may then record the changes in the current game database including recording the current selections. In addition, the scratch server 2232 may have the capability to determine whether the player wins the prize by using the information contained in the current game database and in particular the information contained in the Table of Answers. Using the known current turn number and the requested grid unit to be selected, the scratch server 2232 may determine that the player wins if the current turn number is greater than or equal to the key increment turn entry for the selected grid unit. The scratch server 2232 may then update the current game database 2236 with the players' winnings along with other information. In certain embodiments, the app server 2232 has the capability to determine whether the player wins. The app server 2232 would then transmit a signal to the scratch server 2232 to make the necessary changes to the current game database to update the winnings of the player. In any case, the app server 2228 and scratch server 2232 ultimately transmit various signals back to the gaming server 2208 disclosing the results of the players' selections. The gaming server may then transmit a signal back to the client device 2212 in a form that the client devices may properly process and display to the players.

In certain embodiments, when the scratch server receives a request to change a portion of the current game database 2236, it places the request in a queue. The requests in the queue may then be processed in the order received. In certain embodiments, certain requests may have priority over all others and therefore may be processed immediately when received. For example, it may be a request by a player who has been given a bonus selection that grants priority over all others.

In embodiments in which there are multiple scratch servers 2232, the scratch servers 2232 work together in order to ensure that the data in the current game database 2236 are updated correctly. In one embodiment, portions of the database 2236 are divided among the scratch servers 2236 with each portion assigned to one server 2236. This may ensure that data is correctly updated. In another embodiment, there is a primary scratch server 2232 that receives all requests. It may then, in real-time, assign a particular scratch server 2232 to update the database while ensuring that access to the same portion of the database is not, at the same, given to another server. Using these methods, the current game database 2236 may be changed by multiple scratch servers 2236 in parallel. The primary scratch server 2236 will ensure that the results are the equivalent to results when processed sequentially by one scratch server 2236.

In certain embodiments of the disclosed invention, each grid unit may contain a plurality of layers. A layer of a particular grid unit may not be accessed until the layer above that particular layer has been accessed. Therefore, in the play of the game, when a player selects a grid unit, he or she is automatically selecting the next available layer in that grid unit.

Prizes are distributed throughout the map in various grid unit layers. In addition, the prizes that are on the lower layer may be more valuable than the prizes in the higher layers. A prize that is hidden at the grid unit might reside in one particular layer and not the other layers. In certain embodiments, the treasure may be found on multiple layers of a grid unit, requiring the player to select successfully all of the adjoining layers that includes portions of the prize without an intervening selection by other players. In addition, the number of layers a grid unit may have may vary from grid unit to grid unit. Even further, in certain embodiments of the present invention, the probability that a prize may be in a layer of a particular grid unit will be higher when there is a prize located in another layer of that same grid unit.

There may be various ways in which a map with multiple layers may be presented to the player. For example, there may be no indication that there are layers at all. After a layer has been selected and a prize is awarded (if won), the map may simply depict that the grid unit is still available for selection. It is only when all grid units have been selected that the grid is indicated as not selectable.

Figure 23:
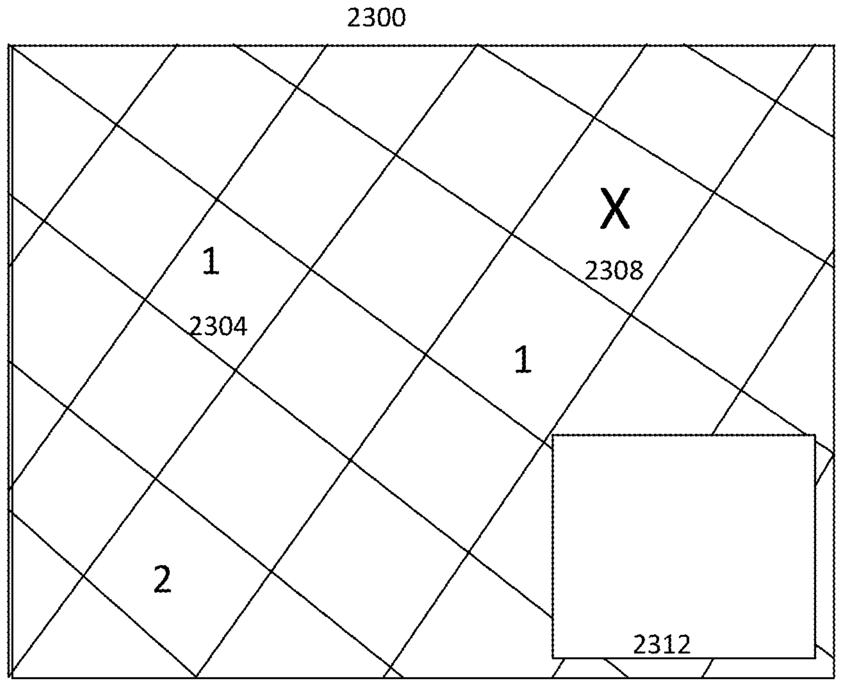
FIG. 23 illustrates an exemplary user interface of one embodiment of the system containing information about the number of tiers for each grid unit in accordance with one embodiment of the present invention.

FIG. 23, which depicts the game's interface 2300 showing the map with a plurality of grid units, further shows other manners in which layers may be presented. Each grid units may indicate the number of layers for that particular grid unit that has already been selected. For example, grid unit 2304 shows that the player has selected the grid unit once and accessed the top layer. Further, grid unit 2308 indicates that all of the layers have been selected by the players of the game and cannot be further selected. In certain embodiments, each grid unit may be selectable to find further information about the unit. A menu 2312 may be overlaid on the map in the interface 2300 that shows certain information of the grid, such as how many tiers have been selected, whether prizes have been won in those layers, who selected the layer and other pertinent information. In another embodiment, when a grid unit is selected, a three dimensional depiction of the grid unit is shown with each layer of the grid unit as part of the unit. For example, the three-dimensional grid unit might be a box, representing a square grid unit with a predetermined depth.

Where there are three grid layers, the top one third of the box may be depicted as one layer. As one example, it may be shown as water. The next one third of the box may then be shown, for example, as dirt. Finally, the bottom one third of the grid unit may be depicted as bedrock. A previously selected layer may be grayed out or it may be depicted as previously dug. Selecting individual layer may allow the player to learn more about each layer. Thus, the use of layers in the map allows for prizes to be hidden in multiple layers of each grid unit. Players may use these information interfaces to make his or her selection of grid units.

In some embodiments of the GeoSweep Treasure Hunt game, prizes may be distributed throughout the map in clusters of grid units. In the predetermined play of the game, prizes are distributed in the map in random clusters prior to the start of the game. These clusters may be of varying sizes, location and distribution. These clusters may also have various shapes. Thus, prizes might be located long a line or in a certain shape such as a box, star or triangle. There may be grid units within these clusters that do not contain prizes.

Figure 24:
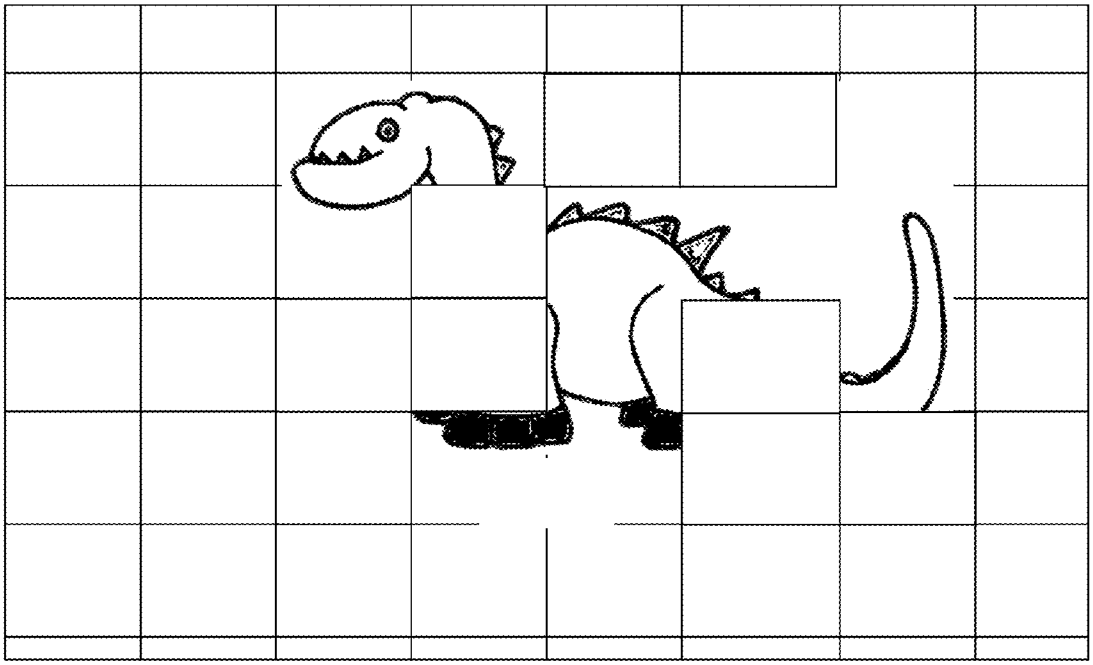
FIG. 24 illustrates an exemplary user interface of one embodiment of the system that contains a map with grid units that offers clues to players of the game in accordance with one embodiment of the present invention.

Prizes in games of the disclosed invention may be larger than one grid unit. A player may be required to select successfully all of the adjoining grid units prior to any other players in order to win the entire prize. Alternatively, the player may win portions of the prize for selecting each grid unit containing the portion of the large prize. In these instances, he may also receive a larger prize, such as a jackpot, if he is able to successfully select all of the grid units that contain the entire prize. In certain embodiments, the selection of a grid units results in the display of a portion of picture or shape in the selected grid unit, as seen in FIG. 24. Thus, as seen in FIG. 24, the portions of these grid units that have been revealed may offer players a hint of where the related portions of the prize may be, in this case, the remains of a dinosaur fossil. In yet another embodiment, portions of a prize may be distributed randomly throughout the map. When the player successfully selects of the grid units associated with the larger prize, he or she may win a bonus prize or the jackpot.

In embodiments of the game where the map depicts real world locations, such as the city of New York, prizes may in be placed in grid units of various real world locations. For example, prizes may be placed in grid units of all football stadiums in the map. This manner of distributing prizes may also allow advertisers to sponsor prizes that are located at real world locations of its business. For example, every grid containing a business location or an Automatic Teller Machine of a certain bank in New York City might contain a prize. When a player selects the winning grid unit, an advertisement may be shown to the player in a manner of previously discussed above. The player will then win the prize. Importantly, the placement of prizes in these locations could offer players a hint that other bank locations and ATMs may contain prizes. In certain instances, prizes may be won multiple times at these sponsored locations by different players. As will be later discussed, this also gives players an incentive to play the game using a mobile device with Global Positioning Systems.

In other embodiments of the present invention, there is a higher probability that a grid unit contains a prize when one or more proximate grid units have prizes. Thus, in the dynamic play of the game, when a player selects a grid unit, the probability that he or she will win the prize may be greater when players have won prizes in proximately located grid units. In one embodiment, the winning factor, $F_W$, may be greater for these grid units than for grid units that are not near any winning grid units. In the embodiments of the game containing tiers, the probability of finding keys may also be higher when nearby grid units contains keys. In embodiments of the GeoSweep Treasure Hunt game containing layers, the prizes are also clustered in groups of proximate grid units and each grid units' various layers.

In certain embodiments of the presently disclosed invention, players may have the ability protect and reserve grid units. In the playing of a game, there are instances in which the player may find it advantageous to hide the results of his selections. For example, in games that includes clusters of prizes and in games that reveal pictures or videos in selected grid units that offer hints of the locations of other prizes, players may be at a disadvantage if his winning results or the underlying portions of a picture were revealed to other players. In such instances, players may have the ability to pay a certain number of tokens in order to delay the revealing of his results for a period of time or for a number of rounds. The player may have to pay more tokens for longer periods of delay. As a more severe measure of protection, the player can also reserve grid units that he or she has not selected yet but plans to select in the future. Using this mechanism in the game allows the player to prevent other players from selecting the grid units for a period of time or number of rounds. The number of tokens that are required in protecting grid units may be even greater than the number of tokens required in hiding the results from the public.

In yet another embodiment of the disclosed invention, players may play the game on mobile devices. The mobile devices may be considered a computing device and therefore may have various components and capabilities of the computing device previously discussed in connection with FIG. 4. In addition, these mobile devices may contain a Global Positioning System that allows the location of the mobile device to be determined. Any mobile device that contains the ability to determine the location of the mobile device is well within the scope of presently disclosed invention. This may include any assisted global positioning systems (A-GPS), hybrid global positioning systems (HGPS), and also any other systems that may use cellular, radio or other wireless technologies to determine the location of a device.

Players of the game using mobile device may have access to features unique to these players. Particularly, in a game with a map of real world locations, players may have access to grid units that are otherwise inaccessible to players that play on non-mobile devices. These grid units may require players to be physically located at the real-world location depicted in the grid unit of the game in order to select the grid unit and therefore determine whether there is a prize at the grid unit. Other grid units may allow players to select the grid unit even when the player is not located at the location, but may offer the a higher tier prize or offer a higher probability of winning a prize for players that are physically located at corresponding location. In certain embodiments, the selection of the grid unit occurs automatically when the player is at the location associated with the grid unit. This feature may be used by businesses to reward players who visit the business's retail location. For example, a grocery store may reward players who enter its store by giving the players access to the grid unit containing the grocery store. The player may also be rewarded with a coupon for an item in the store. Thus, prizes associated with these locations may be used to further promote the business.

Figure 25:
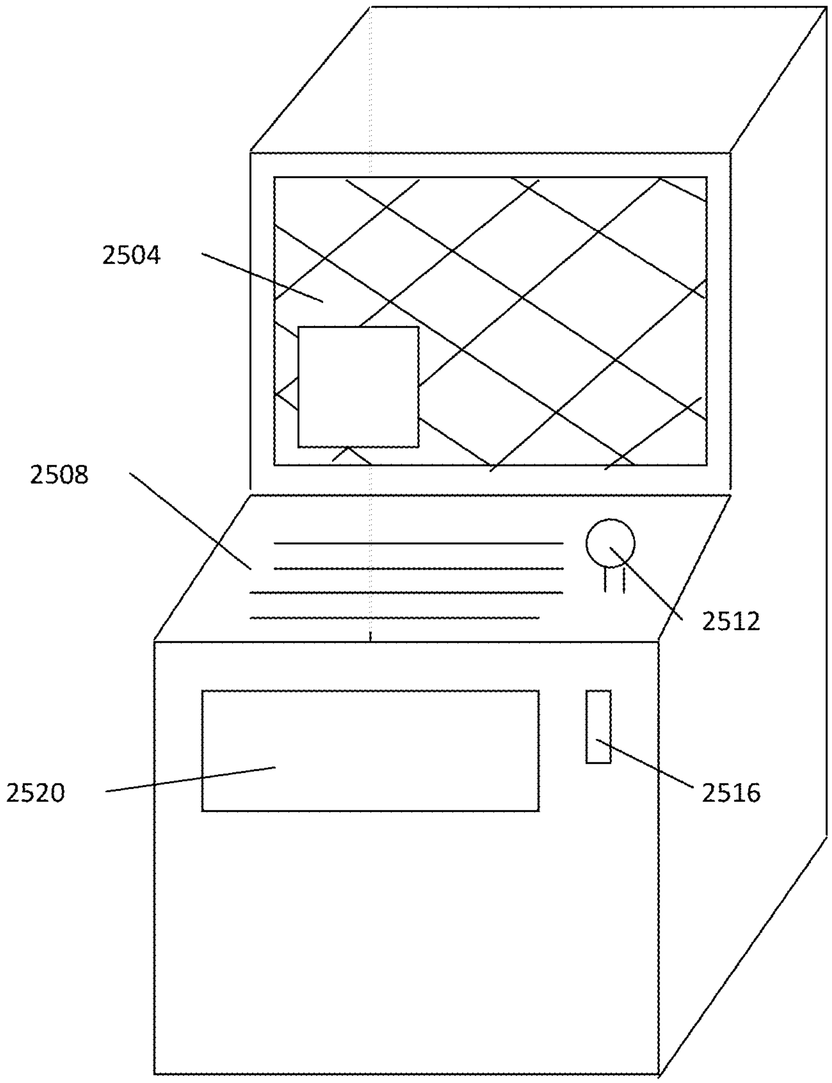
FIG. 25 illustrates one exemplary machine that is used at retail locations in accordance with one embodiment of the present invention.

Certain embodiments of the disclosed invention allow the use of retail locations and real world tickets in combination with the online map-based game disclosed herein. At retail locations, a gaming machine may allow users to play the game including various embodiments and features discussed herein. FIG. 25 depicts one such machine, which is shown to have a display 2504 and input devices such as a keyboard 2504 and joystick 2512. Other manners of input may be used in various other embodiments. The machine may be a computing device containing many of the components well known in the art of a computer. It may also have many of the same capabilities previously discussed as the computing devices of FIG. 4 including the ability to connect to the network such as the Internet. Users may insert money to receive a token within the game using the money slot 2516. Alternatively, he or she may log into the machine using his game account. The player may play the game in the same manner previously described, such as by selecting a grid unit and contributing one or more tokens. If the player wins, he or she may be credited with the jackpot or prizes within the game. When the player leaves the game, he or she may have a ticket printed out from the machine that indicates how much the player has won and what other bonuses that he or she may have received from playing the game at the retail location. Alternatively, he may update this account using the machine's connection to the network such as the network depicted in FIG. 4. The player may also redeem his winnings at a retail location either from a winnings bin 2520 or from a cash register at the retail location. The winning bin 2420 may output cash and coins of the player's winnings.

With the ticket, the player may perform a wide variety of actions. For example, the player may use the information contained on the ticket at a computing device, such as those discussed in connection with FIG. 4. He might log into his account a computing device and enter the information on the ticket, whereupon his credit winnings may be added to his account. In certain embodiments, computing devices with a camera may be used to enter into the information on the ticket. The camera might be used to take a picture or video of the ticket. The game or computing device may automatically detect information on the ticket and update the user's account accordingly. This may be possible through any known methods of data detection of an image or video such as Optical Character Recognition and bar code detection. In one embodiment, radio frequencies may be used to detect tickets, such as by way of Radio Frequency Identification (RFID) tags. The game or computing device may, in these cases, contain devices that may detect these tags and process the information accordingly.

Additional bonus abilities or tokens may be redeemed on computing devices from the tickets. For example, players may receive free tokens in his account by playing at retail locations. The game may allow players to select grid units that are restricted from other players such as grid units that have been reserved by certain businesses as a means of promotion. In games that use real-world maps, players may be required to receive a ticket from the retail location associated with certain grid units in order to access the grid unit. For example, a bank in New York City may require players to receive a ticket at the real world location that are depicted in the grid unit in order to select the grid unit in the game. Therefore, a player may visit the actual world location depicted in the grid unit, such as the ATMs or bank, to receive a ticket that grants the player access in the game.

These grid units might have higher probability of winning a prize or be associated with exclusive prizes. Tickets might also allow players to gain access to exclusive games that are not publicly available to players. These games might have smaller maps with greater number of prizes, thereby giving the players a larger chance of winning.

Tickets may give players a temporary probability boost in winning a prize, i.e. a "bonus period." For example, in a "dynamic play" of GeoSweep Treasure Hunt, the player will receive a bonus period that boosts the player's chances in winning when he or she selects a grid unit. Thus, when the player selects a grid unit and the probability algorithm discussed above is executed, the chance of winning will be greater than during normal play. The value of the winning factor $F_W$, therefore, will be greater than 1 for all grid units that the player selects during the bonus period. In certain embodiments, tickets may grant players a temporary boost for a certain number of selections. In a "predetermined play of the game," a bonus period may give allow players to see hints of where the prizes may be. Thus for example, in a map of 200 available grid units with one known prize, 100 grid units may be grayed out in the game. Thus, the player's chance of receiving a grid unit is doubled during these bonus periods.

Scratch-card tickets may also be purchased from retail locations. These scratch card tickets may have all of the features of the traditional scratch-card ticket in which players may scratch off portions of the ticket to receive a prize. These scratch cards may grant users access to the various features that tickets from retail machines also grant users. For example, one of the prizes of these tickets may be a code that is redeemable on mobile devices, retail machines or computing devices, giving players extra tokens, access to exclusive games, or even bonus periods, to name a few.

Players who are selected as winners in GeoSweep, Free2Play, GeoSweep Treasure Hunt and their embodiments are awarded with prizes and jackpots including cash, game tokens, bonus periods, and physical prizes as previously discussed. In addition, in certain embodiments, winning players may be rewarded with an invitation to access at least one bonus game. The game may be another game of GeoSweep, Free2Play, GeoSweep Treasure Hunt or another game entirely and may be offer players better prizes and larger jackpots. In addition, these games may be exclusive to those who select the grid units containing these invitations. Other bonus games may be accessible to the public but require an entrance free to play the game. The player in these cases, would receive access for free.

The presently disclosed invention may also grant users access to a plurality of social networking functions. Because the sweepstake game may contain millions of participating users, these functions allow each player to meet, communicate and interact with other users of the game. Social networking may further promote and sustain the interests of the game over time. In addition to the basic and traditional social networking functions such as the ability to communicate with one another, embodiments of the presently disclosed invention also allow players to keep a list of players who they may know. This list may further allow the player to keep track of the status of those on the list. Thus, a player may know when another player is playing the game. The players may decide to talk with one another and to discuss strategies and recent winning grid units. Certain embodiments also allow a player to determine the grid units that another player has chosen, furthering the social effects. The players may also share media and information with one another. Finally, embodiments of the game also allow players to interact with those outside of the game. This includes the ability to invite others to the game. When a person is referred to the game, he or she may start playing the game with a certain number of tokens. Further, the player who referred the new player may also receive tokens for his efforts. Another feature is the ability to associate the player's profile to an external site, allowing the players to share the player's game information and status. Thus, when a player makes an announcement or wins the lottery, this event may be automatically announced to these external websites.

Prize Variations and Customizations

According to some embodiments of the present invention, in a GeoSweep game or other lottery-style games disclosed herein, the prizes may comprise other things of value. For example, a prize may comprise points or credits exchangeable for merchandise such as music, games, ring tones, entertainment tickets, meals, lodging, transportation fares, and so on. Alternatively, the prize may comprise a software application or game that can be directly downloaded and enjoyed, for example, on the same computing device on which the player plays the GeoSweep game. A prize may additionally or alternatively comprise the ability to customize a winning Geo unit or other Geo unit(s). Examples of customizations may include, but are not limited to, selecting and associating one or more of the following with a Geo unit: a player ID, an image, a background color, a foreground color, a visual pattern, custom text or symbol such as a trademark or logo. The player may have multiple Geo units with different customizations performed on each unit. The player may also be able to form a group of more than one Geo unit owned by them to perform the same customization on all the units in the group. The player may also be able to form multiple groups of units owned by them so that each group of units has a different customization performed on it.

The player may also be able to filter the list of available prizes by specifying certain criteria for desired prizes. Examples of such criteria may include, but are not limited to: business partner type, prize type and prize location. Examples of prize type may include: clothing, shoes, music, outdoor equipment, appliances, cars, food, drinks etc. Examples of business partner type may include: large multi-chain vendors, local vendors, designer brands, etc. The player may also be able to choose the prizes location such as where each prize can be redeemed or enjoyed. The location of the prizes could be a physical location, an online location, a virtual location or a fictional location. The player may be able to specify a combination of two or more criteria to filter the list of available prizes.

Trade Geos

Some embodiments of the GeoSweep games disclosed herein may also allow a player to trade one or more Geo units with another player, with a business partner and/or with the game itself. A Geo unit may have multiple ownership rights associated with it just like legal land ownership in the real world. Examples of such rights may include: full use right, partial use right, possession right, product placement right, and mining/hunting rights (e.g., for treasure-hunt activities), etc. The player may be able to trade (e.g., swap, lease, buy, sell, or auction) one or more ownership rights associated with a Geo unit. The player may be able to perform such a trade with another player, with a business partner or with the game itself. In exchange for trading the ownership rights associated with the unit, a player may receive in return one or more of the following: a Geo unit, a prize or a token. For one example, a player may trade with a business partner the right to place an advertisement or a brand name/logo on a unit in exchange for a prize such as a discount or a gift card. For another example, one player may temporarily "borrow" another player's Geo unit(s) to participate in a week's worth of lottery drawings and agree to share any winning proceeds.

Prize Zone and Winner Based on Grouping

FIG. 26 illustrates another alternative payout structure in an exemplary GeoSweep game in accordance with one embodiment of the present invention. In this embodiment, unit D-6 is again selected as a winner but it is not occupied by a player. That is, no player "owns" or "occupies" the first-prize-winning D-6. However, the game rules may be such that the eight neighbors of unit D-6 form a prize zone around D-6 and nevertheless become winners of second prizes due to proximity to the winning Geo. Further away from Geo unit D-6, the sixteen next closest neighbors of Geo unit D-6 may still be winners of third prizes. For example, the second prizes may share 16% of the jackpot (i.e., 2% each), and the third prizes may share 16% of the jackpot (i.e., 1% each). According to other embodiments, additional "rings" of neighbors (or other nearby neighbors) may be included as winners of even lesser prizes. The prize zone feature may encourage GeoSweep players to band together (e.g., by forming a syndicate) and/or to coordinate the locations of their Geo units, in order to collectively achieve a better chance for each player to win something in the game.

Figure 27:
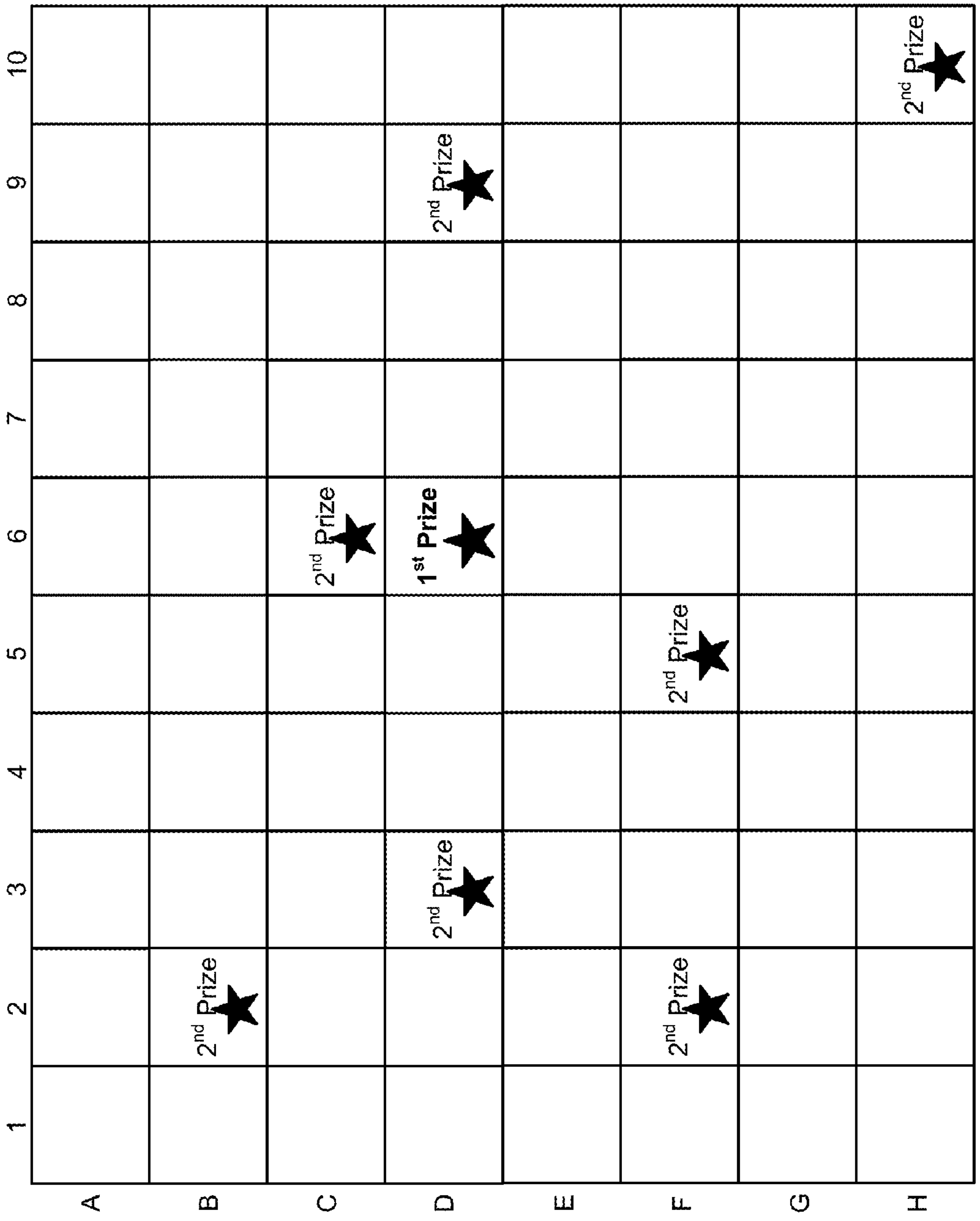
FIG. 27 illustrates yet another alternative payout structure in an exemplary GeoSweep game in accordance with one embodiment of the present invention.

FIG. 27 illustrates yet another alternative payout structure in an exemplary GeoSweep game in accordance with one embodiment of the present invention. In this embodiment, each Geo unit is associated with a unit indicator. Examples of unit indicators may include a symbol, an image, a region indicator, a business partner indicator, or any other mark that can be assigned to and shared by one or more units. In this embodiment, Geo unit D-6, which is associated with a unit indicator of an image of a star, is selected as a single first-prize winner. According to one embodiment of the game, any other Geo units that are also associated with a unit indicator of an image of a star may share in the first-prize with Geo unit D-6, or they may become winners of second prizes or other lesser prizes. In another embodiment, the unit indicator may be a region indicator such that all the Geo units with the region indicator represent a community. If unit D-6, associated with a region indicator is again selected as a first-prize winner, the other units that are also associated with the same region indicator may share in the first-prize with cell D-6, or they may become winners of second prizes. As those skilled in the art would appreciate, other mechanisms other than the unit indicator describe above may also be used to group or associate Geo units for purposes of determining their share of prizes. For example, the game system, one or more players, and/or a third-party sponsor may designate a certain attribute of a winning Geo as the criterion for other Geo units sharing the same attribute to be eligible for a share of the prizes. For instance, a department store chain such as Macy's may sponsor a game wherein, if the first-prize-winning Geo coincides with a Macy's store location, then all occupies Geo units at other Macy's store locations may become eligible for a share of the first prize or a lesser prize. In this example, the prizes may be Macy's gift cards, coupons, or other Macy's related things of value.

Casino/Terminal Play

Figure 28:
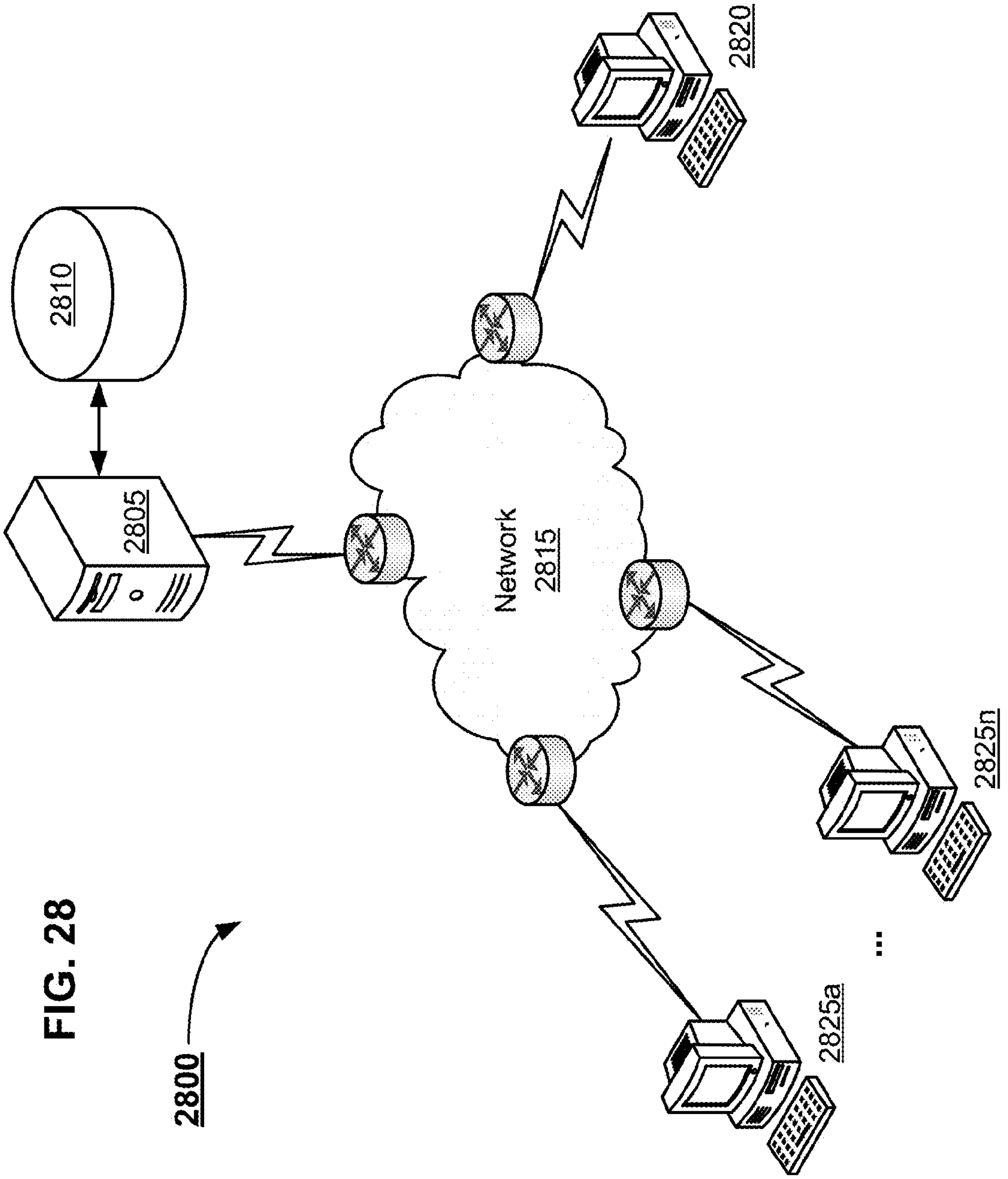
FIG. 28 illustrates an exemplary embodiment of the lottery-style game in a casino or terminal style setting in accordance with one embodiment of the present invention.

Apart from being implemented as online games accessed via players' personal computing devices, embodiments of the lottery-style games disclosed herein, such as GeoSweep games (including but not limited to the original GeoSweep games, GeoSweep Treasure Hunt games, and GeoSweep Free2Play games), may be alternatively implemented at a retail point-of-sales or in a casino or arcade environment. FIG. 28 illustrates an exemplary embodiment of the lottery-style game in a casino or terminal style setting in accordance with one embodiment of the present invention. In this embodiment, the casino-based lottery-style game system 2800 comprises a processor 2805 that is coupled with at least one storage devices 2810. The processor 2805 is connected through a communications medium over a Network 2815, such as the internet, an intranet, a local-area-network (LAN), a wide-area-network (WAN), etc, to a user-interface 2820 and one or more terminal devices 2825*a* . . . 2825*n*. A player may participate in the casino-based lottery-style game by accessing a terminal device 2825. Each player may play on an individual terminal device 2825 but the contributions from each player, playing on multiple terminal devices 2825*a* . . . 2825*n* are pooled to form a multi-player game. The players may play against each other, collaborate to play against other teams of player, and/or play against the house. The terminal devices 2825*a* . . . 2825*n* may be placed in only one location or more than one location. An example would be for one set of terminals placed in Casino A and another set of terminals placed in Casino B. Players playing on terminals in Casino A can play among themselves or the house of Casino A, or they can play against the players playing on terminals in Casino B. Players may also form teams and play as a group against an individual player or another team of players.

Figure 29:
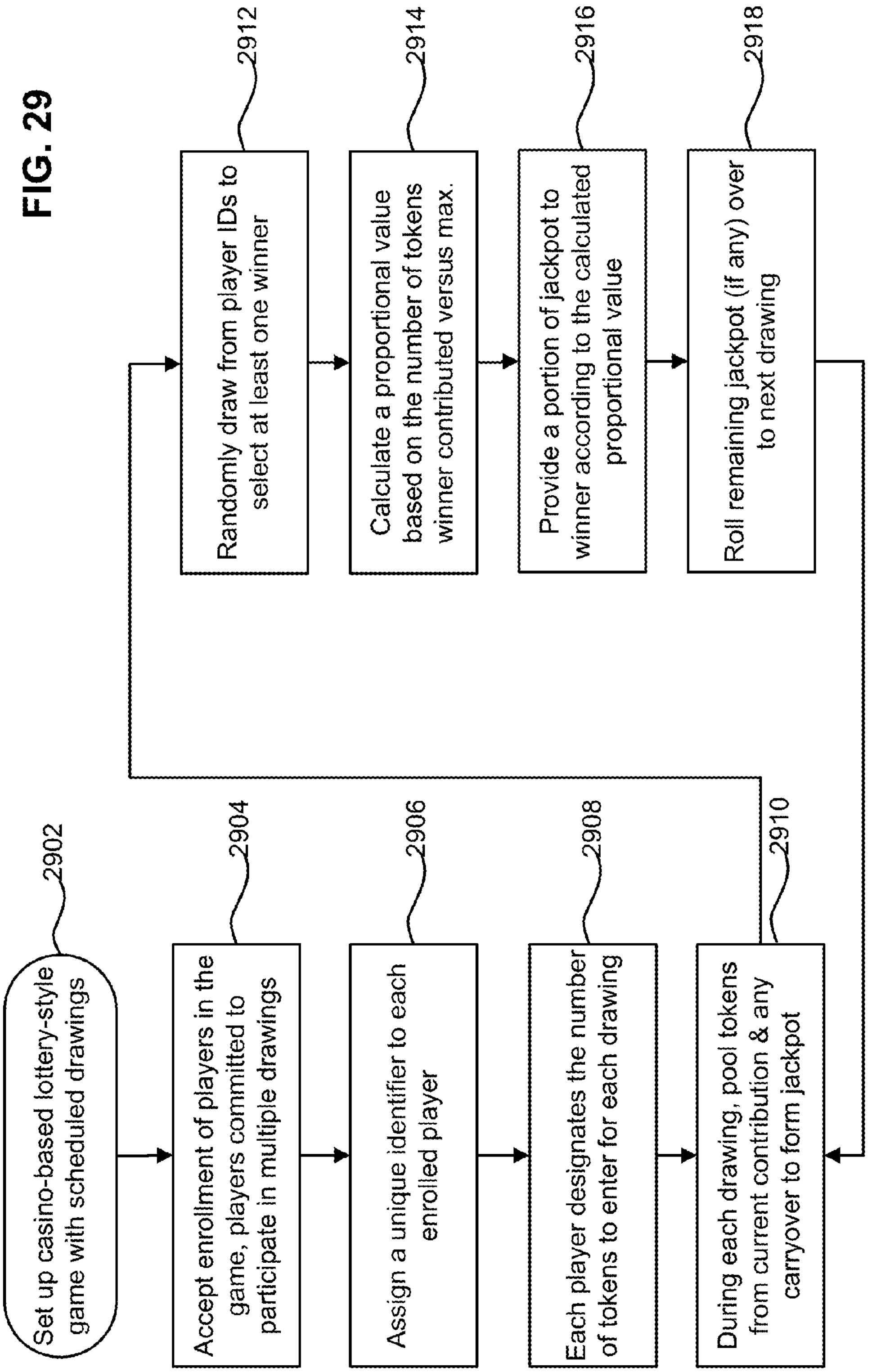
FIG. 29 is a flow chart illustrating an exemplary method of facilitating casino-based lottery-style games in accordance with one embodiment of the present invention.

Referring to FIG. 29, there is shown a flow chart illustrating an exemplary method of facilitating casino-based lottery-style games in accordance with one embodiment of the present invention. In step 2902, a casino-based lottery game may be set up. The lottery game may be an ongoing one that is scheduled to have a plurality of lottery drawings over a period of time. For example, the lottery drawings may occur on a periodic basis, such as once or multiple times every hour, or one or more times every calendar day or every business day. As the lottery game is set up, a set of rules, terms and conditions may be published or otherwise communicated to potential participants. The rules may define how the lottery game is operated and how the lottery drawings are conducted, as well as calculation and payout of prizes, as will be described in more detail below. The terms and conditions may specify rights and obligations of persons participating in the lottery game and lottery drawings.

In preferred embodiments of the present invention, the lottery game is established in a casino and accessible via one or more terminals located in one or more casinos. The lottery game may be either an add-on or an integrated part of an existing casino game, wherein participation in the lottery game may enhance a player's experience at the associated casino game or vice versa. In step 2904, players may be enrolled in the lottery game. Each person wishing to join the lottery game may be required to make a commitment to participate in a number of the scheduled lottery drawings. In one exemplary enrollment process, a player may (a) manifest consent to the set of rules, terms and conditions established in the lottery game and (b) deposit or pledge some amount of money or other things of value to be contributed to the game. The amount of initial deposit or pledge may depend on such factors as how many lottery drawings the player is obligated to participate in, how much wager the player is to enter for each drawing, the player's credit ratings, and so on.

Enrollment of players may be taken via a terminal located in a casino. In step 2906, each enrolled player may be assigned one or more unique identifiers. Each player identifier (or player ID) may be a text string, a serial number, the terminal number or other symbols. According to one embodiment, each player ID may be associated with a "Lucky Star" of the player's choice. According to some embodiments, each player ID may comprise a machine readable portion (e.g., an alphanumeric string) and a human recognizable portion (e.g., a logo, icon or catch phrase). The assigned player IDs may be imprinted or encoded on a membership card.

In the drawings or games described herein, each registered player can participate with one or multiple player IDs. When participating with multiple player IDs, the rules regarding each of the multiple player IDs are the same as if each player ID is owned and controlled by a single player. For ease of illustration, it is assumed in the following description that each player participates with a single player ID.

In step 2908, each player may designate the number of tokens to enter for each drawing. That is, with respect to each lottery drawing the player is committed to participate in, the player may specify a wager amount that is typically measured in the number of tokens. As used herein, a "token" may be or represent any physical or virtual thing of value that can be counted or quantified. For example, a token may be or represent one or more units of cash or credit. Or, a token may be or represent one or more points that are exchangeable for things of value. According to one embodiment of the present invention, one token may be the equivalent of one cent (1/100 of a dollar). According to another embodiment, one token may be or represent one value point that may be used to exchange for music downloads, cell phone ring-tones, or for other online or in-store purchases. According to yet another embodiment, one token may represent one unit of a game score in an online video game or a virtual society. According to still another embodiment, one token may be or can be exchanged for one or more units of mobile telephone airtime or long-distance telephone minutes.

The players may purchase tokens with their initial deposits. They may set up electronic fund transfers and/or automatic credit card payments to refill their accounts with tokens. A player's account may be replenished automatically as soon as its balance falls below a preset lower limit. Apart from winning or purchasing refills, the players may alternatively or additionally obtain tokens through bartering or by engaging in certain activities. For example, a player may exchange credit card cash-back bonus points for tokens. The player may also take part in online surveys, view online advertisements, or increase activity level at social networking or blogger websites to earn tokens.

The number of tokens designated for each lottery drawing should typically fall within a certain range. For lottery drawings that take place on an hourly basis, for example, there may be a hourly minimum and a hourly maximum for the number of tokens a player can contribute per player ID. According to one embodiment of the present invention, the hourly minimum may be one token (e.g., one cent or one pence) and the hourly maximum may be one hundred tokens (e.g., one dollar or one pound). The number of tokens that a player designates for each drawing may be any of a fixed value between and including the hourly minimum and the hourly maximum. Alternatively, the player may configure the hourly wager to be a variable amount. To have a minimal level of participation in the lottery game (thus a more predictable revenue from the game), the game system may be configured to prevent players from lowering their preset hourly wager amount for any upcoming drawings.

For each lottery drawing, a jackpot prize may be formed, in step 2910, from two sources: (a) tokens contributed by players who participate in that drawing, and (b) tokens carried over from one or more previous drawings, if available. Tokens from the two sources may be pooled together into one jackpot. The jackpot (or a portion thereof) may account for a maximum payable amount for a winner of that lottery drawing.

In step 2912, a random drawing from the player IDs may be conducted to select at least one winner. Note that the word "random" does not require randomness in the most rigorous statistical sense as such randomness is difficult to achieve. Instead, the word “random” implies a fair drawing process that does not appear to favor any one player more than any other player. The random (fair) drawing from the player IDs may be achieved in a number of computational methods as are well known in the gaming industry. According to some embodiments of the present invention, a single winner may be selected for each lottery drawing. According to some alternative embodiments, two or more winners may be selected for each drawing and they may share a prize fund on equal footings or according to an award hierarchy.

Then, in step 2914, a proportional value may be calculated based on the number of tokens the selected winner(s) contributed versus the maximum number allowed per player ID. Assuming there is only one selected winner, the proportional value (F) may be calculated by dividing the number of tokens the winner contributed (n) with the maximum number a player is allowed to contribute (M) to that individual lottery drawing. That is—

$$F = \frac{n}{M}$$

If there are multiple winners, the proportional value may be calculated for each winner. For example, if a selected winner contributed the maximum number of tokens for that lottery drawing, the proportional value for that winner would be one (1) or 100%. If the selected winner contributed half of the maximum number of tokens allowed, the proportional value would be ½ or 50%. The proportional value calculated in this step may be represented with either a fraction or a percentage.

In step 2916, a fraction of the jackpot (or maximum payable prize) may be provided to the selected winner(s) according to the proportional value calculated in step 2914 above. That is, whatever the full prize amount (P) a winner might have been entitled to had he or she contributed the maximum number of tokens (M), the actual payout amount (p) may be reduced to a fraction of that full prize amount in proportion to the number of tokens contributed (n). That is—

$$p = F \times P = \frac{n}{M} \times P$$

The same proportional payout rule applies to single-winner as well as multiple-winner scenarios. The actual payout may be made by depositing tokens into a winner’s account in the game system. Alternatively, the winner may receive the prize in the form of cash, points, airtime or long-distance minutes, other things of value, or a combination thereof. Other payout arrangements are also possible.

In step 2918, the remainder of the jackpot prize may be rolled over to a next drawing. Unless one or more selected winners happen to have wagered the maximum number of tokens and therefore won the entire jackpot, there would always be some remaining jackpot to add to the jackpot of the next drawing. In addition, the enrollment rule ensures continuous participation in the ongoing lottery drawings. As a result, the jackpot may quickly snowball into a large amount, further increasing players’ interest in the game.

For business advantages, it may be preferable to set the maximum number of tokens that each player ID can contribute to each drawing at a relatively low value. For example, if the hourly maximum that can be entered for a hourly drawing is one dollar, a player can contribute as little as one cent but never more than one dollar. The player will not feel any significant financial impact or burden to continue playing the lottery game for many hours. By wagering the equivalent of pocket change on an hourly basis, the player may still enjoy a decent chance of winning a substantial amount of money.

Mobile Location-Aware Play of Games

Embodiments of the GeoSweep games disclosed herein may also be able to use the player’s physical location to assist in the selection of a unit. The actual, current or projected location of the player may be determined based on the location of the player’s computing device from which the GeoSweep game is being accessed. As an example, the global positioning system (GPS) function on a player’s mobile device may be used to determine the current or projected location of the player. As another example, the Internet Protocol (IP) address of the player’s computing device or the cellular network data related to the player’s mobile device may be translated into an approximate location of the player. The player’s location may also be used for participation in merchant-sponsored events or contests. In an exemplary embodiment of the invention, the longer a player lingers around a particular location, the better the chance that the player may be awarded a Geo unit or other things of value related to the merchant or win a prize sponsored by the merchant. For example, the longer a player lingers around a Bloomingdale’s store, the better the chance that the player may be awarded a Geo unit related to Bloomingdale’s or win a prize sponsored by Bloomingdale’s, such as a discount coupon or a gift card.

According to some embodiments, the player may make an in-app selection or purchase of Geo unit(s) on his/her computing device based on his/her physical location. The game app may alternatively generate a quick response (QR) code, a bar code, or other symbol or output based on the location of the player. For example, based on the player’s location and level of participation in the game, a quick response code could be generated and displayed to the player. The player may then visit a lottery retail location, get the quick response code scanned by a point-of-sale device, and receive a corresponding lottery ticket. The lottery ticket may then be entered into a drawing in the game and the player may be eligible to win a prize.

Not only is the geolocation capability of a mobile device useful for assisting a player to interact with a GeoSweep game, it is also valuable for various other location-based functions and/or services such as targeted advertising, product/merchant promotions. In other words, GeoSweep on a mobile device may create a captive audience where the system knows the location of the participants. This is a unique opportunity to leverage the real-time location data of the audience for things other than the GeoSweep games, such as marketing for local merchants and the like. For example, if a player uses his mobile device to play a GeoSweep Treasure Hunt game, and it requires him to identify his current location, then that information can be passed back to the GeoSweep server (or other server(s)) and be used to deliver location-based advertisements and offers to the player. In general, according to embodiments of the present invention, where a lottery/gaming service (e.g., GeoSweep Treasure Hunt but not limited to it) requires, detects, or otherwise receives a player’s current location for purposes of the game, that location information can then be used for purposes other than the game, like serving up ads or distributing local coupons, etc. Based on real-time, near real-time, or projected location information of multiple GeoSweep players, a server may determine how many players are at or near a particular location and then serving up location-related offers and other content accordingly.

Map Variations

The "map" associated with embodiments of the GeoSweep games may comprise any type of a graphical representation of a map or image object. For example, the map may also comprise a geographic or topographical map of a real or fictional location. The map may also comprise a three dimensional representation of a location, with the parcel or unit representing one or more three-dimensional components of the location. Examples of a three dimensional map may include: a building with one or more floors, such as the Empire State Building, where each floor is divided into one or more parcels or Geo units; a multi-level structure, such as the Statute of Liberty, with various sections of the structure represented by parcels or Geo units; or a topographic representation of a mountain with various contour lines dividing the mountain area into parcels or Geo units.

Figure 30:
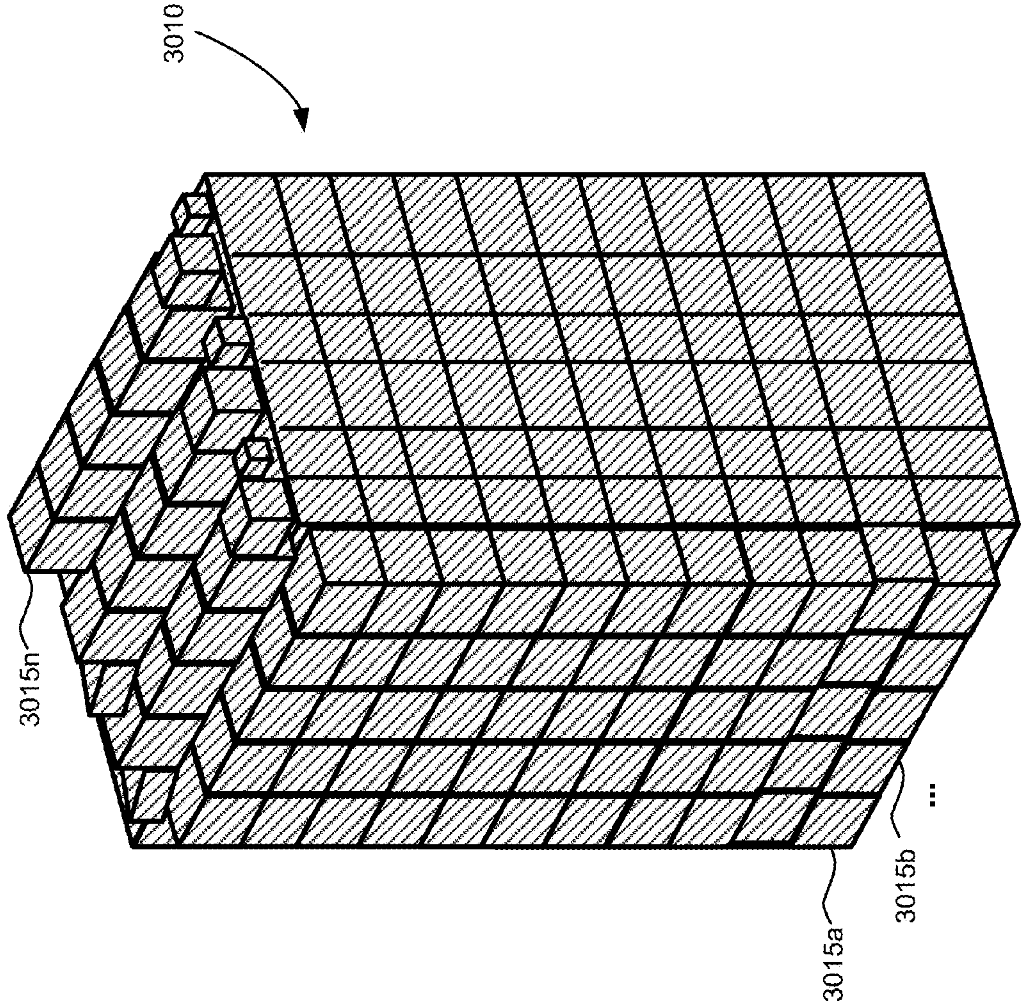
FIG. 30 shows a map for an exemplary GeoSweep gameboard in accordance with one embodiment of the present invention.

FIG. 30 is an exemplary embodiment of an apartment building 3010 where each apartment is represented by a parcel or Geo unit 3015*a*, 3015*b*, . . . , 3015*n*. According to one embodiment, the Geo units of the apartment building 3010 may be reserved for its tenants. For example, each tenant may be automatically entered into a next drawing upon paying his or her rent on time. Similar GeoSweep game boards may be implemented for a hotel building with promotional features.

According to some embodiments, the GeoSweep map or gameboard may also comprise an image (two dimensional) or a physical object (three dimensional). Examples of an image may include a famous painting (e.g., The Mona Lisa) or a historical document (e.g., The Declaration of Independence), and examples of a physical object may include a mascot, a sculpture, a structure, a building, etc.

Figure 31:
FIG. 31 shows another map for an exemplary GeoSweep gameboard in accordance with one embodiment of the present invention.

FIG. 31 is an exemplary embodiment of the GeoSweep™ balloon image 3110 that is divided into multiple units 3115*a*, 3115*b*, . . . , 3115*n*, where each parcel or unit may be of a predetermined size and shape. Alternatively, the map may comprise a layout of a predetermined real or fictional location. Examples of a real or fictional location include a stadium, a theater, a ball park, a fictional world such as Atlantis, the bottom of the sea, etc.

Figure 32:
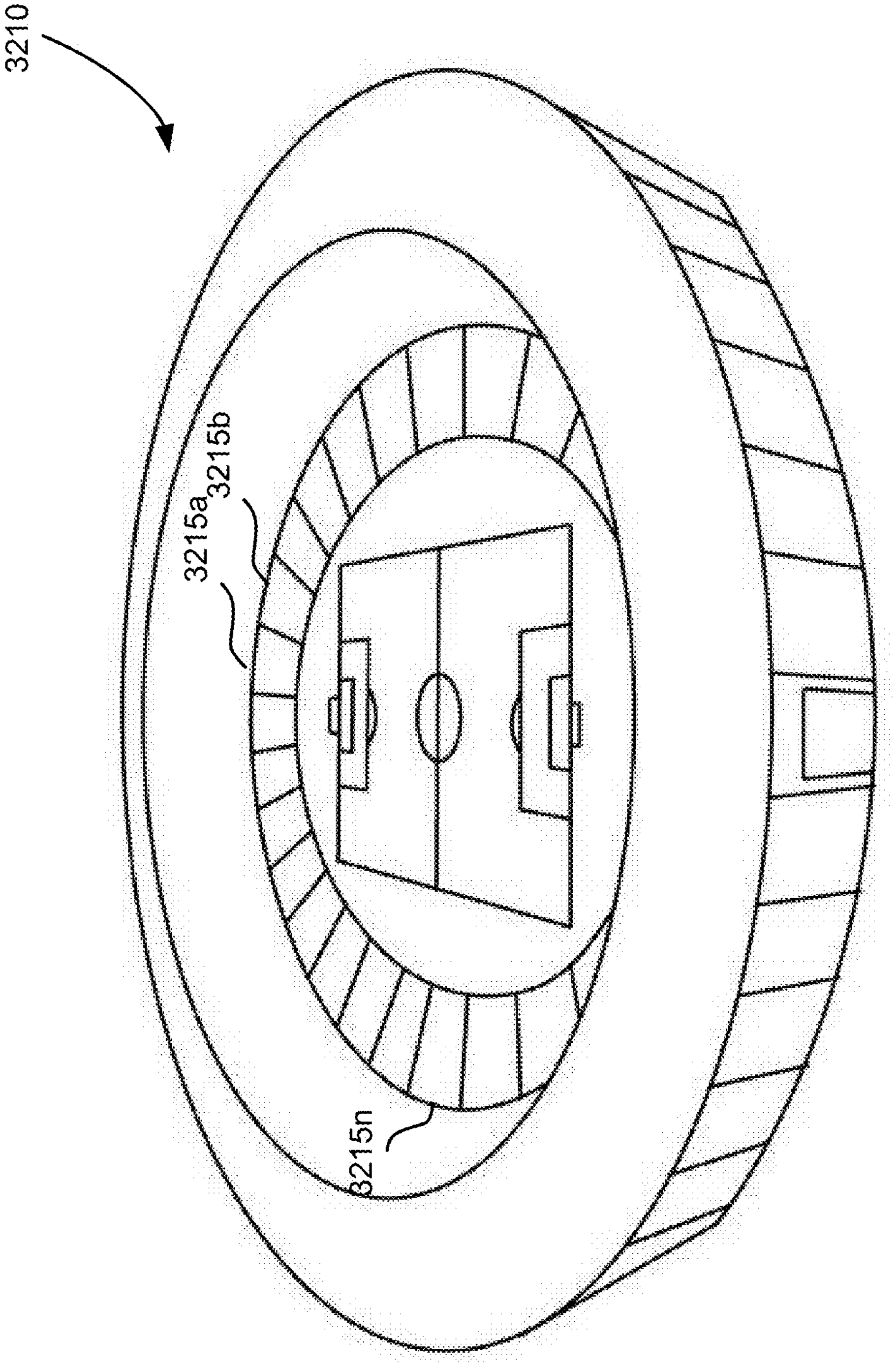
FIG. 32 shows yet another map for an exemplary GeoSweep gameboard in accordance with one embodiment of the present invention.

FIG. 32 is an exemplary embodiment of a stadium 3210 where each seat is represented by a parcel or Geo unit 3215*a*, 3215*b*, . . . , 3215*n*. According to one example, a football stadium may promote its ticket sales by associating each ticket or seasonal pass with GeoSweep gameplay. For instance, each ticket may have an add-on lottery component that may either be complementary or cost a small fee in addition to the ticket face value. Prior to, during, or subsequent to the corresponding football match, each ticket (or each participating ticket) may be entered into one or more GeoSweep drawings to win prizes that may be related to the stadium and/or football teams.

The various embodiments and features of the presently disclosed invention may be used in any combination as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for a map-based lottery game, the method comprising:

establishing, by at least one computer processor, an online game having an electronic gameboard based on a map of a geographical area that includes a plurality of units, each unit corresponding to a geographic location in the mapped geographical area;

displaying at least a portion of said electronic gameboard to potential players on their respective computing devices to solicit participation in said game;

receiving, via a communication interface, from each of a plurality of players a selection of at least one available unit on the electronic gameboard, said selection corresponding to at least one geographic location in the mapped geographical area;

uniquely associating each said player with the selected at least one unit such that each unit on the electronic gameboard is associated with no more than one of the plurality of players; and conducting, by at least one computer processor, a lottery drawing to select at least one first unit from some or all of the plurality of units such that any player associated with said at least one first unit becomes a first winner of a prize;

wherein the electronic gameboard is displayed on a computing device capable of determining or estimating its own geographic location, and the method further comprising:

causing the computing device to determine or estimate its own geographic location based on one or more location techniques selected from a group consisting of global positioning system (GPS), assisted global positioning system (A-GPS), hybrid global positioning system (HGPS), and cellular-based location techniques;

receiving an entry in the map-based lottery game from the computing device based on the determined or estimated geographic location; and causing the computing device to generate a symbol associated with the entry in the map-based lottery game, the symbol being scannable by a scanning device.

2. The method according to claim 1, further comprising:

selecting one or more second units to win prizes, the selection being based on relative map positions of the one or more second units with respect to the at least one first unit.

3. The method according to claim 2, wherein the one or more second units comprise units that are neighbors of the at least one first unit.

4. The method according to claim 1, wherein the prize comprises a software application.

5. The method according to claim 1, wherein the prize comprises an ability to personalize the first unit.

6. The method according to claim 1, further comprising:

customizing potential prizes based on a preference of a player.

7. The method according to claim 1, further comprising:

facilitating a trade of a first unit for a value object.

8. The method according to claim 7, wherein the value object is selected from a group consisting of:

at least one token;

at least one other unit on the electronic gameboard; and at least one prize.

9. The method according to claim 7, wherein the trade is performed between a first player and a second player.

10. The method according to claim 7, wherein the trade is performed between a first player and the map-based lottery game.

11. The method according to claim 7, wherein the trade involves all rights associated with the first unit.

12. The method according to claim 7, wherein the trade involves a subset of rights associated with the first unit.

13. The method according to claim 1, wherein the map comprises a three dimensional representation of a geographic location or a physical object.

14. The method according to claim 1, wherein the map comprises a layout of a predetermined real or fictional location.

15. The method of claim 1, further comprising:

causing a physical location of a player to be used in the selection of at least one unit on the electronic gameboard that is at or in proximity to said physical location.

16. The method of claim 1, further comprising:

causing the plurality of units to be displayed to a player based on a physical location of the player, wherein at least one of the displayed units is at or in proximity to said physical location.

17. The method of claim 1, further comprising:

using a physical location of a player to determine the prize won by the player.

18. The method according to claim 1, further comprising:

identifying a unit indicator associated with the selected at least one first unit.

19. The method according to claim 18, further comprising:

selecting one or more second units to win a second prize or share the prize won by the first winner, the selection being based on the unit indicator associated with the at least one first unit that is also shared by the one or more second units.

20. The method according to claim 18, wherein the unit indicator comprises a symbol.

21. The method according to claim 18, wherein the unit indicator comprises a predetermined region of the map to which both the at least one first unit and the one or more second units belong.

22. The method according to claim 1, wherein the symbol is selected from a group consisting of: a quick response code, a bar code, a computer readable image, and one or more computer readable characters.

23. The method according to claim 1, wherein the electronic gameboard is displayed on one or more casino gaming terminals, and the method further comprising:

facilitating player interactions with the electronic gameboard displayed on the one or more casino gaming terminals.

* * * * *